US007962482B2

(12) United States Patent
Handman et al.

(10) Patent No.: US 7,962,482 B2
(45) Date of Patent: Jun. 14, 2011

(54) METHODS AND SYSTEMS FOR UTILIZING CONTEXTUAL FEEDBACK TO GENERATE AND MODIFY PLAYLISTS

(75) Inventors: Etienne F. Handman, Dublin, CA (US); Thomas J. Conrad, Oakland, CA (US); Joseph J. Kennedy, Danville, CA (US); Timothy B. Westergren, San Francisco, CA (US)

(73) Assignee: Pandora Media, Inc., Oakland, CA (US)

( * ) Notice: Subject to any disclaimer, the term of this patent is extended or adjusted under 35 U.S.C. 154(b) by 63 days.

(21) Appl. No.: 11/380,563

(22) Filed: Apr. 27, 2006

(65) Prior Publication Data

US 2006/0212444 A1 Sep. 21, 2006

Related U.S. Application Data

(63) Continuation-in-part of application No. 11/279,567, filed on Apr. 13, 2006, which is a continuation-in-part of application No. 11/295,339, filed on Dec. 6, 2005, which is a continuation-in-part of application No. 10/150,876, filed on May 16, 2002, now Pat. No. 7,003,515.

(60) Provisional application No. 60/291,821, filed on May 16, 2001.

(51) Int. Cl.
*G06F 17/30* (2006.01)
(52) U.S. Cl. ......................... 707/733; 707/751
(58) Field of Classification Search .................. 707/100, 707/102, 758, 784
See application file for complete search history.

(56) References Cited

U.S. PATENT DOCUMENTS

| 3,935,379 | A | 1/1976 | Thornburg |
| 3,947,882 | A | 3/1976 | Lightner |
| 4,061,890 | A | 12/1977 | Froeschle |
| 4,158,756 | A | 6/1979 | Keezer |
| 4,191,472 | A | 3/1980 | Mason |
| 4,227,220 | A | 10/1980 | Brown |
| 4,513,315 | A | 4/1985 | Dekker et al. |
| 4,546,342 | A | 10/1985 | Weaver |
| 4,549,631 | A | 10/1985 | Bose |

(Continued)

FOREIGN PATENT DOCUMENTS

AU 739924 7/1998

(Continued)

OTHER PUBLICATIONS

Elias Pampalk, et al., "Dynamic Playlist Generation Based on Skipping Behavior", 2005 Queen Mary, University of London, 4 pages.

(Continued)

*Primary Examiner* — James Trujillo
*Assistant Examiner* — Linh Black
(74) *Attorney, Agent, or Firm* — Banner & Witcoff, Ltd.

(57) ABSTRACT

Systems and methods of generating and modifying a playlist using contextual information are disclosed. For example, a user may provide an input seed such as a song name or artist name. The input seed is compared to database items and a playlist is generated as a result. In some examples, the contextual information is used to enhance the comparison and to select better content objects for a user's playlist. Meanwhile, in some examples the content objects in the playlist may be arranged in an enhanced order using ranking and/or contextual information.

14 Claims, 24 Drawing Sheets

| | | "Sweet Child of Mine" Station | | | | | "U2" Station | | | | |
|---|---|---|---|---|---|---|---|---|---|---|---|
| Artist Name | Song Name | Spins | Feedback | Positive | Negative | Song Q | Spins | Feedback | Positive | Negative | Song Q |
| New Order | Age of Consent | 4076 | 114 | 65 | 49 | 0.004 | 14683 | 1297 | 1277 | 20 | 0.086 |
| Kiss | We Are One | 21271 | 596 | 530 | 66 | 0.022 | 2841 | 131 | 105 | 26 | 0.028 |
| Nelly | Country Grammar | 3 | 1 | 0 | 1 | -0.333 | 7 | 1 | 0 | 1 | -0.143 |
| Pink Floyd | Take It Back | 30146 | 942 | 927 | 15 | 0.030 | 82 | 76 | 20 | 56 | -0.439 |
| Police | Invisible Sun | 82 | 56 | 0 | 56 | -0.683 | 4683 | 297 | 277 | 20 | 0.055 |
| U2 | Spanish Eyes | 3683 | 148 | 20 | 128 | -0.029 | 20146 | 900 | 823 | 77 | 0.037 |
| April Wine | I Like To Rock | 9553 | 280 | 89 | 191 | -0.011 | 71 | 55 | 12 | 43 | -0.437 |
| Massive Attack | Angel | 1751 | 143 | 140 | 3 | 0.078 | 2201 | 107 | 90 | 17 | 0.033 |
| Pet Shop Boys | Billionaire Boy's Club | 2157 | 126 | 117 | 9 | 0.050 | 8877 | 193 | 133 | 60 | 0.008 |
| U2 | With or Without You | 4283 | 297 | 2 | 277 | -0.064 | 31271 | 1596 | 1500 | 96 | 0.045 |

1902

1900

U.S. PATENT DOCUMENTS

| | | |
|---|---|---|
| 4,577,069 A | 3/1986 | Keezer |
| 4,703,465 A | 10/1987 | Parker |
| 4,729,016 A | 3/1988 | Alkofer |
| 4,739,514 A | 4/1988 | Short |
| 4,761,642 A | 8/1988 | Huntzinger |
| 4,775,935 A | 10/1988 | Yourick |
| 4,780,758 A | 10/1988 | Lin et al. |
| 4,788,675 A | 11/1988 | Jones |
| 4,789,980 A | 12/1988 | Darcie et al. |
| 4,792,968 A | 12/1988 | Katz |
| 4,851,931 A | 7/1989 | Parker |
| 4,852,910 A | 8/1989 | Taffer |
| 4,866,515 A | 9/1989 | Tagawa et al. |
| 4,870,515 A | 9/1989 | Stokes |
| 4,885,747 A | 12/1989 | Foglia |
| 4,890,320 A | 12/1989 | Monslow et al. |
| 4,891,633 A | 1/1990 | Imazeki et al. |
| 4,937,807 A | 6/1990 | Weitz |
| 4,939,714 A | 7/1990 | Yamagishi |
| 4,974,173 A | 11/1990 | Stefik et al. |
| 4,975,690 A | 12/1990 | Torres |
| 4,996,642 A | 2/1991 | Hey |
| 5,001,554 A | 3/1991 | Johnson et al. |
| 5,041,972 A | 8/1991 | Frost |
| 5,054,360 A | 10/1991 | Lisle |
| 5,072,412 A | 12/1991 | Henderson, Jr. et al. |
| 5,092,424 A | 3/1992 | Schreiber |
| 5,121,478 A | 6/1992 | Rao |
| 5,124,911 A | 6/1992 | Sack |
| 5,131,048 A | 7/1992 | Farenelli |
| 5,132,992 A | 7/1992 | Yurt |
| 5,168,481 A | 12/1992 | Culbertson |
| 5,197,101 A | 3/1993 | Mok |
| 5,210,820 A | 5/1993 | Kenyon |
| 5,237,157 A | 8/1993 | Kaplan |
| 5,250,745 A | 10/1993 | Tsumura |
| 5,261,823 A | 11/1993 | Kurokawa |
| 5,272,700 A | 12/1993 | Hansen et al. |
| 5,274,836 A | 12/1993 | Lux |
| 5,278,751 A | 1/1994 | Adiano et al. |
| 5,291,395 A | 3/1994 | Abecassis |
| 5,298,671 A | 3/1994 | Bliss |
| 5,303,302 A | 4/1994 | Burrows |
| 5,333,135 A | 7/1994 | Wendorf |
| 5,351,234 A | 9/1994 | Beierle et al. |
| 5,355,302 A | 10/1994 | Martin |
| 5,365,264 A | 11/1994 | Inoue et al. |
| 5,371,551 A | 12/1994 | Logan et al. |
| 5,408,630 A | 4/1995 | Moss |
| 5,410,344 A | 4/1995 | Graves et al. |
| 5,418,713 A | 5/1995 | Allen |
| 5,441,415 A | 8/1995 | Lee et al. |
| 5,444,489 A | 8/1995 | Truong et al. |
| 5,445,295 A | 8/1995 | Brown |
| 5,446,891 A | 8/1995 | Kaplan et al. |
| 5,469,206 A | 11/1995 | Strubbe et al. |
| 5,469,219 A | 11/1995 | Mortensen |
| 5,481,509 A | 1/1996 | Knowles |
| 5,483,278 A | 1/1996 | Strubbe et al. |
| 5,485,221 A | 1/1996 | Banker et al. |
| 5,485,518 A | 1/1996 | Hunter |
| 5,486,645 A | 1/1996 | Suh et al. |
| 5,499,047 A | 3/1996 | Terry et al. |
| 5,502,601 A | 3/1996 | Scheffler |
| 5,508,984 A | 4/1996 | Goto |
| 5,510,573 A | 4/1996 | Cho |
| 5,533,183 A | 7/1996 | Henderson, Jr. et al. |
| 5,534,911 A | 7/1996 | Levitan |
| 5,539,477 A | 7/1996 | Miyajima |
| 5,541,638 A | 7/1996 | Story |
| 5,541,919 A | 7/1996 | Yong et al. |
| 5,550,575 A | 8/1996 | West |
| 5,550,746 A | 8/1996 | Jacobs |
| 5,557,541 A | 9/1996 | Schulhof |
| 5,564,002 A | 10/1996 | Brown |
| 5,565,910 A | 10/1996 | Rowse et al. |
| 5,573,953 A | 11/1996 | Marnie et al. |
| 5,581,795 A | 12/1996 | Maupin |
| 5,583,868 A | 12/1996 | Rashid et al. |
| 5,586,121 A | 12/1996 | Moura et al. |
| 5,592,511 A | 1/1997 | Schoen |
| 5,594,601 A | 1/1997 | Mimick |
| 5,594,726 A | 1/1997 | Thompson et al. |
| 5,594,792 A | 1/1997 | Chouraki et al. |
| 5,608,446 A | 3/1997 | Carr et al. |
| 5,610,774 A | 3/1997 | Hayashi |
| 5,610,893 A | 3/1997 | Soga |
| 5,611,607 A | 3/1997 | Kuzara |
| 5,616,876 A | 4/1997 | Cluts |
| 5,619,250 A | 4/1997 | McClellan et al. |
| 5,619,425 A | 4/1997 | Funahashi |
| 5,625,608 A | 4/1997 | Grewe |
| 5,633,839 A | 5/1997 | Alexander |
| 5,634,021 A | 5/1997 | Rosenberg et al. |
| 5,634,051 A | 5/1997 | Thomson |
| 5,634,101 A | 5/1997 | Blau |
| 5,635,980 A | 6/1997 | Lin et al. |
| 5,636,276 A | 6/1997 | Brugger |
| 5,648,628 A | 7/1997 | Ng |
| 5,652,627 A | 7/1997 | Allen |
| 5,652,749 A | 7/1997 | Davenport et al. |
| 5,668,948 A | 9/1997 | Belknap et al. |
| 5,668,997 A | 9/1997 | Lynch-Freshner et al. |
| 5,670,730 A | 9/1997 | Grewe |
| 5,675,734 A | 10/1997 | Hair |
| 5,675,784 A | 10/1997 | Maxwell et al. |
| 5,679,911 A | 10/1997 | Moriyama |
| 5,682,550 A | 10/1997 | Brown et al. |
| 5,695,400 A | 12/1997 | Fennell, Jr. et al. |
| 5,696,965 A | 12/1997 | Dedrick |
| 5,708,845 A | 1/1998 | Wistendahl et al. |
| 5,708,961 A | 1/1998 | Hylton et al. |
| 5,717,923 A | 2/1998 | Dedrick |
| 5,719,344 A | 2/1998 | Pawate |
| 5,719,786 A | 2/1998 | Nelson et al. |
| 5,721,878 A | 2/1998 | Otlesen et al. |
| 5,722,041 A | 2/1998 | Freadman |
| 5,724,567 A | 3/1998 | Rose et al. |
| 5,726,909 A | 3/1998 | Krikorian |
| 5,732,216 A | 3/1998 | Logan et al. |
| 5,734,119 A | 3/1998 | France |
| 5,734,719 A | 3/1998 | Tsevdos |
| 5,734,720 A | 3/1998 | Salganicoff |
| 5,737,747 A | 4/1998 | Vishlitzky et al. |
| 5,739,451 A | 4/1998 | Winksy |
| 5,740,134 A | 4/1998 | Peterson |
| 5,740,549 A | 4/1998 | Reilly et al. |
| 5,745,095 A | 4/1998 | Parchem et al. |
| 5,745,685 A | 4/1998 | Kirchner et al. |
| 5,749,081 A | 5/1998 | Whiteis |
| 5,754,771 A | 5/1998 | Epperson et al. |
| 5,754,773 A | 5/1998 | Ozden et al. |
| 5,754,938 A | 5/1998 | Herz et al. |
| 5,754,939 A | 5/1998 | Herz et al. |
| 5,758,257 A | 5/1998 | Herz et al. |
| 5,760,822 A | 6/1998 | Coutinho |
| 5,768,280 A | 6/1998 | Way |
| 5,781,227 A | 7/1998 | Goode et al. |
| 5,781,449 A | 7/1998 | Rosborough |
| 5,781,734 A | 7/1998 | Ohno et al. |
| 5,781,889 A | 7/1998 | Martin |
| 5,793,980 A | 8/1998 | Glaser et al. |
| 5,798,923 A | 8/1998 | Laskowski |
| 5,801,747 A | 9/1998 | Bedard |
| 5,805,804 A | 9/1998 | Laursen et al. |
| 5,809,246 A | 9/1998 | Goldman |
| 5,812,123 A | 9/1998 | Rowe et al. |
| 5,819,160 A | 10/1998 | Foladare |
| 5,819,273 A | 10/1998 | Vora et al. |
| 5,822,524 A | 10/1998 | Chen et al. |
| 5,822,543 A | 10/1998 | Dunn et al. |
| 5,822,744 A | 10/1998 | Kesel |
| 5,825,829 A | 10/1998 | Borazjani et al. |
| 5,835,087 A | 11/1998 | Herz et al. |
| 5,835,727 A | 11/1998 | Wong et al. |
| 5,841,979 A | 11/1998 | Schulhof |
| 5,848,396 A | 12/1998 | Gerace |

| | | | |
|---|---|---|---|
| 5,848,404 A | 12/1998 | Hafner et al. | |
| 5,850,340 A | 12/1998 | York | |
| 5,850,433 A | 12/1998 | Rondeau | |
| 5,855,015 A | 12/1998 | Shoham | |
| 5,857,177 A * | 1/1999 | Alstr.o slashed.m et al. ... 706/15 | |
| 5,864,672 A | 1/1999 | Bodeep et al. | |
| 5,864,682 A | 1/1999 | Porter et al. | |
| 5,864,868 A | 1/1999 | Contois | |
| 5,870,723 A | 2/1999 | Pare, Jr. et al. | |
| 5,882,262 A | 3/1999 | Balhorn | |
| 5,889,765 A | 3/1999 | Gibbs | |
| 5,889,949 A | 3/1999 | Charles | |
| 5,890,152 A | 3/1999 | Rapaport et al. | |
| 5,893,095 A | 4/1999 | Jain et al. | |
| 5,896,179 A | 4/1999 | Eglit | |
| 5,897,639 A | 4/1999 | Greef et al. | |
| 5,907,843 A | 5/1999 | Cleron et al. | |
| 5,911,131 A | 6/1999 | Vig | |
| 5,912,676 A | 6/1999 | Malladi et al. | |
| 5,913,204 A | 6/1999 | Kelly | |
| 5,915,094 A | 6/1999 | Kouloheris et al. | |
| 5,917,810 A | 6/1999 | De Bot | |
| 5,918,223 A | 6/1999 | Blum et al. | |
| 5,920,856 A | 7/1999 | Syeda-Mahmood | |
| 5,923,385 A | 7/1999 | Mills et al. | |
| 5,923,627 A | 7/1999 | Miwa et al. | |
| 5,926,207 A | 7/1999 | Vaughan et al. | |
| 5,926,624 A | 7/1999 | Katz | |
| 5,929,850 A | 7/1999 | Broadwin et al. | |
| 5,931,901 A | 8/1999 | Wolf et al. | |
| 5,936,660 A | 8/1999 | Gurantz | |
| 5,945,988 A | 8/1999 | Williams et al. | |
| 5,953,044 A | 9/1999 | Kato et al. | |
| 5,953,348 A | 9/1999 | Barn | |
| 5,956,716 A | 9/1999 | Kenner et al. | |
| 5,959,945 A | 9/1999 | Kleiman | |
| 5,960,411 A | 9/1999 | Hartman et al. | |
| 5,960,445 A | 9/1999 | Tamori et al. | |
| 5,963,916 A | 10/1999 | Kaplan | |
| 5,963,957 A | 10/1999 | Hoffberg | |
| 5,966,440 A | 10/1999 | Hair | |
| 5,969,283 A | 10/1999 | Looney et al. | |
| 5,973,683 A | 10/1999 | Cragun et al. | |
| 5,974,441 A | 10/1999 | Rogers et al. | |
| 5,982,363 A | 11/1999 | Naiff | |
| 5,983,200 A | 11/1999 | Stotznick | |
| 5,983,218 A | 11/1999 | Syeda-Mahmood | |
| 5,986,200 A | 11/1999 | Curtain | |
| 5,987,525 A | 11/1999 | Roberts | |
| 5,991,374 A | 11/1999 | Hazenfield | |
| 5,991,735 A | 11/1999 | Gerace | |
| 6,009,422 A | 12/1999 | Ciccarelli | |
| 6,009,465 A | 12/1999 | Decker et al. | |
| 6,014,706 A | 1/2000 | Cannon et al. | |
| 6,017,219 A | 1/2000 | Adams, Jr. et al. | |
| 6,018,343 A | 1/2000 | Wang et al. | |
| 6,018,768 A | 1/2000 | Ullman et al. | |
| 6,020,883 A | 2/2000 | Herz et al. | |
| 6,026,388 A | 2/2000 | Liddy et al. | |
| 6,026,398 A | 2/2000 | Brown et al. | |
| 6,029,165 A | 2/2000 | Gable | |
| 6,029,195 A | 2/2000 | Herz | |
| 6,031,795 A | 2/2000 | Wehmeyer | |
| 6,031,797 A | 2/2000 | Van Ryzin | |
| 6,031,818 A | 2/2000 | Lo et al. | |
| 6,038,591 A | 3/2000 | Wolfe et al. | |
| 6,038,610 A | 3/2000 | Belfiore et al. | |
| 6,041,311 A | 3/2000 | Chislenko et al. | |
| 6,047,327 A | 4/2000 | Tso et al. | |
| 6,049,797 A | 4/2000 | Guha et al. | |
| 6,052,819 A | 4/2000 | Barker et al. | |
| 6,060,997 A | 5/2000 | Taubenheim et al. | |
| 6,061,680 A | 5/2000 | Scherf | |
| 6,064,379 A | 5/2000 | DeMoney | |
| 6,070,160 A | 5/2000 | Geary | |
| 6,084,553 A | 7/2000 | Walls et al. | |
| 6,085,185 A | 7/2000 | Matsuzawa et al. | |
| 6,088,722 A | 7/2000 | Herz et al. | |
| 6,091,725 A | 7/2000 | Cheriton et al. | |
| 6,093,880 A | 7/2000 | Arnalds | |
| 6,108,686 A | 8/2000 | Williams et al. | |
| 6,118,450 A | 9/2000 | Proehl | |
| 6,125,387 A | 9/2000 | Simonoff et al. | |
| 6,128,255 A | 10/2000 | Yankowski | |
| 6,134,547 A | 10/2000 | Huxley | |
| 6,134,590 A | 10/2000 | Perlman | |
| 6,154,773 A | 11/2000 | Roberts | |
| 6,161,142 A | 12/2000 | Wolfe et al. | |
| 6,182,122 B1 | 1/2001 | Berstis | |
| 6,182,126 B1 | 1/2001 | Nathan | |
| 6,186,794 B1 | 2/2001 | Brown et al. | |
| 6,192,340 B1 | 2/2001 | Abecassis | |
| 6,199,076 B1 | 3/2001 | Logan et al. | |
| 6,223,210 B1 | 4/2001 | Hickey | |
| 6,230,200 B1 | 5/2001 | Forecast et al. | |
| 6,232,539 B1 | 5/2001 | Looney et al. | |
| 6,237,786 B1 | 5/2001 | Ginter et al. | |
| 6,240,423 B1 | 5/2001 | Hirata | |
| 6,240,550 B1 | 5/2001 | Nathan | |
| 6,243,725 B1 | 6/2001 | Hempleman | |
| 6,269,275 B1 | 7/2001 | Slade | |
| 6,288,991 B1 | 9/2001 | Kajiyama et al. | |
| 6,292,440 B1 | 9/2001 | Lee | |
| 6,295,555 B1 | 9/2001 | Goldman | |
| 6,313,833 B1 | 11/2001 | Knight | |
| 6,314,094 B1 | 11/2001 | Boys | |
| 6,338,044 B1 | 1/2002 | Cook et al. | |
| 6,345,256 B1 * | 2/2002 | Milsted et al. ............ | 705/64 |
| 6,346,951 B1 | 2/2002 | Mastronardi | |
| 6,349,339 B1 | 2/2002 | Williams | |
| 6,351,736 B1 | 2/2002 | Weisberg et al. | |
| 6,353,822 B1 | 3/2002 | Lieberman | |
| 6,385,596 B1 | 5/2002 | Wiser et al. | |
| 6,389,403 B1 * | 5/2002 | Dorak, Jr. ............... | 705/52 |
| 6,397,189 B1 | 5/2002 | Martin | |
| 6,411,724 B1 | 6/2002 | Vaithilingam et al. | |
| 6,418,421 B1 * | 7/2002 | Hurtado et al. ............ | 705/54 |
| 6,434,621 B1 | 8/2002 | Pezzillo et al. | |
| 6,446,080 B1 | 9/2002 | Van Ryzin | |
| 6,526,411 B1 | 2/2003 | Ward | |
| 6,571,390 B1 | 5/2003 | Dunn et al. | |
| 6,587,127 B1 * | 7/2003 | Leeke et al. ............ | 715/765 |
| 6,587,837 B1 * | 7/2003 | Spagna et al. ............ | 705/26 |
| 6,588,015 B1 | 7/2003 | Eyer et al. | |
| 6,657,117 B2 | 12/2003 | Weare et al. | |
| 6,662,195 B1 | 12/2003 | Langseth et al. | |
| 6,741,869 B1 | 5/2004 | Lehr | |
| 6,748,427 B2 | 6/2004 | Drosset et al. | |
| 6,763,345 B1 | 7/2004 | Hempleman | |
| 6,769,009 B1 | 7/2004 | Reisman | |
| 6,774,926 B1 | 8/2004 | Ellis et al. | |
| 6,813,711 B1 | 11/2004 | Dimenstein | |
| 6,819,963 B2 | 11/2004 | Riley | |
| 6,820,063 B1 | 11/2004 | England et al. | |
| 6,879,963 B1 | 4/2005 | Rosenberg | |
| 6,931,451 B1 * | 8/2005 | Logan et al. ............ | 709/231 |
| 6,933,433 B1 | 8/2005 | Porteus | |
| 6,953,886 B1 | 10/2005 | Looney et al. | |
| 6,983,371 B1 * | 1/2006 | Hurtado et al. ............ | 713/189 |
| 6,993,290 B1 | 1/2006 | Gebis et al. | |
| 6,993,532 B1 | 1/2006 | Platt | |
| 7,022,905 B1 | 4/2006 | Hinman | |
| 7,028,082 B1 | 4/2006 | Rosenberg et al. | |
| 7,072,846 B1 | 7/2006 | Robinson | |
| 7,072,932 B1 | 7/2006 | Stahl | |
| 7,076,561 B1 | 7/2006 | Rosenberg et al. | |
| 7,133,924 B1 | 11/2006 | Rosenberg et al. | |
| 7,158,169 B1 | 1/2007 | Farber et al. | |
| 7,185,355 B1 | 2/2007 | Ellis et al. | |
| 7,194,687 B2 | 3/2007 | Sezan et al. | |
| 7,205,471 B2 | 4/2007 | Looney et al. | |
| 7,206,748 B1 * | 4/2007 | Gruse et al. ............ | 705/1 |
| 7,216,299 B2 | 5/2007 | Knight | |
| 7,231,175 B2 | 6/2007 | Ellis | |
| 7,269,564 B1 * | 9/2007 | Milsted et al. ............ | 705/1.1 |
| 7,275,256 B1 | 9/2007 | Del Beccaro et al. | |
| 7,320,025 B1 | 1/2008 | Steinberg et al. | |
| 7,321,923 B1 | 1/2008 | Rosenberg et al. | |

| | | | |
|---|---|---|---|
| 7,325,043 B1 | 1/2008 | Rosenberg et al. | |
| 7,346,558 B2 | 3/2008 | Rosenberg | |
| 7,555,539 B1 | 6/2009 | Rosenberg et al. | |
| 2001/0013123 A1 | 8/2001 | Freeman et al. | |
| 2001/0018858 A1* | 9/2001 | Dwek | 84/609 |
| 2002/0010759 A1* | 1/2002 | Hitson et al. | 709/219 |
| 2002/0037083 A1 | 3/2002 | Weare et al. | |
| 2002/0041692 A1 | 4/2002 | Seto et al. | |
| 2002/0082901 A1* | 6/2002 | Dunning et al. | 705/10 |
| 2002/0107941 A1 | 8/2002 | Katz et al. | |
| 2002/0199186 A1 | 12/2002 | Ali et al. | |
| 2003/0055516 A1 | 3/2003 | Gang et al. | |
| 2003/0089218 A1 | 5/2003 | Gang et al. | |
| 2003/0105718 A1* | 6/2003 | Hurtado et al. | 705/51 |
| 2003/0135464 A1* | 7/2003 | Mourad et al. | 705/50 |
| 2003/0236582 A1 | 12/2003 | Zamir et al. | |
| 2005/0210101 A1 | 9/2005 | Janik | |
| 2006/0173838 A1 | 8/2006 | Garg et al. | |
| 2006/0184431 A1 | 8/2006 | Rosenberg | |
| 2007/0058042 A1 | 3/2007 | Farber | |
| 2007/0079327 A1 | 4/2007 | Khoo et al. | |
| 2007/0180063 A1 | 8/2007 | Qureshey et al. | |
| 2007/0256021 A1 | 11/2007 | Prager et al. | |
| 2007/0282708 A1 | 12/2007 | Rosenberg | |
| 2008/0046958 A1 | 2/2008 | Del Beccaro et al. | |
| 2008/0104106 A1 | 5/2008 | Rosenberg et al. | |
| 2008/0140239 A1 | 6/2008 | Rosenberg et al. | |
| 2008/0140717 A1 | 6/2008 | Rosenberg et al. | |
| 2008/0196070 A1 | 8/2008 | White et al. | |

FOREIGN PATENT DOCUMENTS

| | | |
|---|---|---|
| EP | 1 657 721 A2 | 5/2006 |
| EP | 1 705 661 A1 | 9/2006 |
| GB | 2305339 | 2/1997 |
| WO | 9318465 | 9/1993 |
| WO | 9612255 | 4/1996 |
| WO | 9612256 | 4/1996 |
| WO | 9612257 | 4/1996 |
| WO | 9612258 | 4/1996 |
| WO | 9612259 | 4/1996 |
| WO | 9617451 | 6/1996 |
| WO | 9702537 | 1/1997 |
| WO | 9833320 | 7/1998 |
| WO | 9848532 | 10/1998 |
| WO | 9908193 | 2/1999 |
| WO | 9939466 | 8/1999 |

OTHER PUBLICATIONS

Al-Hawamden, et el. "Compound Document Processing System" Sep. 1991, Proceedings of the 15th Annual Int'l Computer Software and Applications Conference.
Jeremy Rosenberg, et al., U.S. Appl. No. 60/187,894, filed Mar. 8, 2000.
David Del Beccaro, et al., U.S. Appl. No. 60/315,046, filed Aug. 28, 2001.
Jeremy Rosenberg, et al., U.S. Appl. No. 10/098,620, filed Mar. 18, 2002.
Jeremy Rosenberg, et al., U.S. Appl. No. 60/390,312, filed Jun. 21, 2002.
Jeremy Rosenberg, et al., U.S. Appl. No. 60/395,360, filed Jul. 12, 2002.
John Feras, U.S. Appl. No. 60/612,618, filed Sep. 24, 2004.
David Del Beccaro, U.S. Appl. No. 10/327,382, filed Dec. 20, 2002, Abandoned.
Jeremy Rosenberg, U.S. Appl. No. 11/002,205, filed Dec. 3, 2004.
Jeremy Rosenberg, U.S. Appl. No. 11/371,946, filed Mar. 10, 2005.
Robert Steinberg, U.S. Appl. No. 11/963,164, filed Dec. 21, 2007.
Jeremy Rosenberg, U.S. Appl. No. 12/003,784, filed Dec. 31, 2007.
Stuart Farber, U.S. Appl. No. 10/976,899, filed Nov. 1, 2004, claims benefit of priority from U.S. Appl. No. 10/383,422.
The Cutting Edge; Hey Juke . . . Take an Old Song and Make It Better by Scott Collins, Copyright 1997 Times Mirror Company, Los Angeles Times, Jan. 27, 1997, 2 pages.
Business Technology; Peering Out a "Real Time"Window by Peter H. Lewis, Copyright 1995 The New York Times Company, Feb. 8, 1995, 3 pages.
Jukebox Music Across Borders, LIB-JUKEBOX/4-1049 Edited Report No. 1, Ed. by Eva Fonss-Jorgensen and Birte Christensen-Dalsgaard, Statsbiblioteket 1995, 33 pages.
IBM Technical Disclosure Bulletin, Multimedia Audio on Demand, authored by IMB TDB, Dutke, K. et al., vol. 37 No. 06B, Jun. 1994, 11 pages.
IEEE Recommended Practices for Broadband Local Area Networks, IEEE Std. 802.7-1989, Oct. 19, 1989, pp. 13-85.
Intermind Announces Approval of First Patent Application, Oct. 7, 1997I Seattle WA, http://www.intermind.com/inside/press_rel/ 100797_allow.html., 3 pages.
Izumo Masanao,e t al., "An Implementation of Audio Push-media System with Handling Capability Request", IPSJ SIG Notes 97 (104), Nov. 7, 1997, pp. 261-266.
Joe Ashbrook Nickell, "Roll Your Own Radio", www.wired.com, Aug. 28, 1998.
Jose Alvear, Q&A with Tim Bratton, President of TuneTo.com, Streaming Media Newsletter, Nov. 23, 1999.
Mary Huhn, "Fed Up With Radio? Create Your Own Online Station", New York Post, Nov. 22, 1998.
Moly Burckhardt, "Imagine Radio Lets You Play Disc Jockey", Morning Call, Aug. 3, 1999.
Niels Rump, "Copyright Protection of Multimedia Data: The 'Multimedia Protection Protocol' (MMP)",I Erlangen, Oct. 15, 1996, 6 pages.
Patricia Smith, "Web Compass Takes Web Searching in the Right Direction", Seybold Report on Desktop Publishing, vol. 10, No. 10, 1996, 9 pages.
QuickTime on the Internet: a QuickTime Technology Brief, Apple Computer, Inc., reference dated Sep. 1997.
Rachel L. Lehmann-Haupt, "Library/Internet Radio: Listeners Take on Role of the DJ", New York Times, Nov. 5, 1998.
Ronald S. Foster, "CATV Systems Are Evolving to Support A Wide Range of Services", Telecommunications, Horizon House Publications, Inc., Jan. 1994, v.28, n 1, p. 95 (3), t5 pages.
Sameer Madan, "Search the Web without a headache", SearchPad Indian Review in PC World (India), Feb. 1998, pp. 40-41.
S. Loeb, "Architecting personalized delivery of multimedia information", Communications of the ACM, vol. 35, No. 12, Dec. 1992, pp. 39-48.
Tat-Seng Chua and Li-Qun Ruan. "A Video Retrieval and Sequencing System", ACM Transactions on Information Systems, vol. 13, No. 4, Oct. 1995, pp. 373-407.
TCT/IP disclosures in Request for Comments (RFC) 1958, Internet Engineering Task Force, B. Carpenter, Jun. 1996.
TCP/IP disclosures in RFC 1122, Internet Engineering Task Force. R. Braden, Oct. 1989.
The Hybrid Home Entertainment Sytems, Altec Lansing Technologies, Inc., Obtained at Comdex (Las Vegas) on Nov. 1997, 8 pages.
Thomas Plagemann et al., "Operating System Support for Multimedia Systems", Computer Communications Journal, Special Issue on Interactive Distributed Multimedia Systems and Telecommunications Services 1998, Elsevier Science, Winter 1999.
Thin-Client/Server Computer, ICA Positioning Paper, Citrix, http:// www.citrix.com/technology/icapos.htm, Mar. 16, 1996, 6 pages.
W. Klippgen, et al., "The Use of Metadata for the Rendering of Personalized Video Delivery", MCL Technical Support, Dec. 1, 1996, 31 pages.
S. Loeb et al., "Lessons from LyricTime: A Prototype Multimedia System" 4th IEEE ComSoc International Workshop on Multimedia Communications, Apr. 1992, pp. 106-113.
G. Miller et al., "News On-Demand for Multimedia Networks," Proceedings of the first ACM international conference on Multimedia, 1993.
H. Wittig, et al, "Intelligent Media Agents in Interactive Television Systems," Proceedings of the International Conference on Multimedia Computer and Systems, 1995, pp. 182-189.
D. Oard et al, "A Conceptual Framework for Text Filtering," Technical Report, University of Maryland, May 1996, pp. 1-32.
R. Dedrick, Interactive Electronic Advertising, IEEE Community Networking Integrated Multimedia Services to the Home, Jul. 1994, pp. 55-66.

M. Lee, et al., "Learning Automated Product Recommendations Without Observable Features: An Initial Investigation," Technical Paper, Carnegie Mellon University, Apr. 1995, pp. 1-35.

B. Sheth, "A Learning Approach to Personalized Information Filtering," Thesis, Massachusetts Institute of Technology, Feb. 1994, pp. 1-75.

Bender News and Movies in the 50 Megabit Living Room, IEEE/IEICE Global Telecommunications Conference, Nov. 1987, vol. 3 of 3, pp. 1976-1981.

Bender, et al., "Newspace: Mass Media and Personal Computing", USENIX, Summer, 1991, pp. 329-348.

Lie, "The Electronic Broadsheet—All the News That Fits the Display," MIT Master's Thesis, pp. 1-96, Jun. 1991.

J. Orwant, "Doppelganger: A User Modeling System," MIT Bachelor's Thesis, Jun. 1991, pp. 1-65.

J. Orwant, "Doppelganger goes to School: Machine Learning for User Modeling," MIT Master of Science Thesis, Sep. 1993, pp. 1-89.

About Intermind's Channel Communications Patents, downloaded from http://www.intermind.com/materials/paten-desc.html on Feb. 27, 1998, 5 pages.

Abstract, "Expansion: Cable's 70 mhz Solution," Broadcasting & Cable. vol. 124, Issue 21, May 23, 1994, p. 80-83, 2 pages.

Angela S. Hinrichs, "An Architecture for Distributing Processing on Realtime Data Streams", MI Department of Electrical Engineering and Computer Science, Jul. 17, 1995, 67 pages.

Anselm Lingnau, et al., "An HTTP-based Infrastructure for Mobile Agents", http://www.w3.org/Conferences/WW4/Papers/150;, Jul. 1995, 15 pages.

Beth Lipton Krigel, "Imagine Radio spinning off", CNET News, Jul. 22, 1998.

C. Schmandt & D. Roy, "Using acoustic structure in a hand-held audio playback device", IBM Systems Journal, vol. 35, Nos. 3&4, 1996, 20 pages.

Csaba J. Egyhazy, et al., "Intelligent Web Search Agents", downloaded from http://csgrad.cs.vt.edu/~tplunket/article-html on Dec. 20, 1999, 3 pages.

David P. Anderson et al., The Continuous Media File System, USENIX, Summer 1992, Jun. 8-Jun. 12, 1992.

Enjoy the Internet, PC Games and More, All on your TV, Wireless PC@TB, downloaded from http://www.rfiinktech.com/pctv.htm on Dec. 15, 1997, 5 pages.

Frequently Asked Questions about Intermind's Patents, downloaded from http://www.intermind.com/materials/paten_faq. html on Feb. 27, 1998, 9 pages.

ICA Positioning Paper, Citrix Systems, Inc., reference dated Mar. 16, 1996, downloaded from http://www.citrix.com/technology/icatech.htm on Dec. 15, 1997, 6 pages.

ICA Technical Paper, Citrix Systems, Inc., reference dated Mar. 16, 1996, downloaded from http://www.citrix.com/technology/icatech.htm on Dec. 15, 1997, 9 pages.

PNRS—Personal News Retrieval System, N. Dimitrova et al., Proceedings of SPIE—The International Society for Optical Engineering, vol. 3846, Sep. 1999.

Defendants' Preliminary Invalidity Contentions filed on Oct. 15, 2009 with U.S. District Court of Southern District of Florida, Miami Division, Case No. 09-20940-CIV—Moreno/Torres.

Defendants' Notice of Filing Defendants' Preliminary Claim Constructions and Preliminary Invalidity Contentions filed on Aug. 14, 2009 with U.S. District Court for the Southern District of Florida, Miami Division, Case No. 08-CV-235343—Jordan/McCaliley.

Sirius Announces New Programming Lineup, Ces, Las Vegas, NV, Jan. 8, 2003, 2 pages.

Sirius Broadcasting New Political Talk and News Shows, Ces, Las Vegas, NV, Jan. 8, 2003, 1 page.

Sirius to Broadcast Exclusive Daily Show with Live Music Performances, Ces, Las Vegas, NV, Jan. 8, 2003, 1 page.

Sirius Announces Exclusive Recording Program, Ces, Las Vegas, NV, Jan. 8, 2003, 1 page.

Arbitron/Edison Media Research, Internet VII, The Internet & Streaming: What Consumers Want Next, Presented by Bill Rose and Larry Rosin, © 2001, 27 pages.

Imagine Radio Hits the Internet 'Airwaves' with 24-Hour News, Talk an Music: Specially designed Tuner allows Users to Customize Their Listening Experience, Los Angeles, Internet World, Booth #51w, Mar. 9, 1998, © 1998 PR Newswire Association, Inc., 3 pages.

Imagine Radio Merges With Music Technology Provider Silver Island; Partnership Gives Listeners Freedom to Build Personalized Radio Formats as Well as Listen to Professionally Programmed Stations, Brisbane and San Francisco, CA, Jul. 22, 1998, © 1998 PR Newswire Association, Inc., 3 pages.

Spring Internet World '98, Attention Online Marketers . . . Drop off your business card at the Imagine Radio booth to be eligible to win free sponsorship of 10,000 listener-hours on Imagine Radio., 2 pages, date unknown.

Fed Up with Radio? Create your own online station., Mary Huhn, Nov. 2, 1998, © 1998 N.Y.P. Holdings, Inc., The New York Post, 2 pages.

Imagine Radio spinning off, Beth Lipton Krigel, Jul. 22, 1998, http://news.cnet.com/Imagine-Radio-spinning-off/2100-1033_3-213613.html?tag=mncol, retrieved May 14, 2010, 3 pages.

Spinning Tunes on the Web: MP3 Music Revolution Cranks Up the Options, Jon Healey, Nov. 9, 2000, © 2000 Los Angeles Times, 4 pages.

Media Merger: Technology Information, Asa Somers, Nov. 1, 2000, © 2000 Gale Group, Inc., © 2000 ZD Net Computer Shopper, 7 pages.

Bits and Hits: Internet Radio Stations Let You Customize Your Own Playlist. But You Don't Have Complete Control., Jon Healey, Jun. 15, 2000, © 2000 Saint Paul Pioneer Press, 3 pages.

The Legal Problems of the MP3, Eric Berger, © 1999 Temple Environmental Law and Technology Journal Fall 1999, © 2010 Thomson Rueters, 27 pages.

Facing the Music on the Internet: Identifying Divergent Strategies for Different Segments of the Music Industry in Approaching Digital Distribution, Ryan S. Henriquez, UCLA Entertainment Law Review Fall 1999 © 1999 Regents of the University of California; © 2010 Thomson Rueters, 51 pages.

New media and intellectual property, Bill Roberts, Nov. 29, 1999, © 1999 Brunico Communications, Inc., Playback, 3 pages.

Media: Web Sites and Recording Labels at Impasse on Fees, Matt Richtel, Nov. 29, 1999, © 1999 The New York Times Company, 3 pages.

Rueters German Advertising & Media Digest-Nov. 26, 1999 © 1999 Factiva, a Dow Jones and Reuters Company, 1999 Reuters Limited, 3 pages.

Intellectual Property Licensing: The Hidden Costs of Internet Radio, Jon Grossman and Eric Oliver, E-Commerce Law Report, Oct. 1999, © 1999 Glasser LegalWorks, 7 pages.

Internet World—Free Internet Radio, Mar. 13, 1998, © 1998 FT Asia Intelligence Wire, 2 pages.

Movie Review: Cast Iron; Acting heavyweights mask the fluffy thrust of familiar swashbuckler; Swashbuckling cast fails to iron out soft 'Mask'; CYBERSCENE; Magnate is magnet for pies, Annette Cardwell, Mar. 13, 1998, © 1998 Boston Herald, Inc., 4 pages.

Internet Killed the Radio Star, Martin J. Garvey, Mar. 16, 1998, © 1998 CMP Media Inc. InformationWeek, 1 page.

News Written by York Membery, Mar. 21, 1998, © 1998 CMP Information Ltd. Music Week, 2 pages.

Now you can connect to radio designed expecially for net; Imagine Radio offers 16 channels of music, plus talk shows and 24-hour news from the Associated Press, Mar. 28, 1998, 1998 Sentinel Communications Co., 3 pages.

Have you listened to your computer lately?, Michel Marriott, Apr. 9, 1998, © 1998 The New York Times Company, 4 pages.

C.A. Eye, edited by Jon W. Sparks, May 13, 1998, © 1998 The Commercial Appeal, 2 pages.

Web radio sites chase ad revenue; Audio messages try to solve banner apathy, Patricia Riedman, May 18, 1998, © 1998 Crain Communications Inc. Advertising Age, 2 pages.

MMM Thinks Globally Via the Internet, Oct. 1999, © 1999 CMP Information Ltd Music Business International, 2 pages.

DIMA and RIAA to go to arbitration, Sep. 22, 1999, © 1999 Informa Publishing Group Plc, 1 page.

Canadians.com: the Internet has long promised vast global opportunities. Finally, Canada's entrepreneurs are taking charge, George Koch, Sep. 1999, © 1999 Micromedia Limited and CB Media Ltd., 9 pages.
Resources on the Web for musicians, Aug. 1999, © 1999 Micromedia Limited and Norris-Whitney Communications Inc., 2 pages.
Net site aims for global database so far, Internet service has been making sweet musicmusicmusic, Andrew Flynn, Jul. 30, 1999, © 1999 Sun Media Corporation London Free Press, 3 pages.
The MP3 Wave; As millions download music off the Net, piracy enforcement flounders, Doug Bedell, Jul. 27, 1999, © 1999 The Dallas Morning News, 5 pages.
Net yourself some great music step right up to the web bar for your listening pleasure and . . . , Andrew Flynn, Jul. 21, 1999, © 1999 Sun Media Corporation The Toronto Sun, 3 pages.
Interactive Radio Creates Canadian Waves Jul. 12, 1999, © 1999 Information Access Company and Newsbytes Inc., 2 pages.
AM-The-Cyberfile, Bgt: Budget: Member photo requested; With Online Menu, QuickFacs; Index; Technology, Entertainment; internet music site aims for global music database, Andrew Flynn, Jun. 30, 1999, © 1999 Press News Limited, 3 pages.
Opinion: MP3s Create New Relationship between Musicians and Fans, Dave Johnson, Jun. 14, 1999, © 1999 Knight Ridder/Tribune Business News and the Gazette, 2 pages.
On-line station makes sonic boom, Jun. 12, 1999, © 1999 Toronto Star Newspapers, Ltd, 3 pages.
Only on the Net, you say? May 22, 1999, © 1999 CanWest Interactive, a division of CanWest Global Communications Corp, The Gazette, 1 page.
Junkies CD available only on Net, May 25, 1999, © 1999 CanWest Interactive, a division of CanWest Global Communications Corp, The Vancouver Sun, 1 page.
Junkies CD available only on Internet, May 20, 1999, © 1999 CanWest Interactive, a division of CanWest Global Communications Corp, Calgary Herald, 1 page.
Junkies CD available only on Web, May 20, 1999, © 1999 Sun Media Corporation, 1 page.
Radio Renaissance, May 20, 1999, © 1999 Toronto Star Newspapers, Ltd., 6 pages.
New Cowboy Junkies CD only available on Net, May 20, 1999, © 1999 Factiva, a Dow Jones and Reuters Company, © 1999 all material (c) YYYY Thomson Canada Limited or its licensors, 1 page.
Record Producer Dies, May 19, 1999, © 1999 Toronto Star Newspapers, Ltd., 2 pages.
RIAA Strikes 1st Pact for Web Radio License, Irv Lichtman, May 15, 1999, © 1999 Billboard Publications, Inc., 2 pages.
Audio Notes Section, May 10, 1999, © 1999 Warren Publishing, Inc. Audio Week, 1 page.
New Media Section, May 6, 1999, © 1999 Warren Publishing, Inc., Communications Daily, 1 page.
RIAA, Radio Moi ink first pact for Webcase license, Adam Sandler, May 5, 1999, © 1999 Reed Elsevier Inc., Daily Variety, 2 pages.
Recording industry shuns Internet 'radio station': Musicmusicmusic.com just one crest in looming tidal wave of change in the music industry, Chris Fournier, Apr. 12, 1999, © 1999 CanWest Interactive, a division of CanWest Global Communications Corp, 3 pages.
Music Unbound, Imagine Radio Launches, http://www.musicunbound.com/archive/art08.html, downloaded Sep. 2, 2010, 45 pages.
Billboard Magazine, Webcasting the Internet, Virtual Radio Broadcasts and Concerts Via the Web Deliver Music to Your Door—or Desk by Doug Reece, Jul. 18, 1998, 1 page.
Facing the Music, Gerry Blackwell, Jan. 21, 1999, © 1999 Toronto Star Newspapers, Ltd., 7 pages.
Canada, Sep. 23, 1998, © 1998 Informa Publishing Group Plc, 1 page.
Getting Tuned in to Internet Radio Sites, Charles Roberts, Sep. 18, 1998, © 1998 Sentinel Communications Co., 2 pages.
Online, Apr. 22, 1998, © 1998 BPI Communications, Inc., The Hollywood Reporter, 2 pages.
GoldRush 2.0, Wolfgang Spegg's online enterprise is on the brink of something big if it can hang on a little longer, Susanne Baillie, Mar. 2002, © 2002 Micromedia Limited and CB Media Ltd., 2 pages.

musicmusicmusic inc.'s RadioMOI subscription site launch exceeds initial projections, Jan. 21, 2002, © 2002 Canada NewsWire Ltd., 2 pages.
musicmusicmusic inc.'s RadioMOI subscription site launch exceeds initial projections, Jan. 21, 2002, © 2002 PR Newswire Association, Inc., 2 pages.
musicmusicmusic inc to include Radio MOI.com's web radio services in upcoming on-demand Jukebox site, Oct. 30, 2001, © 2001 Canada NewsWire Ltd., 2 pages.
musicmusicmusic inc to include Radio MOI.com's web radio services in upcoming on-demand Jukebox sit, Oct. 30, 2001, © 2001 PR Newswire Association, Inc., 2 pages.
United States Securities and Exchange Commission, Form 8-K, Current Report Pursuant to Section 13 or 15(d) of the Securities Exchange Act of 1934 for RealNetworks, Inc., Feb. 7, 2008, 29 pages.
Architecting Personalized Delivery of Multimedia Information, Shoshana Loeb, Communications of the ACM, Dec. 1992, vol. 35, No. 12, pp. 39-48.
Zamora Radio, LLC v. Pandora Media, Inc. et al., Plaintiff's Original Complaint for Patent Infringement, United States District Court, Southern District of Florida, Civil Action No. 09-20940, entered May 10, 2009, 31 pages.
Zamora Radio, LLC v. Pandora Media, Inc. et al., Defendant Pandora Media, Inc. Answer and Affirmative Defenses, United States District Court, Southern District of Florida, Civil Action No. 09-20940, entered May 11, 2009, 23 pages.
Zamora Radio, LLC v. Pandora Media, Inc. et al., Defendant Pandora Media, Inc.'s First Amended Answer and Counterclaims, United States District Court, Southern District of Florida, Civil Action No. 09-20940, entered Jan. 6, 2010, 32 pages.
Zamora Radio, LLC v. Pandora Media, Inc. et al., Claim Construction Order, United States District Court, Southern District of Florida, Civil Action No. 09-20940, entered Mar. 9, 2010, 18 pages.
Fowler Woods, LLC, v. Pandora Media, Inc., et al., Plaintiff's Original Complaint, United States District Court for the Eastern District of Texas, Marshall Division, Civil Action No. 2:10-cv-00035-TJW filed Feb. 1, 2010, 22 pages.
Fowler Woods, LLC, v. Pandora Media, Inc., et al., Unopposed Motion to Dismiss, United States District Court for the Eastern District of Texas, Marshall Division, Civil Action No. 2:10-cv-00035-TJW filed Feb. 26, 2010, 3 pages.
Quito Enterprises, LLC v. Pandora Media, Inc. et al., Plaintiff's Original Complaint for Patent Infringement, United States District Court for Southern District of Florida, Miami Division, Civil Action No. 08-23543, entered Dec. 26, 2008, 69 pages.
Quito Enterprises, LLC v. Pandora Media, Inc. et al., Defendants' Notice of Filing Defendants' Preliminary Claim Constructions and Preliminary Invalidity Contentions, United States District Court for Southern District of Florida, Miami Division, Civil Action No. 08-23543, entered Aug. 14, 2009, 149 pages.
Quito Enterprises, LLC v. Pandora Media, Inc. et al., Answer to Defendant Pandora Media, Inc. to Quito Enterprises LLC's First Amended Complaint, United States District Court for the Southern District of Florida, Miami Division, Civil Action No. 08-23543, entered Sep. 3, 2009, 22 pages.
Quito Enterprises, LLC v. Pandora Media, Inc. et al, Defendants' Motion for Summary Judgment of Invalidity, United States District Court for Southern District of Florida, Miami Division, Civil Action No. 08-23543, entered Sep. 30, 2009, 48 pages.
Quito Enterprises, LLC v. Pandora Media, Inc. et al., Answer of Defendant Pandora Media, Inc., United States District Court for Southern District of Florida, Miami Division, Civil Action No. 08-23543, entered Feb. 19, 2009, 18 pages.
Quito Enterprises, LLC v. Pandora Media, Inc. et al., Order Dismissing Case Against Pandora Media With Prejudice, United States District Court for Southern District of Florida, Miami Division, Civil Action No. 08-23543, entered Jan. 27, 2010, 1 page.
Moaec, Inc. v. Pandora Media, Inc. et al., Complaint, United States District Court for Western District of Wisconsin, Civil Action No. 07-C-0654-S, filed Nov. 16, 2007, 342 pages.

*Moaec, Inc.* v. *Pandora Media, Inc. et al.*, Answer of Defendant Pandora Media, Inc., United States District Court for Western District of Wisconsin, Civil Action No. 07-C-0654-S, filed Jan. 4, 2008, 16 pages.
*Moaec, Inc.* v. *Pandora Media, Inc. et al.*, First Amended Answer of Defendant Pandora Media, Inc., United States District Court for Western District of Wisconsin, Civil Action No. 07-C-0654-S, filed Feb. 8, 2008, 19 pages.
*Moaec, Inc.* v. *Pandora Media, Inc. et al.*, Motion of Defendant Napster for Partial Summary Judgment of Patent Invalidity, United States District Court for Western District of Wisconsin, Civil Action No. 0-7-C-0654-S, filed Apr. 15, 2008, 2 pages.
*Moaec, Inc.* v. *Pandora Media, Inc. et al.*, Brief in Support of Motion of Defendant Napster for Partial Summary Judgement of Patent Invalidity, United States District Court for Western District of Wisconsin, Civil Action No. 07-C-0654-S, filed Apr. 15, 2008, 9 pages.
*Moaec, Inc.* v. *Pandora Media, Inc. et al.*, Defendants Pandora Media, Inc. and Napster LLC's Joint Motion for Summary Judgment of Invalidity, United States District Court for Western District of Wisconsin, Civil Action No. 07-C-0654-S, filed Nov. 21, 2008, 4 pages.
*Moaec, Inc.* v. *Pandora Media, Inc. et al.*, Opinion and Order, United States District Court for Western District of Wisconsin, Civil Action No. 07-C-0654-S, filed Apr. 8, 2009, 49 pages.
*Moaec, Inc.* v. *Pandora Media, Inc. et al.*, Order, United States District Court for Western District of Wisconsin, Civil Action No. 07-C-0654-S, filed Apr. 30, 2009, 1 page.
Civil Docket for Case #: 2:10-cv-00035-JTW, *Fowler Woods LLC* v. *Internet Radio, Inc. et al.*, U.S. District Court, Eastern District of Texas (Marshall), retrieved online Mar. 22, 2010.
Civil Docket for Case #: 3:07-cv-00654-mfk, *Moaec, Inc.* v. *Musicip corporation et al*, U.S. District Court, Western District of Wisconsin (Madison), retrieved online Mar. 22, 2010.
Civil Docket for Case #: 1:08-cv-23543-AJ, *Quito Enterprises, LLC* v. *Netflix, Inc. et al.*, U.S. District Court, Southern District of Florida (Miami), retrieved online Mar. 22, 2010.
Civil Docket for Case #: 1:09-cv-20940-EGT, *Zamora Radio, LLC* v. *Last.fm, Ltd., et al.*, U.S. District Court, Southern District of Florida (Miami), retrieved online Mar. 22, 2010.
Federal Document Clearing House, © 1998, Testimony Jul. 23, 1998, Senate Judiciary, © 2010 Thomson Reuters, 6 pages.
Federal Document Clearing House, © 1998, Testimony Jun. 5, 1998, House of Representatives Commerce Telecommunications, Trade and Consumer Protection, © 2010 Thomson Rueters, 9 pages.
Internet Radio 'Stations' Start Today, Laura Evenson, Mar. 9, 1998, © 1998 The Chronicle Publishing Co., 2 pages.
Specially Designed 'Tuner' Allows Users to Customize Their Listening Experience, Los Angeles, Internet World, Booth #512, Mar. 9, © 1998 PR Newswire Association, Inc., Mar. 11, 1998, 4 pages.
Sirius Hits a Home Run With Major League Baseball on Stream 120, ESPN Radio, New York, NY, Mar. 19, 2003, 1 page.
Former top-rated channel MediAmazing shuts down!, Kurt Hanson, Radio and Internet Newsletter, Sep. 3, 2001, http://web.archieve.org/web/d20030214195130/http://www.kurthanson.com/archieve/news/09, retrieved Apr. 21, 2010, 7 pages.
BRS Media, Inc.—Program on Air & Online!, New & Press Releases, © 1995-2008 BRS Media, Inc., http://www.brsmediafm/pr.html, retrieved Apr. 21, 2010, 10 pages.
Beat Bots: It's digital vs. human deejays on the Web. So far, the hard discs have it., Noah Robischon, Oct. 15, 1999, © 1999 Time Inc., Entertainment Weekly, 2 pages.
Imagine Radio Lets You Play Disc Jockey, Molly Burckhardt, Aug. 3, 1999, Fifth Edition, © 1999 The Morning Call, Inc., (Allentown, PA), 2 pages.
Rise of the Personalized Web Portals, Peter Jasco, Jul. 1, 1999, © 1999 Gale Group, Inc., © 1999 Information Today, Inc., 3 pages.
Record-Setting RealNetworks Conference & Exhibition '99; Mor Than 3,500 Attendees and Industry Leaders Contributed to the Success of the Third Annual Conference & Exhibition; Winner of the Streamers Awards Surfer's Choice Award Received over 1,400 On-Line Public Votes, Seattle, May 17, 1999, © 1999 PR Newswire Association, Inc., 3 pages.
RadioNet set to blast Partnerships signal changes of traditional listening, Paul Davidson, Apr. 28, 1999, Final Edition, © 1999 Gannett Company, Inc., USA Today, 6 pages.
Internet radio prompts amateur disk jockeys to take the air, Brian Lee, The Daily Campus, © 1999 The Daily Campus via U-Wire, University Wire, 2 pages.
Imagine That, David MacDougall, Apr. 1, 1999, Preview Edition, © 1999 The Post and Courier (Charleston, SC), 2 pages.
RealNetworks Announces Second Annual Awards for Excellence in Streaming Media; Distinguished Panel of Judges Choose Winners Based on Nominees Viewed and Voted on by Web Audience; Winners Announced at RealNetworks' Conference and Exhibit '99, Seattle, Feb. 16, 1999, © 1999 PR Newswire Association, Inc., 3 pages.
The 1999 Webby Awards Reveal Nominees for the Best Web Sites of the Year, Jan. 6, 1999, © 199 Business Wire, Inc., 4 pages.
Bop to beat of your own drummer, Dec. 8, 1998 Morning Edition, © 1998 Orange County Register, 2 pages.
Internet radio may threaten traditional broadcasters, Alastair Goldfisher, Nov. 30, 1998, © 1998 UMI, Inc, © American City Business Journals Inc.1998, 2 pages.
Over 5,000 Public Radio Stations Now Available at Imagine Radio—Equaling the Number of Commercial FM Radio Stations Available in the United States, Nov. 23, 1998, © 1998 PR Newswire Association, Inc., 2 pages.
Music industry to webcasters: Pay up!, Janelle Brown, Nov. 9, 1998, © 1998 Salon.com, Inc., 4 pages.
Internet Radio Clash—Webcasters, Broadcasters and the Recording Industry Negotiate New Rules for Licensing the Music Played Over the Internet, Doug Reece, Nov. 7, 1998, © 1998 Billboard Publications, Inc., 3 pages.
Sony & RealNetworks Debut Online Jukebox, Nov. 2, 1998, © 1998 FT Asia Intelligence Wire, © 1998 Newsbytes, 2 pages.
Cutting Edge: New 'Toolkit' Could Boost Online Radio; Internet: Realnetworks' Technology Lets Programmers Mix Full-Length Songs, Music Videos and Other Features, Leslie Helm, Nov. 2, 1998, Home Edition, © 1998 The Times Mirror Company; Los Angeles Times, 3 pages.
Getting Tuned in to Internet Radio Sites, Charles Roberts, Sep. 18, 1998, Metro, © 1998 Sentinel Communications Co., Orland Sentinel, 2 pages.
Over 75 Industry Leaders to Participate in Webnoize '98; A Full Three-Day Agenda Makes Conference, Scheduled for Nov. 2-4 in L.A., a Must-Attend Event for Music Industry, Aug. 27, 1998, © 1998 Business Wire, Inc., 2 pages.
Imagine Radio Debuts a New Generation of Customized Radio; New Web Interface and Enhanced Personalization Features Empower Users to Become Their Own Deejay, Aug. 24, 1998, © 1998 PR Newswire Association, Inc., 3 pages.
Web users—also Buyers Aug. 24, 1998, CBS.MarketWatch.com, Aug. 24, 1998, © 1998 MarketWatch.com Inc., 3 pages.
Imagine That, Aug. 24, 1998, © 1998 Gale Group, Inc., © 1998 VNU Business Media, ADWEEK Western Edition, 1 page.
IQ News: @ deadline, Radio Shack Search, Aug. 24, 1998, National Features Edition, © 1998 A/S/M Communications, Inc. ADWEEK, 1 page.
Microsoft Rolls Out Revamped Sidewalk, Aug. 24, 1998, © 1998 Crain Communications Inc., Advertising Age, 2 pages.
Radio's Star is on the Rise—This Time in Cyberspace, L.A. Lorek, Aug. 2, 1998, © 1998 Sun-Sentinel Company, 2 pages.
Frost & Berman M&A Recap—Jul. 27, 1998, © 1998 Phillips Business Information, Inc., Multimedia Wire, 6 pages.
IQ News: bits, Jul. 27, 1998; National Features Edition, © 1998 A/S/M Communications, Inc. ADWEEK, 2 pages.
Internet radio and music pioneers tune up to play duet, Adam Feuerstein, Jul. 24, 1998, © 1998 UMI Inc.: California Business Times Inc., 2 pages.
Radio Stations Make Waves on the Web, William M. Bulkeley, Jul. 23, 1998, The Wall Street Journal, © 1998, Dow Jones & Company, 4 pages.
Too Many Sites, Too Little Time? 'Secrets', Paul Kyber, Jun. 11, 1998, © 1998 The Richmond Times Dispatch, 2 pages.

Imagine Radio and CDnow Team Up for E-Commerce Partnership, May 18, 1998, © 1998 Financial Times Information, © 1998 PR Newswire, 2 pages.

Sirius Closes $1.2 Billion Recapitalization and Raises $200 Million, New York, NY, Mar. 7, 2003, 1 page.

Sirius Announces Successful Exchange Offer, New York, NY, Mar. 5, 2003, 1 page.

Sirius Stockholders Approve $1.2 Billion Recapitalization, New York, NY, Mar. 4, 2003, 1 page.

Sirius Begins Shipping Second Generation Chipsets, New York, NY, Feb. 28, 2003, 1 page.

Sirius Satellite radio Arrives at Chrysler, Dodge and Jeep® Dealerships Nationwide, Auburn Hills, Mich., date unknown.

It's_On: Sirius Launches New Brand Campaign, New York, NY, Feb. 3, 2003, 1 page.

Sirius and NBA Team Up to Offer NBA Games Nationwide Through Satellite Radio, New York, NY, Jan. 21, 2003, 1 page.

Sirius Launches Exchange Offer for Outstanding Debt, New York, NY, Jan. 30, 2003, 2 pages.

FCC Approves Sirius' Application Relating to Recapitalization, New York, NY, Jan. 15, 2003, 1 page.

Sirius Now Available in BMW 3 Series, 5 Series, and X5 Vehicles, Wood Cliff Lake, NJ and New York, NY, Jan. 9, 2003, 1 page.

Sirius Conducts First-Ever Live Broadcast of Video Over Satellite Radio System, Ces, Las Vegas, NV, Jan. 8, 2003, 1 page.

Sirius Showcases New Products for Satellite Radio at Consumer Electronics Show, Ces, Las Vegas, NV, Jan. 8, 2003, 2 pages.

Sirius Available for Hertz Customers in Las Vegas, Phoenix, Denver, Ces, Las Vegas, NV, Jan. 8, 2003, 1 page.

* cited by examiner

METHODS AND SYSTEMS FOR UTILIZING CONTEXTUAL FEEDBACK TO GENERATE AND MODIFY PLAYLISTS

This application is a continuation-in-part of U.S. patent application Ser. No. 11/279,567, filed Apr. 13, 2006, which is a continuation-in-part of U.S. patent application Ser. No. 11/295,339, filed Dec. 6, 2005, which is a continuation-in-part of U.S. patent application Ser. No. 10/150,876, filed May 16, 2002, now U.S. Pat. No. 7,003,515. This application also claims priority to provisional U.S. Patent Application Ser. No. 60/291,821, filed May 16, 2001. The entire disclosures of U.S. patent application Ser. Nos. 11/279,567, 11/295,339, 10/150,876 and 60/291,821 are hereby incorporated by reference.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE EMBODIMENTS OF THE INVENTION

Embodiments of the invention are directed to methods and systems for utilizing contextual feedback to generate and modify playlists.

BACKGROUND OF THE EMBODIMENTS OF THE INVENTION

Automated techniques exist for identifying items that a consumer might enjoy in view of other items the consumer has previously indicated he or she enjoys. Some such techniques compare attributes of items the consumer previously indicated he or she enjoys with attributes of other items to identify items that the consumer might enjoy. Thus, for example, if the consumer enjoys "Dubliners" by James Joyce, "Ulysses" by James Joyce might be identified as another item the consumer may enjoy because both "Dubliners" and "Ulysses" have a common attribute (the author, James Joyce).

Other automated techniques utilize collaborative methods to identify items that the consumer might enjoy. For example, consumers who enjoyed "The Da Vinci Code" by Mark Brown might indicate that they also enjoyed "The Catcher in the Rye" by J. D. Salinger. Accordingly, if the consumer indicates that he or she enjoys "The Da Vinci Code," "The Catcher in the Rye" would be identified as another item the consumer would enjoy because other consumers who enjoyed "The Da Vinci Code" indicated that they enjoyed "The Catcher in the Rye."

One problem with these techniques is that they neglect the context of the attributes or information used to identify items that the consumer might enjoy. For example, consumers who enjoyed "The Da Vinci Code" and who indicated that they also enjoyed "The Catcher in the Rye" might only have enjoyed "The Catcher in the Rye" because they read "Dubliners," which is written in a similar stream-of-consciousness style, immediately before "The Catcher in the Rye." If so, then a recommendation such as "If you like 'The Da Vinci Code,' then you'll also like 'The Catcher in the Rye'" may not be helpful to the consumer.

This problem also arises where the items are musical compositions. For example, radio station listeners may enjoy the song "House of the Rising Sun" by The Animals after the song "Stairway to Heaven" by Led Zeppelin, but not after the song "Aqualung" by Jethro Tull. However, existing automated techniques are only able to determine, for example, that radio station listeners who like "Stairway to Heaven" and "Aqualung" also like "House of the Rising Sun." Accordingly, existing automated techniques cannot, for example, help create radio station playlists that account for listener preferences as to the context of a particular musical composition. Accordingly, there exists a need for methods and systems for using contextual information to generate and modify playlists that do account for such listener preferences.

BRIEF SUMMARY OF EMBODIMENTS OF THE INVENTION

Embodiments of the invention are directed to methods and systems for using contextual information to generate and modify playlists. For example, one embodiment of the invention includes the steps of storing feedback from at least one user about a first content object; storing contextual information relating to the feedback; retrieving the feedback and contextual information; and generating a playlist of content objects using the feedback and contextual information.

Another embodiment of the invention includes the steps of comparing an input seed to a first database item, wherein the first database item corresponds to a first content object; retrieving contextual information relating to the first content object; and selecting the first content object for the playlist based on the comparison and the contextual information. In other embodiments of the invention, computer-executable instructions for implementing the disclosed methods are stored as control logic or computer-readable instructions on computer-readable media, such as an optical or magnetic disk.

Other details features and advantages of embodiments of the invention will become apparent with reference to the following detailed description and the figures.

DETAILED DESCRIPTION OF EMBODIMENTS OF THE INVENTION

Figure 1:
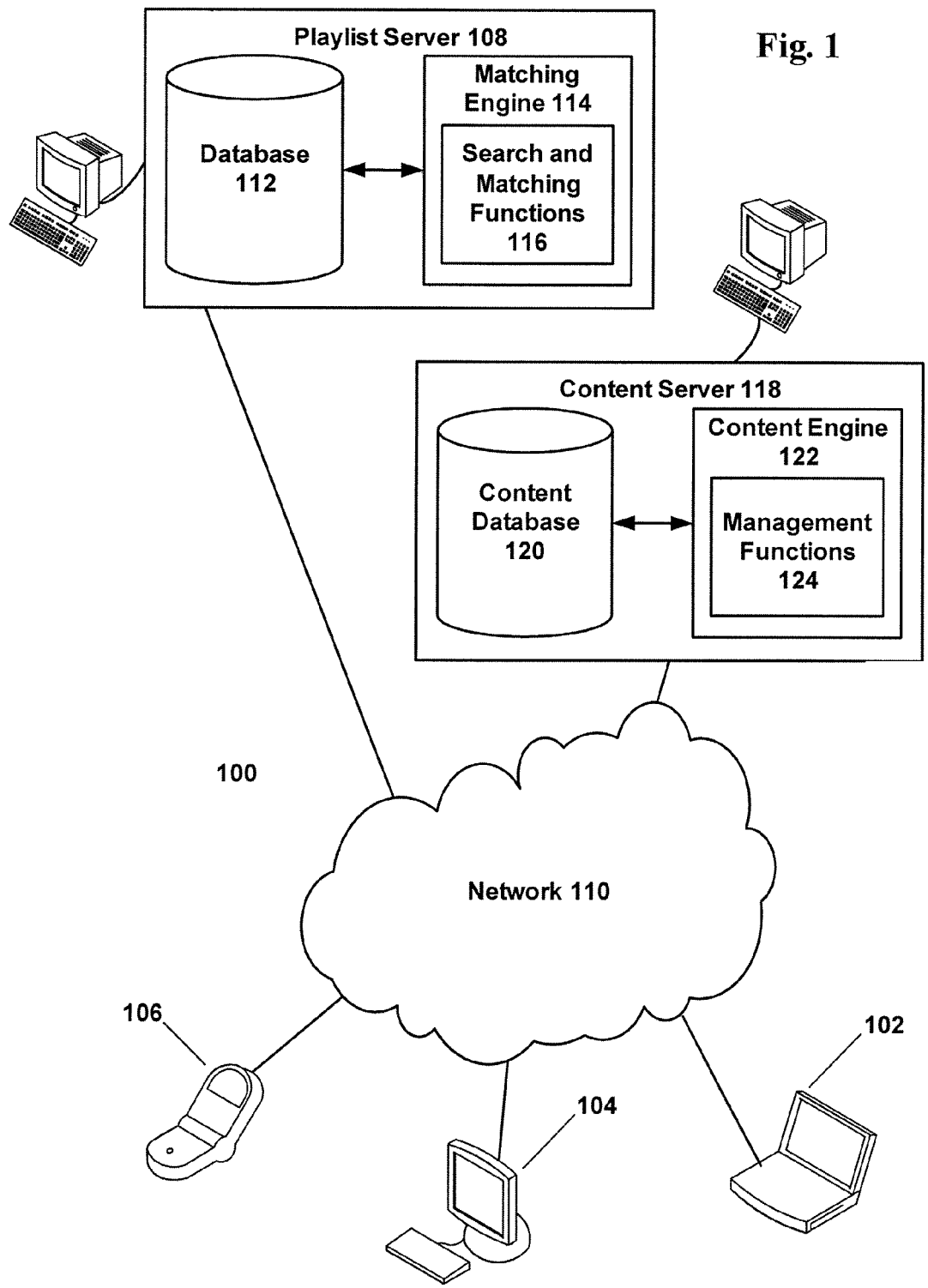
FIG. 1 depicts an exemplary operating environment for an embodiment of the invention.

FIG. 1 depicts a diagram of exemplary system 100 that may be used to implement embodiments of the invention. A plurality of terminals, such as terminals 102, 104 and 106, coupled to playlist server 108 and content server 118 via network 110. In another embodiment, playlist server 108 and content server 118 may be the same server performing all functions of playlist server 108 and content server 118. Terminals 102, 104 and 106, playlist server 108 and content server 118, may include a processor, memory and other conventional electronic components and may be programmed with processor-executable instructions to facilitate communication via network 110 and perform aspects of the invention.

One skilled in the art will appreciate that network 110 is not limited to a particular type of network. For example, network 110 may feature one or more wide area networks (WANs), such as the Internet. Network 110 may also feature one or more local area networks (LANs) having one or more of the well-known LAN topologies and the use of a variety of different protocols on these topologies, such as Ethernet, TCP/IP, Frame Relay, Ethernet, FTP, HTTP and the like, is presumed. Moreover, network 110 may feature a Public Switched Telephone Network (PSTN) featuring land-line and cellular telephone terminals, or else a network featuring a combination of any or all of the above. Terminals 102, 104 and 106 may be coupled to network 110 via, for example, twisted pair wires, coaxial cable, fiber optics, electromagnetic waves or other media.

In one embodiment of the invention, playlist server 108 contains a database of items 112. Alternatively, playlist server 108 may be coupled to database of items 112. For example, playlist server 108 may be coupled to a "MUSIC GENOME PROJECT" database as described in U.S. Pat. No. 7,003,515. Playlist server 108 may also contain or be coupled to matching engine 114. Matching engine 114 utilizes an associated set of search and matching functions 116 to operate on the database of items 112. In an embodiment of the invention used with the "MUSIC GENOME PROJECT" database, for example, matching engine 114 utilizes search and matching functions implemented in software or hardware to effectively calculate the distance between a source song and other songs in the database (as described here and in U.S. Pat. No. 7,003, 515), and then sorts the results to yield an adjustable number of closest matches.

In one embodiment of the invention, content server 118 contains a database of content objects 120. Alternatively, content server 118 may be wholly or partially integrated with playlist server 108, or separately coupled to a database of content objects 120. Content server 118 may also contain or be coupled to content engine 122. Content engine 122 utilizes an associated set of management functions 124, such as standard finding, packaging and sending functions, to operate on the database of content objects 122. In one embodiment of the invention, for example, content engine 122 utilizes management functions implemented in software or hardware to control the transmission of content objects by, for example, streaming and/or downloading to terminals 102, 104 and 106.

Terminals 102, 104 and 106 feature user interfaces that enable users to interact with server 108. The user interfaces may allow users to utilize a variety of functions, such as displaying information from playlist server 108, requesting additional information from playlist server 108, customizing local and/or remote aspects of the system and controlling local and/or remote aspects of the system. Terminals 102, 104 and 106 can be operated in a client-server configuration to permit a user to retrieve web pages from playlist server 108. Furthermore, any of various conventional web browsers can be used to display and manipulate data on the web pages.

Figure 2A:
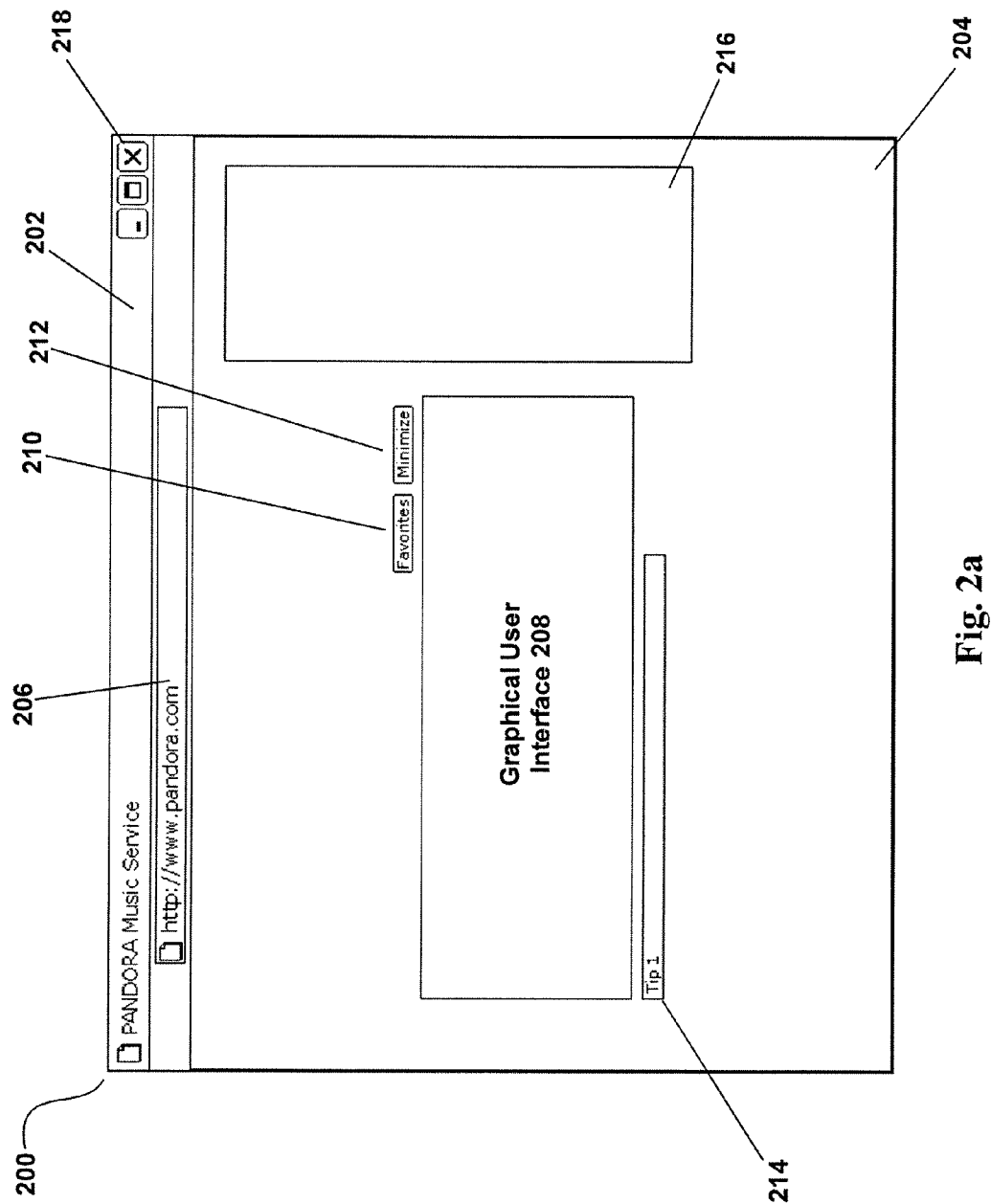
FIGS. 2a and 2b depict terminal-based displays for presenting and providing content to a user in accordance with embodiments of the invention.

FIG. 2a depicts terminal-based display 200 for presenting and providing content to a user in accordance with an embodiment of the invention. Terminal-based display 200 may comprise, for example, a web browser window 204 displayed on terminal 102 (FIG. 1) running an operating system such as "WINDOWS" from Microsoft Corp. In this embodiment, terminal 102 is configured as the client in a client/server relationship with playlist server 108 and content server 118.

A user of terminal 102 establishes a client/server relationship with playlist server 108 by inputting the appropriate URL in address field 206 (in this case, the URL is "http://www.pandora.com"). In response, web page 204 is retrieved from playlist server 108. In this embodiment, web page 204 features graphical user interface 208 (shown in more detail in, e.g., FIG. 3d), "favorites" button 210, "minimize" button 212, tip 214 and advertisement 216.

Figure 2B:
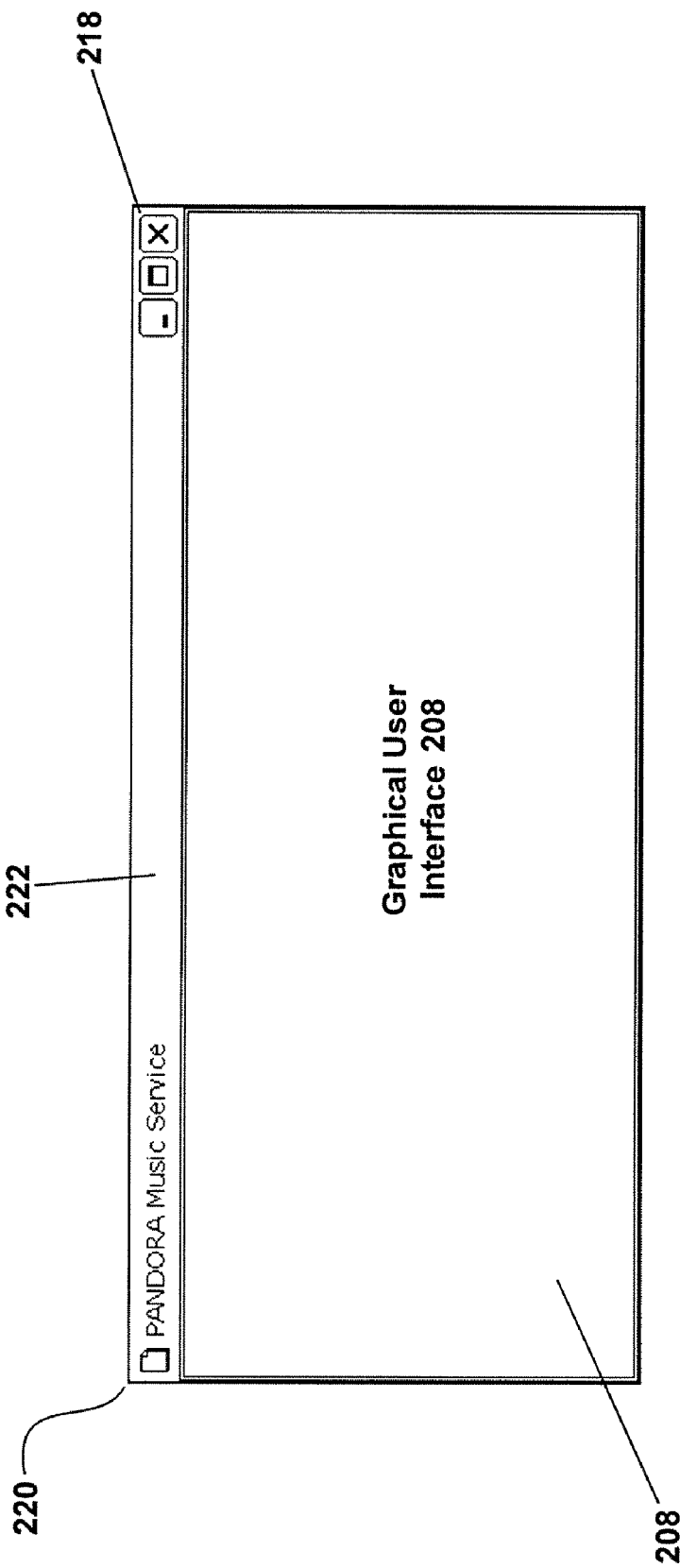

In this embodiment, the user's selecting of "minimize" button 212 (such as by clicking a mouse button while the mouse pointer is over "minimize" button 212) removes graphical user interface 208 from web page 204 and results in the creation of terminal-based display 220 shown in FIG. 2b. Terminal-based display 220 presents and provides content to a user in accordance with another embodiment of the invention. Specifically, terminal-based display 220 may comprise, for example, a web browser window 222 featuring graphical user interface 208 without, for example, "favorites" button 210, "minimize" button 212, tip 214 and advertisement 216. Terminal-based display 220 is smaller than terminal-based display 200 and thus better preserves desktop display resources. In a web page replacing web page 204, the user is given the option to return graphical user interface 208 to terminal-based display 200. The user of terminal 102 may discontinue the client/server relationship with playlist server 108 by selecting "close window" button 218. To the extent the user later opens a new web browser window and reestablishes a client/server relationship with playlist server 108, playlist server 108 recognizes the user as a result of well-known schemes such as "cookies" and thus retains any customized user preferences or settings when web page 204 is retrieved and graphical user interface 208 is restarted.

In this embodiment, tip 214 enhances the user-friendliness of graphical user interface 208 by providing information to the user regarding how to use graphical user interface 208. For example, tip 214 may state "Use thumbs up/thumbs down to tune your stations. Click here to learn more." To the extent the user clicks the hypertext link "Click here," another web page is retrieved providing more detailed information about how to tune stations. Tip 214 may also advertise career opportunities or display other information. In another embodiment, tip 214 may be provided in connection with terminal-based display 220.

In this embodiment, advertisement 216 may comprise a standard paid "banner" advertisement for a third party in any configuration on web page 204. Advertisement 216 may generate royalty revenue or other income for the operator. In one embodiment, the type of advertisement 216 presented to the user on web page 204 depends on various criteria, including but not limited to input, feedback and other information provided by the user, the location of the user's IP address, and other information such as the time of day or year.

FIGS. 3a-3d depict in more detail graphical user interface 208 (FIGS. 2a and 2b) in various stages of operation and in accordance with an embodiment of the invention. Graphical user interface 208 is provided through playlist server 108 (FIG. 1) and may be implemented through, for example, Java, JavaScript, XML, Flash or HTML.

Figure 3A:
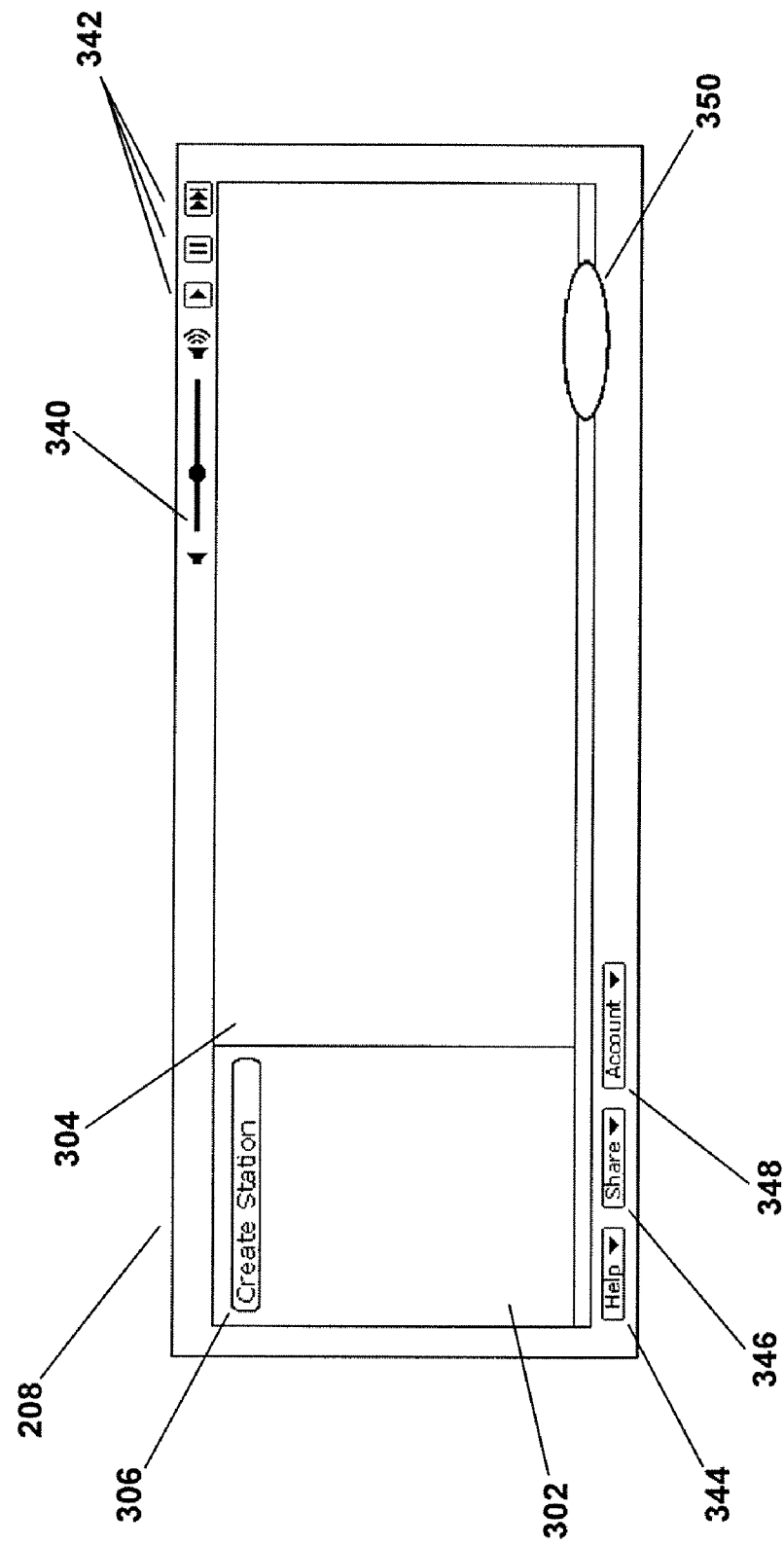
FIGS. 3a-3d depict in more detail the graphical user interface of FIGS. 2a and 2b in various stages of operation and in accordance with an embodiment of the invention.
Figure 3B:
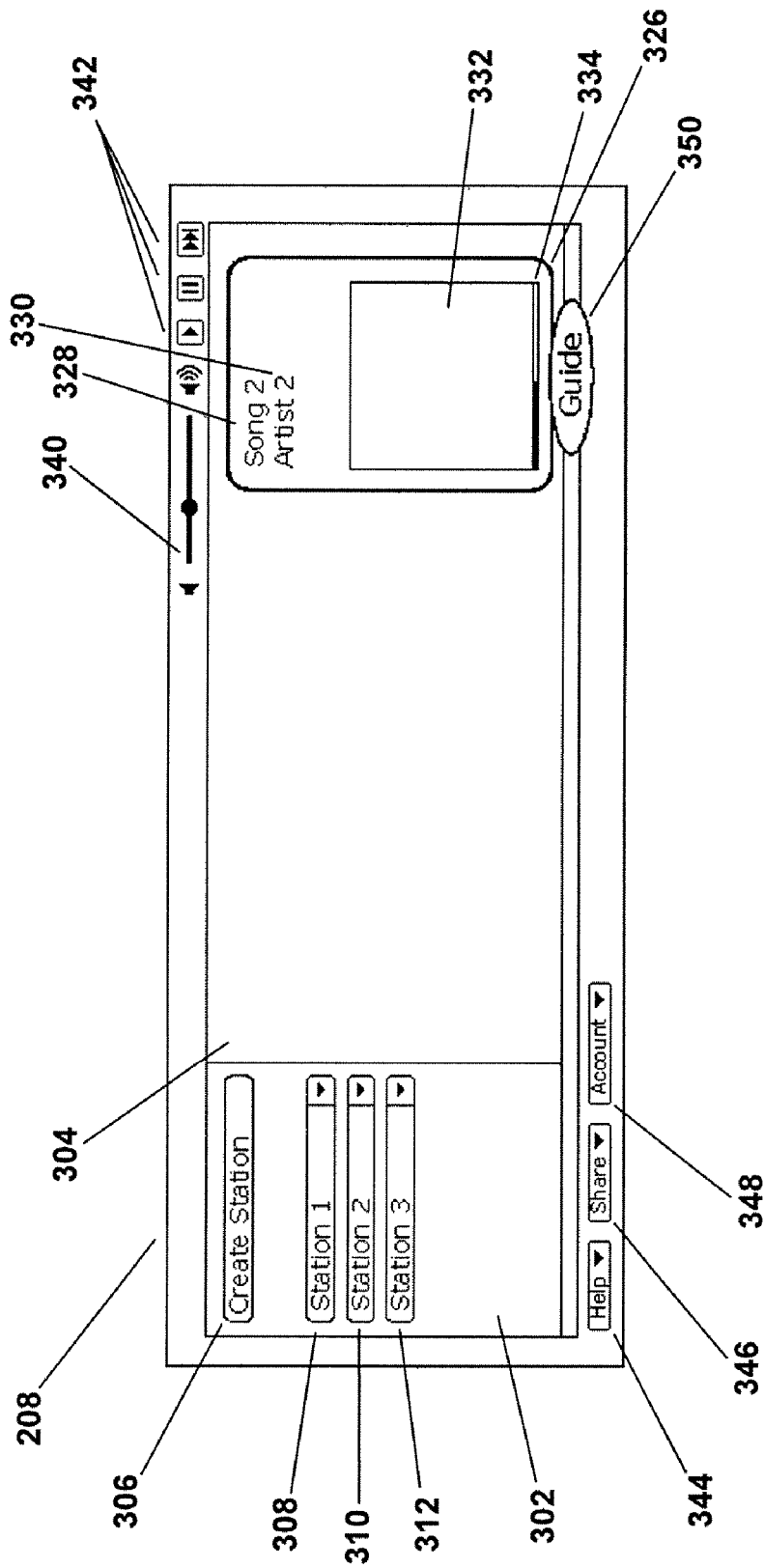
Figure 3C:
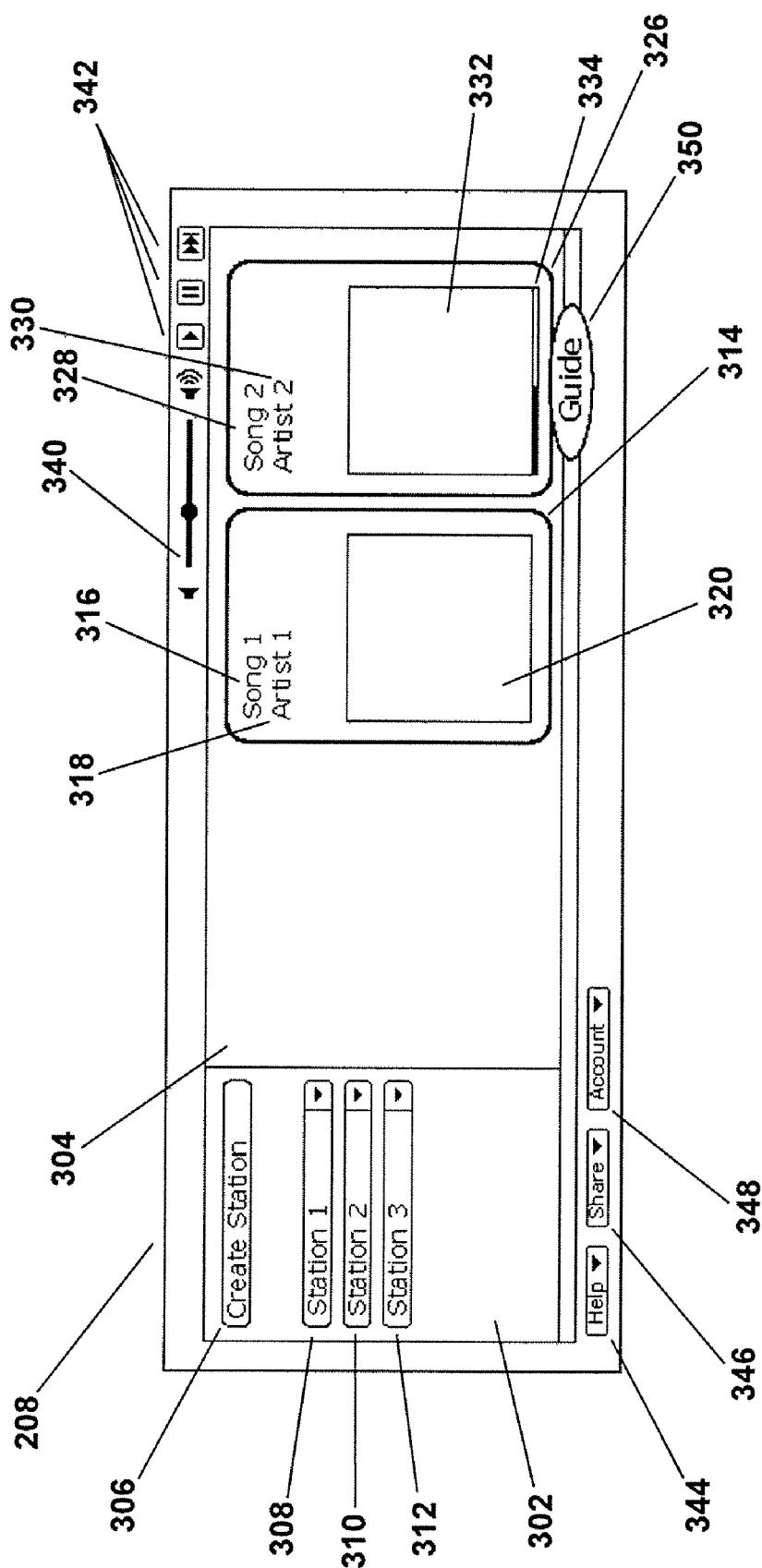

Turning to FIG. 3c, graphical user interface 208 features station panel 302 and playlist panel 304. Other embodiments may have more or less panels. Station panel 302 features "Create Station" button 306 and "Station 1," "Station 2" and "Station 3" buttons 308, 310 and 312.

As will be described further below, "Create Station" button 306 initiates the generation of a station (e.g., a station corresponding to "Station 1" button 308) corresponding to an input seed, such as a song name or artist name, selectively provided by the user. The station facilitates the providing of content to the user that, for example, corresponds to a playlist generated as a result of a comparison of the input seed to musicological attributes of other songs. Thus, for example, the user could input "Miles Davis" and a "Miles Davis station" would be created that facilitates the providing of content to the user that corresponds to "Miles Davis" songs or songs that are musicologically similar to songs by "Miles Davis."

In this embodiment, playlist panel 304 visually represents to the user a playlist of content objects such as songs, the first song of which corresponds to first graphic element 314 and the second song of which corresponds to second graphic element 326. First graphic element features corresponding song text 316, artist text 318 and content art 320, while second graphic element 326 features corresponding song text 328, artist text 330 and content art 332. Corresponding song text 316 and 328, as well as corresponding artist text 318 and 330 may additionally comprise hypertext links that provide additional information, such as background knowledge about an artist or song. Corresponding content art 320 and 332 may comprise, for example, a picture of an album cover.

Other embodiments of first graphic element 314 or second graphic element 326 may feature additional or fewer components than the embodiment that has been described. Other types of components include "purchase" buttons, advertisements, feedback indicators (such as feedback indicator 336 in FIG. 3d) and links to additional services and information. In addition, other embodiments of first graphic element 314 or second graphic element 326 may feature different sizes, shapes and appearances than the embodiment that has been described.

In this embodiment, the song currently being provided to the user is visually represented by the rightmost graphic element (i.e., second graphic element 326). After songs have been provided to the user, or otherwise discarded, the graphic elements corresponding to those songs are scrolled to the left across playlist panel 304 (in this example, approximately three graphic elements total can be visualized to the user). In the embodiment shown in FIG. 3c, first graphic element 314 corresponds to a song that has already been provided to the user, while second graphic element 326 corresponds to a song that is currently being provided to the user. In one embodiment of the invention, the fact that second graphic element 326 is currently being provided to the user is emphasized by tinting, shading or otherwise de-emphasizing first graphic element 314, or highlighting, brightening or otherwise emphasizing second graphic element 326. In addition, playback bar 334 may be featured as a component of second graphic element 326 to indicate how much of the currently provided song has already been played. Of course, other embodiments may feature alternative ways of visually representing the playlist and/or the progression of the playlist, as well as fewer or more graphic elements and alternative ways for representing those graphic elements.

In the embodiment shown in FIG. 3c, graphical user interface 208 also features volume control 340, playback controls 342, "Help" button 344, "Share" button 346, "Account" button 348 and "Guide" button 350. Volume control 340 adjusts the audible volume of content objects having audio that are provided to the user in accordance with embodiments of the invention. Playback controls 342 allow the user to pause or resume the playing of content objects. Playback controls 342 also allow the user to terminate playing of the current content object in favor of another content object.

The user's selecting of "Help" button 344 generates an on-screen pop-up menu providing clickable menu choices that provide additional features to the user and enhance the user-friendliness of graphical user interface 208. For example, the on-screen pop-up menu may include choices providing additional information about a music discovery service, such as a FAQ, contact information or legal notices.

The user's selecting of "Share" button 346 generates another pop-up menu providing clickable menu choices relating to, for example, sharing features of graphical music interface 208. For example, the pop-up menu may include choices for providing a playlist to other users of the music discovery service (e.g., enabling another user to enjoy a station such as the station corresponding to "Station 1" button 308 and thus to be provided content corresponding to that station). The pop-up menu may also include choices for facilitating the providing of content by another station created by another user, the operator or a third party.

The user's selecting of "Account" button 348 generates another pop-up menu providing clickable menu choices relating to, for example, customized user preferences or settings. For example, the pop-up menu may include choices for viewing favorite stations, editing account and contact information or subscribing to the music discovery service. "Subscribing"

may mean, for example, that in exchange for an annual fee, the user will no longer see advertisement 216 when using the music discovery service.

In this embodiment, the user's selecting of "Guide" button 350 generates another pop-up menu providing clickable menu choices relating to, for example, enabling the user to selectively provide feedback about a content object such as a song. In one embodiment, "Guide" button 350 serves as the primary interface for the "back-and-forth" conversation between the user and the music discovery service. For example, the pop-up menu may include choices for enabling the user to provide feedback corresponding to comments such as "I really like this song," "I don't like this song," or "I'm tired of this song." This feedback can be used to customize, adapt and/or enhance the initial playlist generated in connection with a station so that it is more attuned to the preferences of the user.

As another example, the pop-up menu generated by selecting "Guide" button 350 may include other feedback options, such as reasons why the user likes or dislikes a certain song. Exemplary reasons that the user may select as reasons why he or she likes the song include "I like the artist," "I like the song," "I like the beat," "I like the instrument being played," "I like the meaning of the lyrics," or "I like the genre." Exemplary reasons that the user may select as reasons why he or she dislikes the song include "I don't like the artist," "I don't like the vocals," "I don't like the repetitiveness," "The music is too 'mainstream,'" or "The music is too loud."

In response to feedback provided by the user, the playlist may be modified. Modifications to the playlist are accomplished, for example, by the use of weighing values and scaling functions as described in currently pending U.S. patent application Ser. No. 11/295,339, as will be discussed further below.

In addition, "Guide" button may include other choices that provide the user with information as to why a song is being played (i.e. what musicological attributes, such as characteristics or focus traits, are contained in a song). "Guide" button may also include other choices that enable the user to selectively modify the input seed so that it, and the playlist that is generated as a result of a comparison between the input seed and other songs, reflects additional artists or songs.

Figure 4:
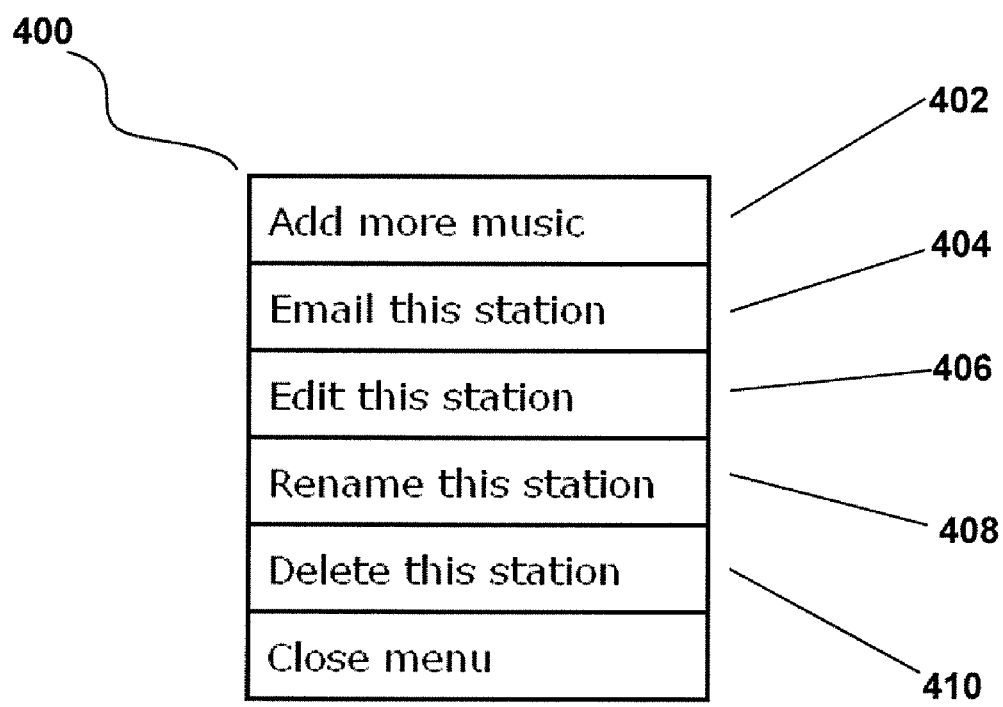
FIG. 4 depicts, in accordance with an embodiment of the invention, a station pop-up menu generated in response to a user selecting a button such as "Station 1" button 308 in FIG. 3c.

FIG. 4 depicts, in accordance with an embodiment of the invention, station pop-up menu 400, which is generated in response to a user selecting a button such as "Station 1" button 308 in FIG. 3c. Station pop-up menu 400 includes menu choices such as "Add More Music" menu choice 402, "Email This Station" menu choice 404, "Edit This Station" menu choice 406, "Rename This Station" menu choice 408 and "Delete This Station" menu choice 410. Other embodiments of the invention may have fewer, additional or alternative menu choices.

Figure 5:
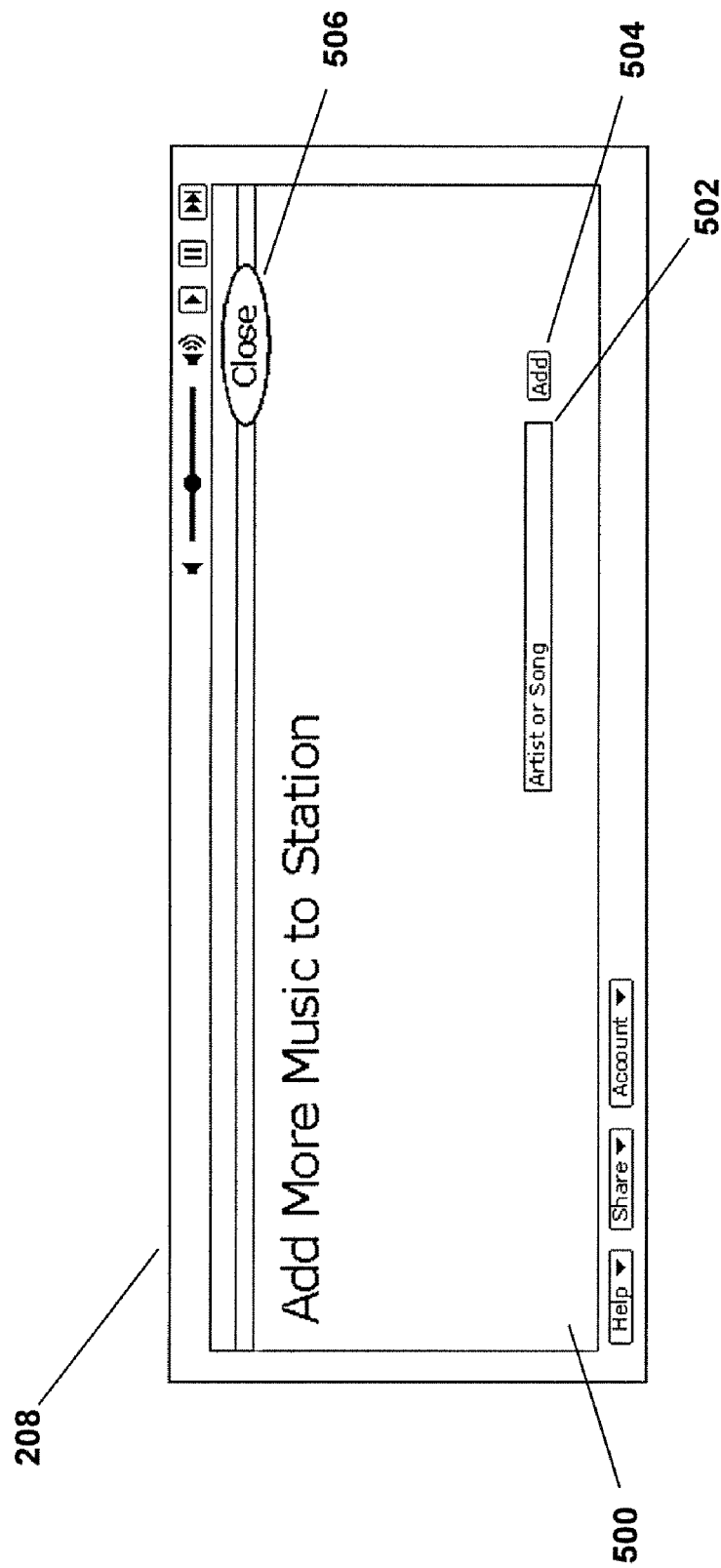
FIG. 5 depicts, in accordance with an embodiment of the invention, the graphical user interface of FIGS. 2a and 2b after a user has clicked the "Add More Music" menu choice 402 of station pop-up menu 400 in FIG. 4.

In one embodiment, "Add More Music" menu choice 402 enables the user to selectively modify the input seed corresponding to the current station. FIG. 5 depicts "Add More Music" panel 500 that appears on graphical user interface 208 after the user has selected "Add More Music" menu choice 402. "Add More Music" panel features entry field 502. Entry field 502 enables the user to selectively modify the input seed by entering, for example, another artist name or song name (in addition to the artist name, song name or other input seed previously entered) and then selecting "Add" button 504 (if the user does not desire to selectively modify the input seed, then the user selects "Close" button 506). The additional artist name or song name is then factored into the comparison between the input seed and songs contained in the "MUSIC GENOME PROJECT" database. One way to factor the additional artist name or song name into the comparison is to utilize confidence and weighting factors to assign, for example, more or less weight to the musicological attributes of the additional artist name or song name in view of the initial input seed. After the input seed has been selectively modified, "Add More Music" panel 500 disappears and graphical user interface 208 proceeds to present and provide content corresponding to the modified input seed in accordance with FIGS. 2a and 2b. In doing so, "Station 1" button 308 may appear differently to reflect the modified input seed.

Figure 6:
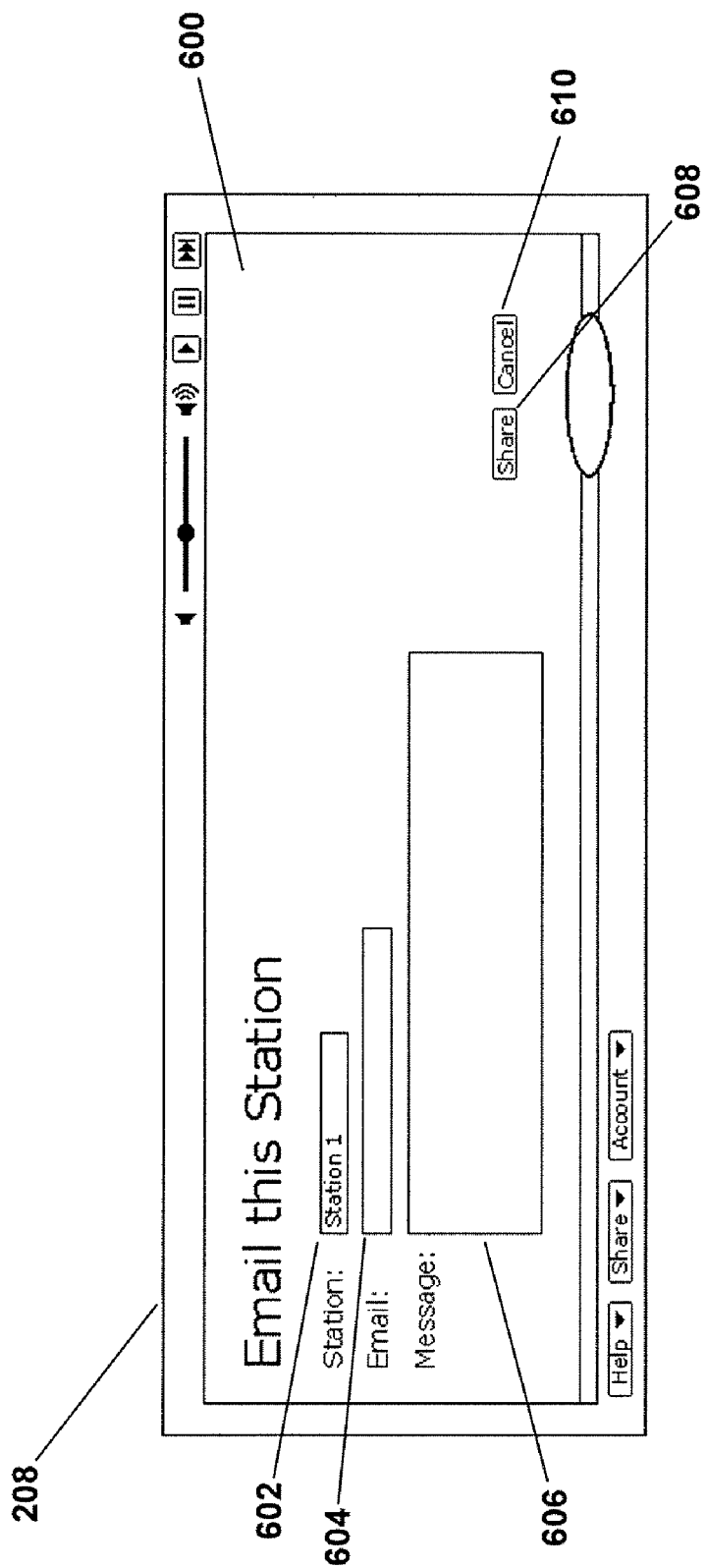
FIG. 6 depicts, in accordance with an embodiment of the invention, the graphical user interface of FIGS. 2a and 2b after a user has clicked the "Email This Station" menu choice 404 of station pop-up menu 400 in FIG. 4.

In one embodiment, "Email This Station" menu choice 404 enables the user to selectively provide a station, and thus a playlist, to another user. FIG. 6 depicts "Email This Station" panel 600 that appears on graphical user interface 208 after the user has selected "Email This Station" menu choice 404. "Email This Station" panel 600 features station field 602, email field 604 and message field 606. When selected by the user, station field 602 enables the user to select a station to selectively provide to another user. The stations available to selectively appear on a drop-down menu and may include stations created by the user, such as the station corresponding to "Station 1" button 308 (FIG. 3c), or other stations.

Email field 604 enables the user to enter an email address corresponding to another user for which the user desires to selectively provide a station. Message field 606 enables the user to provide a message (such as regular text or HTML) to the user for which the station has been selectively provided.

After the user has entered information into station field 602, email field 604 and message field 606, the user selects "Share" button 608 to initiate the selective providing of a station to another user. The information is transmitted to playlist server 108 (FIG. 1). Playlist server 108 prepares an email including the information entered in message field 606 to the recipient user utilizing SMTP or other common protocols. The return address of the email corresponds to the email address provided by the user upon registration with the music discovery service. The email further includes a hypertext link to the URL of the music discovery service. The hypertext link includes a command line argument of an identifier corresponding to the station the user desires to selectively provide. If the recipient is already registered with the music discovery service, the station is automatically provided. If the recipient is not registered with the music discovery service, an anonymous registration is created and the hypertext link will direct the recipient to graphical user interface 208 as if the recipient were the anonymous registrant. If the user does not desire to selectively provide a station, and thus a playlist, to another user, then the user selects "Cancel" button 610.

Figure 7A:
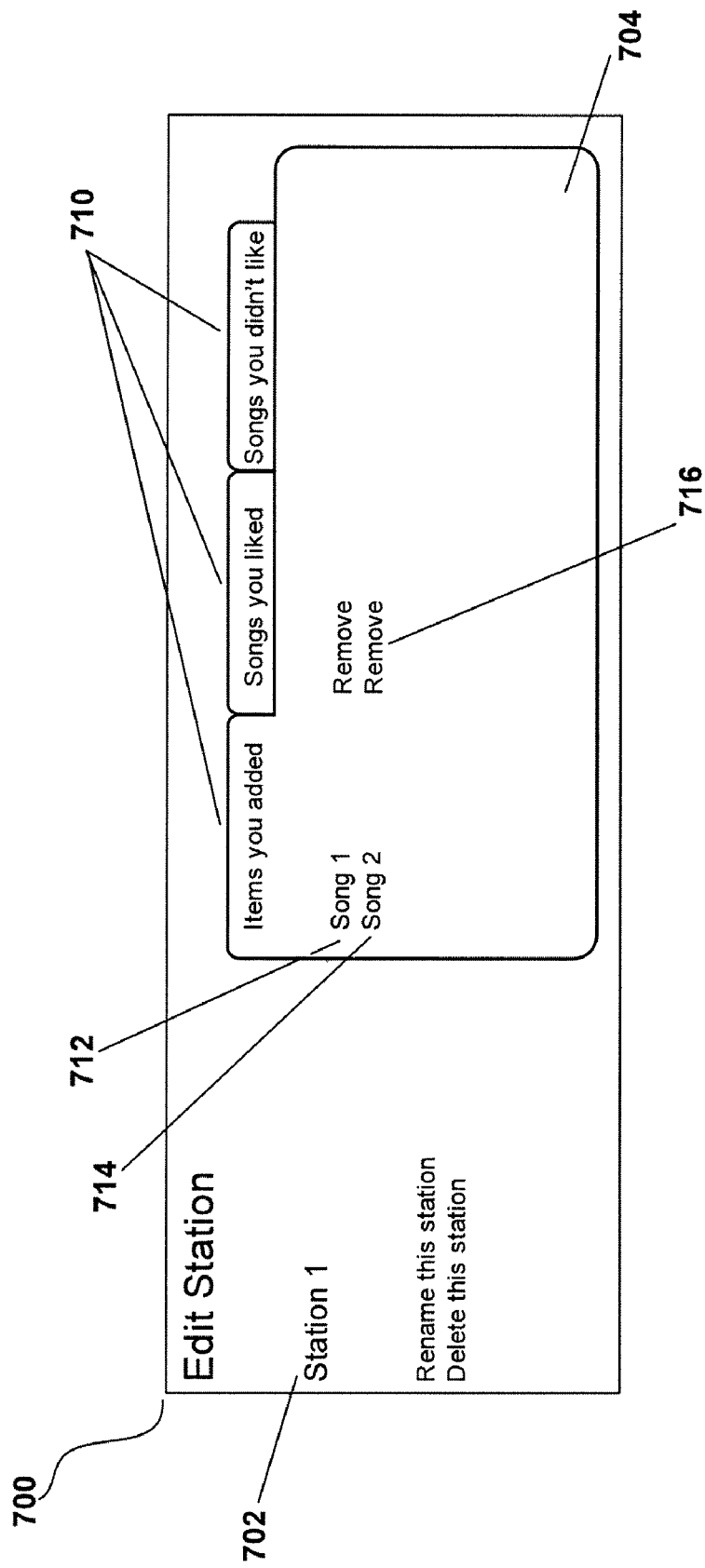
FIGS. 7a-c depict, in accordance with an embodiment of the invention, the graphical user interface of FIGS. 2a and 2b in various stages of operation after a user has clicked the "Edit This Station" menu choice 406 of station pop-up menu 400 in FIG. 4.
Figure 7B:
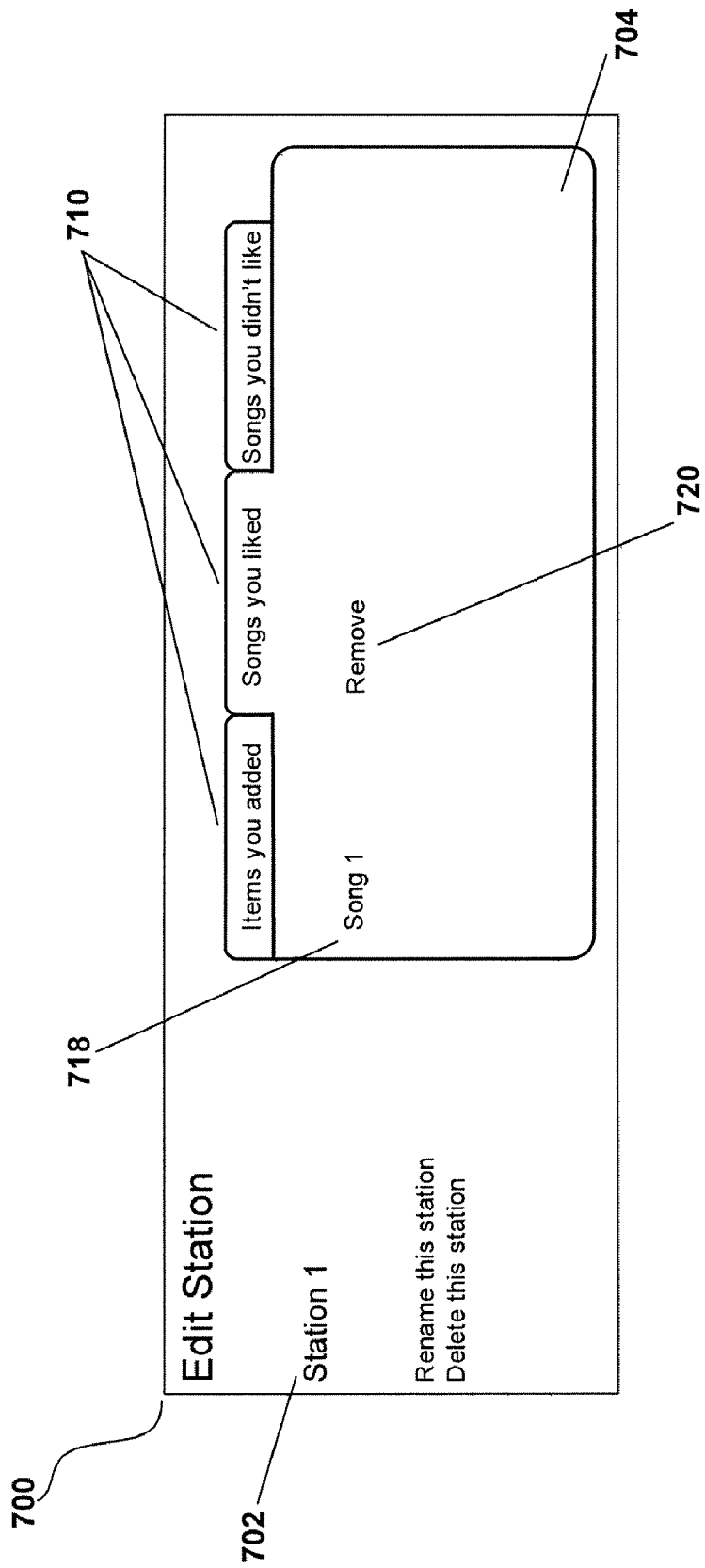
Figure 7C:
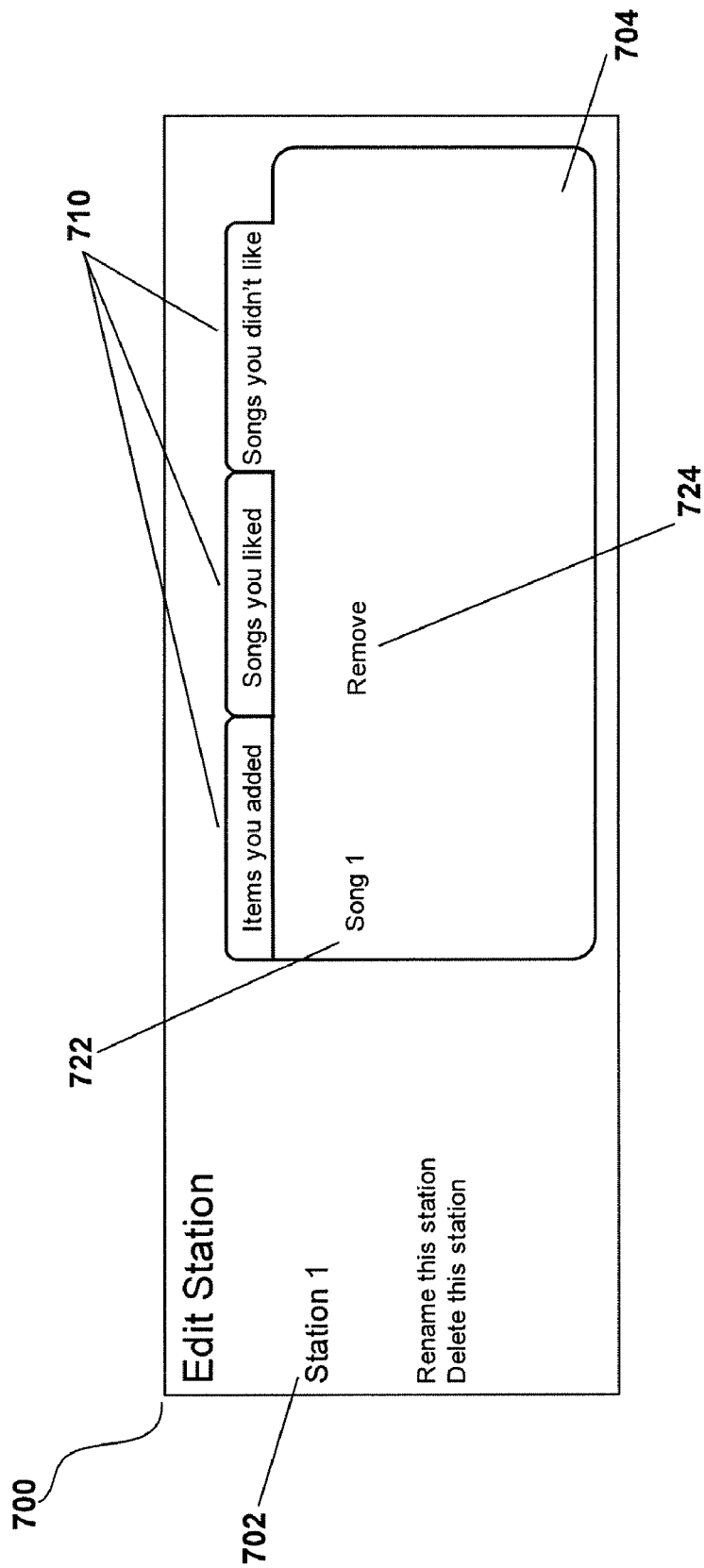

In one embodiment, "Edit This Station" menu choice 406 enables the user to, among other things, selectively modify feedback about a content object such as a song. FIGS. 7a-c depict "Edit This Station" panel 700 that appears after the user has selected "Edit This Station" menu choice 406. Turning to FIG. 7a, "Edit This Station" panel 700 features station title 702, which displays the name of the station (such as the station corresponding to "Station 1" button 308) that is being edited. "Edit This Station" panel 700 also features "Items You Added" panel 704, "Songs You Liked" panel 706 and "Songs You Didn't Like" panel 708. The user may access each of these panels by selecting tab 710 that corresponds to the appropriate panel.

"Items You Added" panel 704 features song name text 712 and/or artist name text 714 corresponding to selective modifications of the input seed corresponding to the current station. Thus, for example, song name text 712 and artist name text 714 respectively correspond to a song and artist previously entered by the user in order to selectively modify the input seed. The user may remove, for example, a song that had previously selectively modified the input seed by selecting "Remove" button 716. Thereafter, graphical user interface 208 will no longer present and provide content corresponding to the modified input seed. Instead, graphical user interface 208 will proceed to present and provide content corresponding to, for example, the initial input seed, or to the input seed as selectively modified by entry of artist 714.

"Songs You Liked" panel 706 features, for example, song name text 718 (or artist name text) corresponding to selective feedback that the user has provided about a song. Thus, for example, song name text 712 corresponds to a song for which the user has previously selectively provided positive feedback. In addition, "Songs You Didn't Like" panel 708 features, for example, song name text 722 (or artist name text) corresponds to a song for which the user has previously selectively provided negative feedback.

Figure 3D:
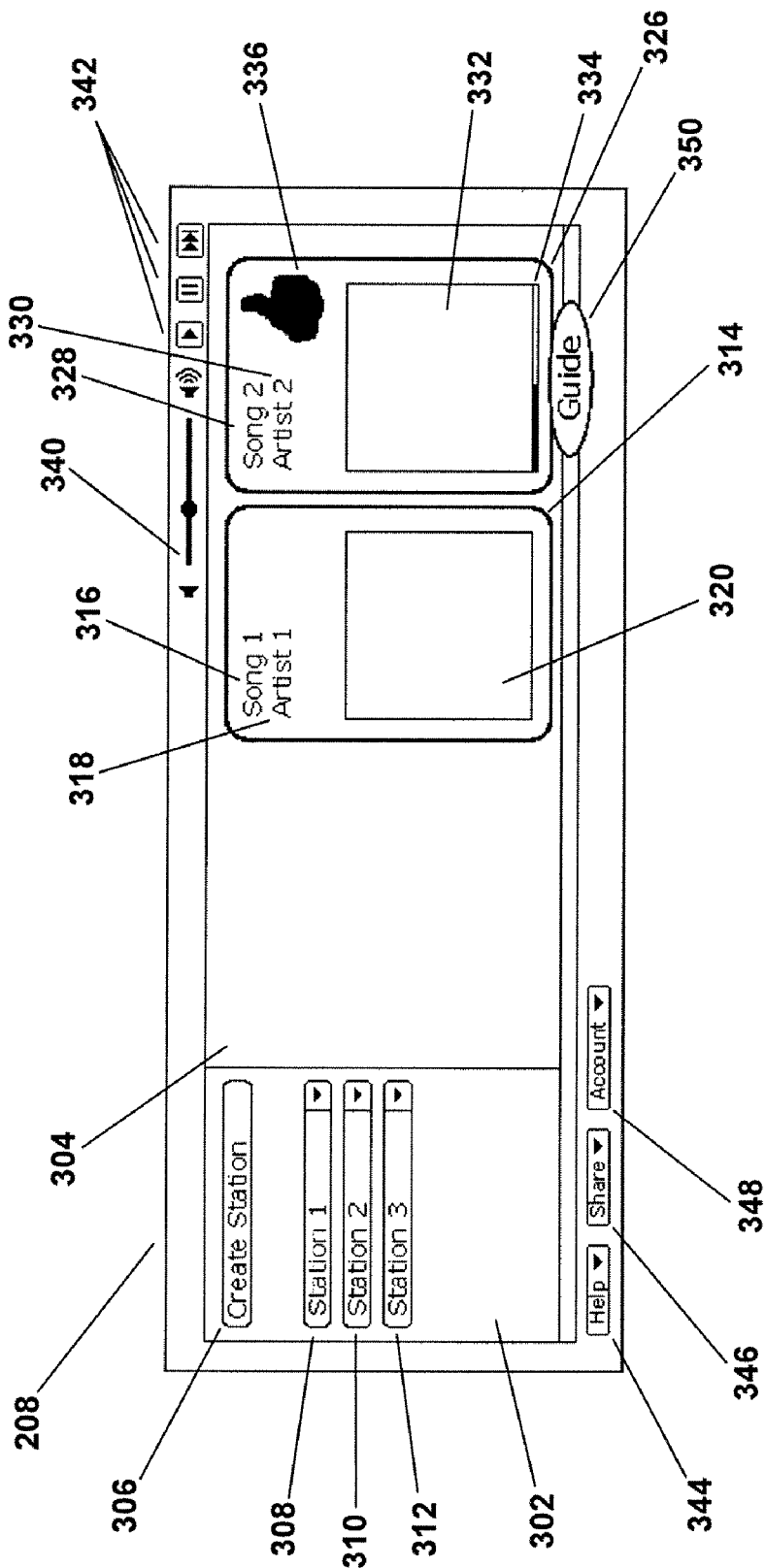

The user may delete the feedback previously provided by selecting "Remove" button 720. Thereafter, when the song is provided, graphical user interface 208 will no longer display feedback indicator 336 (FIG. 3d). Multiple songs and/or artists may be listed on "Items You Added" panel 704, "Songs You Liked" panel 706 or "Songs You Didn't Like" panel 708. Moreover, the feedback about the song will no longer be utilized in connection with generating playlists.

As stated previously, in one embodiment, station pop-up menu 400 also features "Rename This Station" menu choice 408 and "Delete This Station" menu choice 410. "Rename This Station" menu choice 408 enables the user to selectively provide an edited name for, for example, the station that corresponds to "Station 1" button 308. "Delete This Station" menu choice 410 enables the user to remove a station from graphical interface 208.

Figure 8:
FIG. 8 depicts, in accordance with an embodiment of the invention, a content pop-up menu generated in response to a user selecting a component of a graphical element, such as content art 332 of second graphic element 326.

FIG. 8 depicts, in accordance with an embodiment of the invention, content pop-up menu 800, which is generated in response to a user selecting a component of a graphical element, such as content art 332 of second graphic element 326. Content pop-up menu 800 includes menu choices such as "Why Did You Play This Song" menu choice 802, "Make a New Station from This Song" menu choice 804, "Buy This Song" menu choice 806 and "Buy This Album" menu choice 808. Other embodiments of the invention may have fewer, additional or alternative menu choices.

Figure 9:
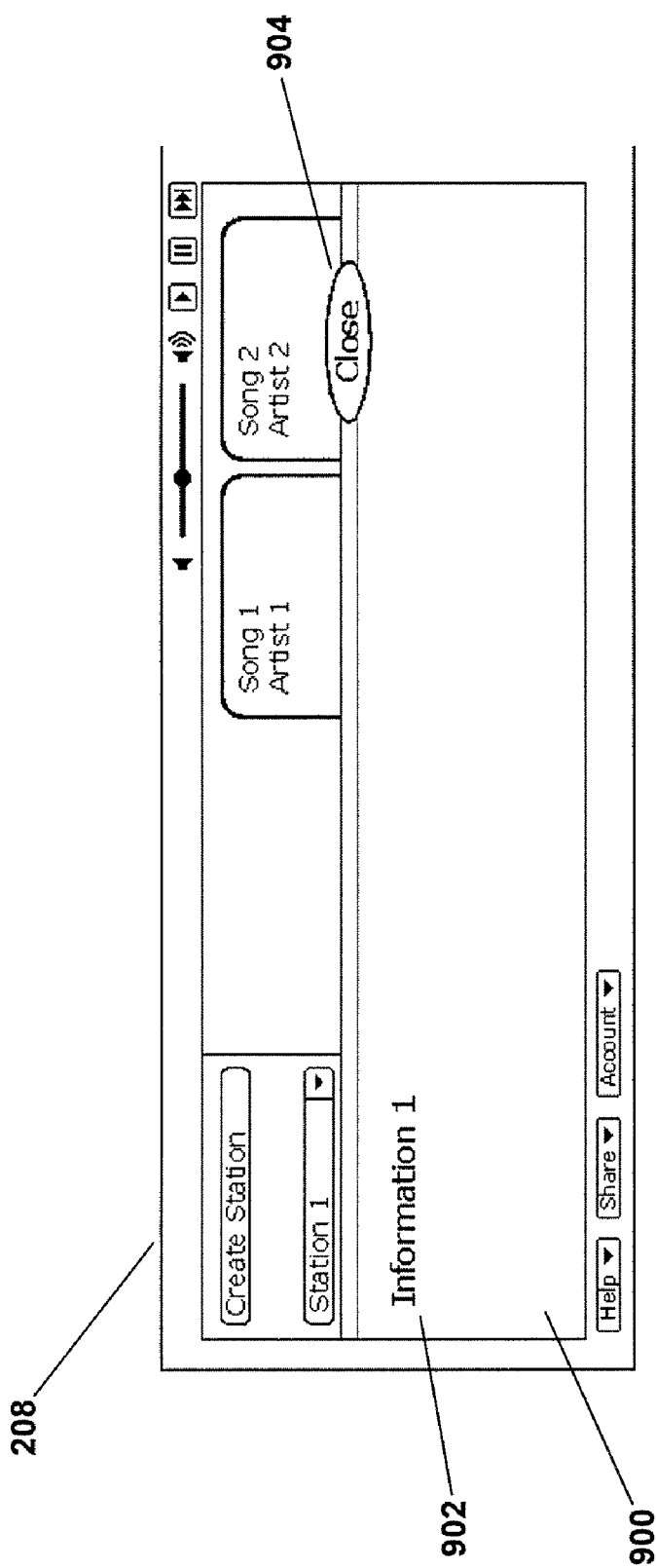
FIG. 9 depicts, in accordance with an embodiment of the invention, an "Information" panel 900 that appears on graphical user interface 208 after the user has selected, for example, "Why Did You Play This Song" menu choice 802.

In one embodiment, "Why Did You Play This Song" menu choice 802 initiates the selectively providing of information to the user. FIG. 9 depicts "Information" panel 900 that appears on graphical user interface 208 after the user has selected, for example, "Why Did You Play This Song" menu choice 802. "Information" panel 900 features information, such as information provided in information text 902, about the song or other content object currently being provided to the user. For example, "Information" panel 900 may include information relating to a characteristic or focus trait of the song or other content object. Alternatively, "Information" panel 900 may also include information relating to background knowledge about the song, the artist who created the song or other relevant information. To the extent the user no longer desires to review the information, the user selects "Close" button 904 and information panel 900 disappears.

Figure 10:
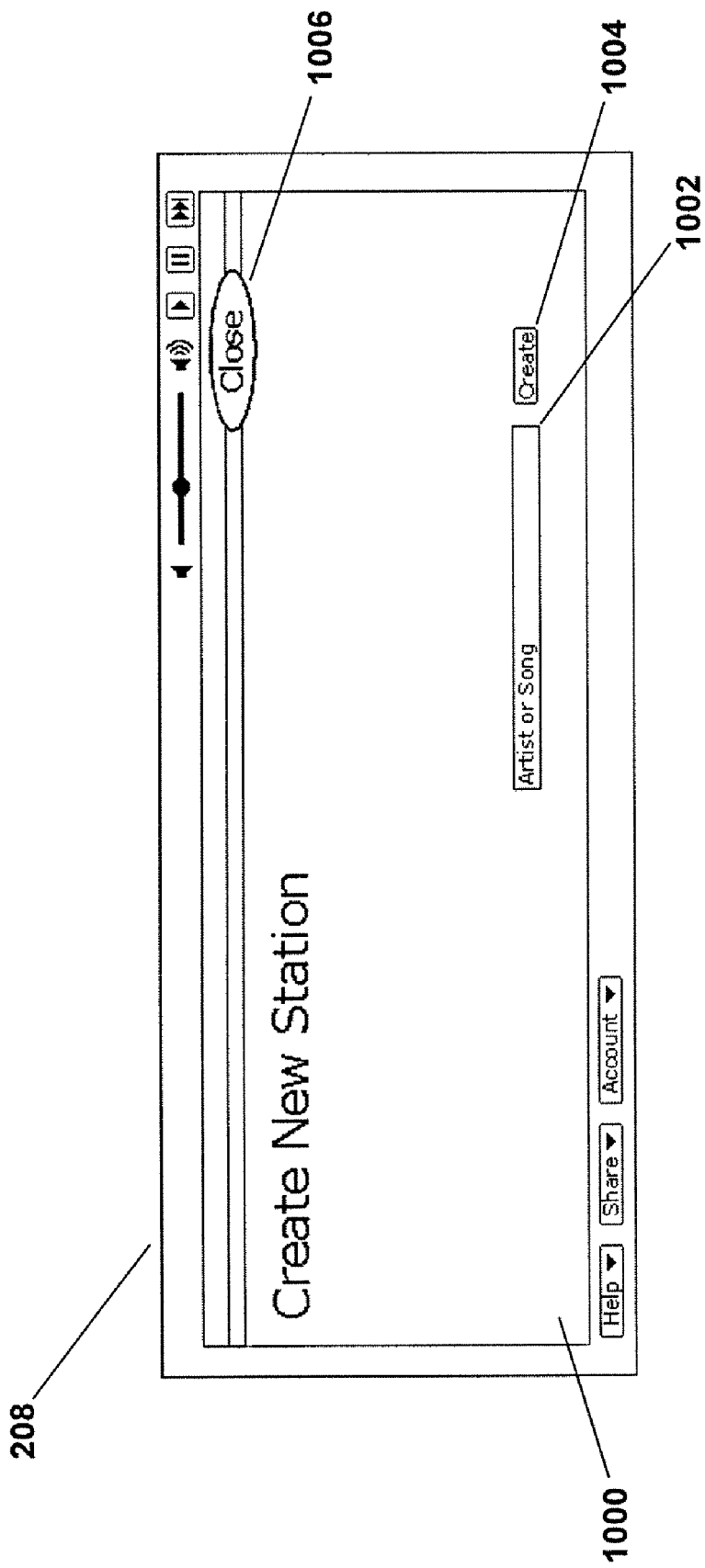
FIG. 10 depicts, in accordance with an embodiment of the invention, a "Create New Station" panel 1000 that appears on graphical user interface 208 after the user has selected, for example, "Make a New Station from This Song" menu choice 804.

In one embodiment, "Make a New Station from This Song" menu choice 804 facilitates the presenting of content to a user in accordance with the present invention. FIG. 10 depicts "Create New Station" panel 1000 that appears on graphical user interface 208 after the user has selected, for example, "Make a New Station from This Song" menu choice 804. "Create New Station" panel 1000 features input seed field 1002 and "Create" button 1004. In one embodiment of the invention, input seed field 1002 is automatically filled with the song name corresponding to the song that was provided when content pop-up menu 800 was initially selected. In another embodiment, input seed field 1002 is empty and awaits the entry of a song name by the user. To initiate the creation of a new station, the user selects "Create" button 1004 after input seed field 1002 has been filled. In another embodiment, a station is automatically created in graphical user interface 208 after the user has selected "Make a New Station from This Song" menu choice 804. To the extent the user does not desire to create a new station, the user selects "Close" button 1006. "Create New Station" panel 1000 disappears and is replaced on the display by graphical user interface 208.

In one embodiment, content pop-up menu 800 features "Buy This Song" menu choice 806 and "Buy This Album" menu choice 808. If the user selects "Buy This Song" menu choice 806, then the selective purchase of the song (or other content object) is enabled. One way to enable the selective purchase of the song is to hyperlink "Buy This Song" menu choice 806 to a web site such as the "iTunes" web site from Apple Computer Corp. that offers songs for sale. The hyperlink may include a general URL as well as a parameter specifying the exact song for purchase. If the user selects "Buy This Album" menu choice 808, then the selective purchase of the album (or other content object) is enabled. One way to enable the selective purchase of the album is to hyperlink "Buy This Album" menu choice 808 to a web site such as the web site of Amazon.com, which sells albums. The hyperlink may include a general URL as well as a parameter specifying the exact song for purchase.

Content pop-up menu 800 also includes menu choices such as "I Like It" menu choice 810 and "I Don't Like It" menu choice 812. "I Like It" menu choice 810 and "I Don't Like It" menu choice 812 enable the user to selectively provide, respectively, positive or negative feedback about the current song or other content object. If the user selects "I Like It" menu choice 810, then feedback indicator 336 in the shape of, for example, a "thumbs-up" sign is displayed on graphic user interface 208 (FIG. 3d). If the user selects "I Don't Like It" menu choice 812, then feedback indicator 336 in the shape of, for example, a "thumbs-down" sign is displayed on graphic user interface 208 (FIG. 3d). Other types of feedback, such as "Don't play this song for awhile" may also be selectively provided. As stated previously, feedback may be used to customize and enhance playlists and other aspects of the user experience.

Figure 11:
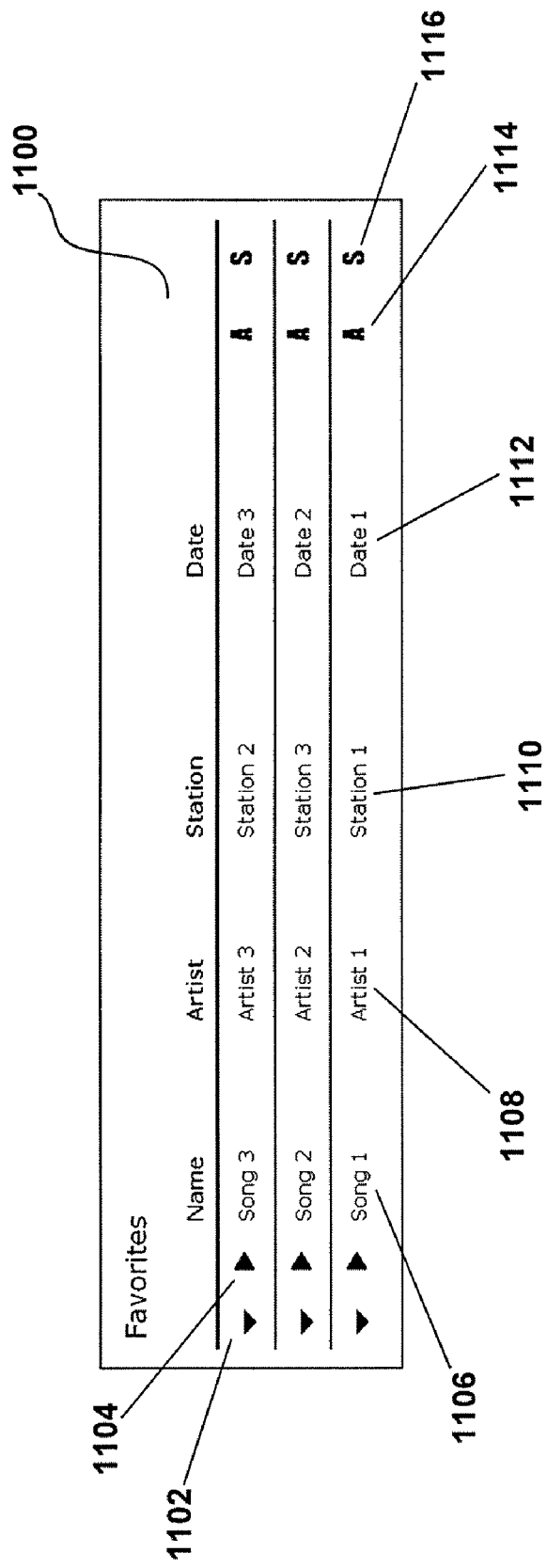
FIG. 11 depicts a "Favorites" display 1100 in accordance with an embodiment of the invention.

Content pop-up menu 800 further includes "Add to Favorites" menu choice 814. In one embodiment, "Add to Favorites" menu choice 814 enables the user to selectively associate the song or other content object with a favorites list. FIG. 11 depicts "Favorites" display 1100. "Favorites" display 1100 may appear, for example, as a panel in graphical user interface 208 or as a separate web page provided by playlist server 108. Another way for the user to access "Favorites" display 1100 is by selecting "Favorites" button 210 (FIG. 2a). "Favorites" display 1100 keeps track of songs that the user has identified as good or otherwise significant. In one embodiment, "Favorites" display 1100 features management icons 1102 and 1104, song text 1106, artist text 1108 and station text 1110. Management icons 1102 and 1104 enable the user to remove and otherwise manipulate songs listed in the favorites list in "Favorites" display 1100. Song text 1106 and artist text 1108 provide information about the song that has been selectively associated with the "Favorites" list. Station text 1110 provides the name of the station, such as the station corresponding to the "Station 1" button 308, from which the song was selectively associated with the "Favorites" list.

In one embodiment, "Favorites" display 1100 also features date 1112, album purchase icon 1114 and song purchase item 1116. Date 1112 provides information as to when the song was selectively associated with the "Favorites" list. Album purchase icon 1114 enables the selective purchase of the album (or other content object) from which the song originates. One way to enable the selective purchase of the album is to hyperlink album purchase icon 1114 to a web site such as the web site of Amazon.com, which sells albums. Song purchase icon 1116 enables the selective purchase of the song (or other content object). One way to enable the selective purchase of the song is to hyperlink song purchase icon 1116 to a web site such as the "iTunes" web site from Apple Computer Corp. that offers songs for sale.

It will be appreciated that the design of all displays, windows, interfaces, panels, graphic elements and other components discussed are not limited to the designs specified. Rather, such designs may be of any type or variety that is aesthetically pleasing or functional.

Figure 12:
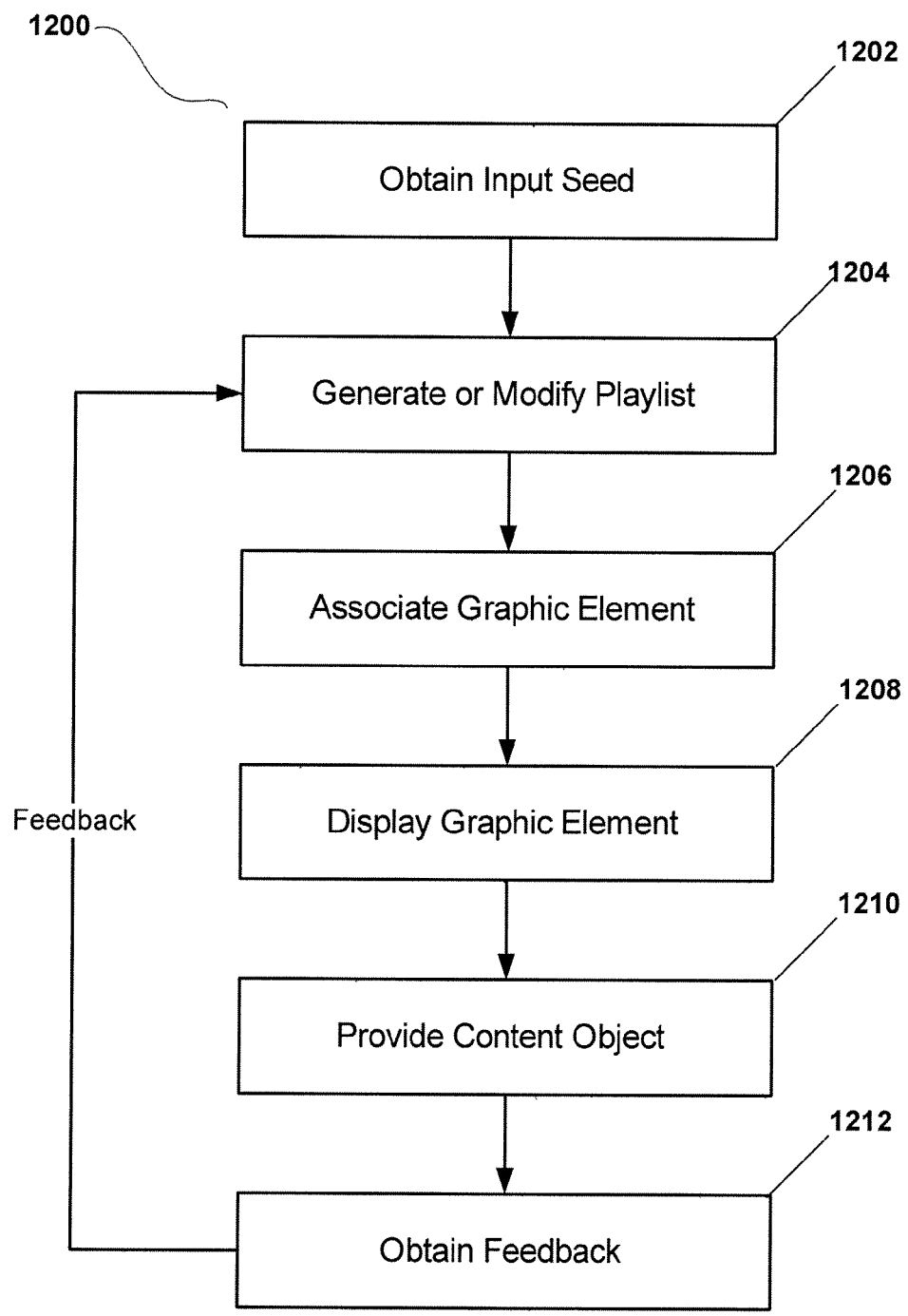
FIG. 12 depicts a flow diagram overview of methods for presenting and providing content to a user.

FIG. 12 depicts a flow diagram overview of a method for presenting and providing content to a user 1200 that can be executed in connection with, for example, the system depicted in FIG. 1.

In "Obtain Input Seed" step 1202 of FIG. 12, the user is enabled to selectively provide an input seed. As stated previously, the input seed may be a song name such as "Paint It Black" or even a group of songs such as "Paint It Black" and "Ruby Tuesday." Alternatively, the input seed may be an artist name such as "Rolling Stones." Other types of input seeds could include, for example, genre information such as "Classic Rock" or era information such as "1960s." In one embodiment of the invention, the input seed is sent to playlist server 108 (FIG. 1) in order to perform the subsequent generation of a playlist. Encryption and other security methods may be used to protect communications between playlist server 108, content server 118 and/or terminals 102, 104 and 106.

In "Generate or Modify Playlist" step 1204, a playlist is first generated as a result of a comparison between the input seed and a plurality of database items. As stated previously, in one embodiment of the invention, the input seed is received from terminals 102, 104 and 106 and the playlist is generated on playlist server 108.

One or more embodiments of the invention utilize the "MUSIC GENOME PROJECT" database, which is a large database of records, each describing a single piece of music and an associated set of search and matching functions that operate on that database. The matching engine effectively calculates the distance between a source song and the other songs in the database and then sorts the results to yield an adjustable number of closest matches. Before continuing with FIG. 12, a method of generating or modifying a playlist will be discussed in accordance with one embodiment of the "MUSIC GENOME PROJECT" database will be discussed.

Song Matching

In the "MUSIC GENOME PROJECT" database, each song is described by a set of characteristics, or "genes", or more that are collected into logical groups called "chromosomes." The set of chromosomes make up the genome. One of these major groups in the genome is the "Music Analysis" Chromosome. This particular subset of the entire genome is sometimes referred to as "the genome."

Each gene can be thought of as an orthogonal axis of a multi-dimensional space and each song as a point in that space. Songs that are geometrically close to one another are "good" musical matches. To maximize the effectiveness of the music matching engine, we maximize the effectiveness of this song distance calculation.

A given song "S" is represented by a vector containing approximately 150 genes. Each gene corresponds to a characteristic of the music, for example, gender of lead vocalist, level of distortion on the electric guitar, type of background vocals, etc. In a preferred embodiment, rock and pop songs have 150 genes, rap songs have 350, and jazz songs have approximately 400. Other genres of music, such as world and classical, have 300-500 genes. The system depends on a sufficient number of genes to render useful results. Each gene "s" of this vector has a value of an integer or half-integer between 0 and 5. However, the range of values for characteristics may vary and is not strictly limited to just integers or half-integers between 0 and 5.

Song $S=(s_1, s_2, s_3, \ldots, s_n)$

The simple distance between any two songs "S" and "T", in n-dimensional space, can be calculated as follows:

distance=square-root of (the sum over all n elements of the genome of (the square of (the difference between the corresponding elements of the two songs)))

This can be written symbolically as:

distance$(S, T)$=sqrt $[(\text{for } i=1 \text{ to } n)\Sigma(s_i-t_i)^2]$

Because the monotonic square-root function is used in calculating all of these distances, computing the function is not necessary. Instead, the invention uses distance-squared calculations in song comparisons. Accepting this and applying subscript notation, the distance calculation is written in simplified form as:

distance$(S, T)=\Sigma(s-t)^2$

Weighted and Focus Matching
Weighted Matching

Because not all of the genes are equally important in establishing a good match, the distance is better calculated as a sum that is weighted according to each gene's individual significance. Taking this into account, the revised distance can be calculated as follows:

distance=$\Sigma[w^*(s-t)^2]=[w_1^*(s_1-t_1)^2]+[w_2^*(s_2-t_2)^2]+\ldots$ where the weighting vector "W,"

Song $W=(w_1, w_2, w_3, \ldots, w_n)$ is initially established through empirical work done, for example, by a music team that analyzes songs. The weighting vector can be manipulated in various ways that affect the overall behavior of the matching engine. This will be discussed in more detail later in this document.

Scaling Functions

The data represented by many of the individual genes is not linear. In other words, the distance between the values of 1 and 2 is not necessarily the same as the distance between the values of 4 and 5. The introduction of scaling functions f(x) may adjust for this non-linearity. Adding these scaling functions changes the matching function to read:

distance=$\Sigma[w^*(f(s)-f(t))^2]$

There are a virtually limitless number of scaling functions that can be applied to the gene values to achieve the desired result.

Alternatively, one can generalize the difference-squared function to any function that operates of the absolute difference of two gene values. The general distance function is:

distance=$\Sigma[w^*g(|s-t|)]$

In the specific case, g(x) is simply $x^2$, but it could become $x^3$ for example if it was preferable to prioritize songs with many small differences over ones with a few large ones.

Focus Matching

Focus matching allows the end user of a system equipped with a matching engine to control the matching behavior of the system. Focus traits may be used to re-weight the song matching system and refine searches for matching songs to include or exclude the selected focus traits.

Focus Trait Presentation

Focus Traits are the distinguishing aspects of a song. When an end user enters a source song into the system, its genome is examined to determine which focus traits have been determined by music analysts to be present in the music. Triggering rules are applied to each of the possible focus traits to discover which apply to the song in question. These rules may trigger a focus trait when a given gene rises above a certain threshold, when a given gene is marked as a definer, or when a group of genes fits a specified set of criteria. The identified focus traits (or a subset) are presented on-screen to the user. This tells the user what elements of the selected song are significant.

Focus Trait Matching

An end user can choose to focus a match around any of the presented traits. When a trait, or number of traits, is selected, the matching engine modifies its weighting vector to more tightly match the selection. This is done by increasing the weights of the genes that are specific to the Focus Trait selected and by changing the values of specific genes that are relevant to the Trait. The resulting songs will closely resemble the source song in the trait(s) selected.

Personalization

The weighting vector can also be manipulated for each end user of the system. By raising the weights of genes that are important to the individual and reducing the weights of those that are not, the matching process can be made to improve with each use.

Aggregation

Song to Song Matching

The matching engine is capable of matching songs. That is, given a source song, it can find the set of songs that closely match it by calculating the distances to all known songs and then returning the nearest few. The distance between any two songs is calculated as the weighted Pythagorean sum of the squares of the differences between the corresponding genes of the songs.

Basic Multi-Song Matching

It may also be desirable to build functionality that will return the best matches to a group of source songs. Finding matches to a group of source songs is useful in a number of areas as this group can represent a number of different desirable searches. The source group could represent the collected works of a single artist, the songs on a given CD, the songs that a given end user likes, or analyzed songs that are known to be similar to an unanalyzed song of interest. Depending on the makeup of the group of songs, the match result has a different meaning to the end user but the underlying calculation should be the same.

This functionality provides a list of songs that are similar to the repertoire of an artist or CD. Finally, it will allow us to generate recommendations for an end user, purely on taste, without the need for a starting song.

Figure 13:
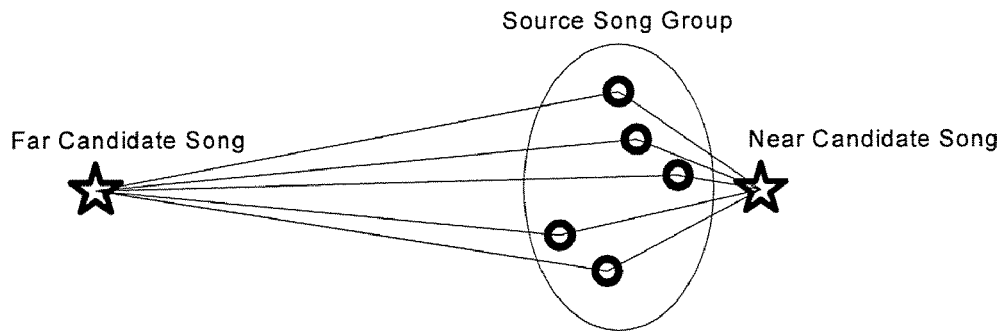
FIG. 13 depicts a relationship between different song candidates.

FIG. 13 illustrates two songs. In this Figure, the song on the right is a better match to the set of source songs in the center.

Vector Pairs

Figure 14:
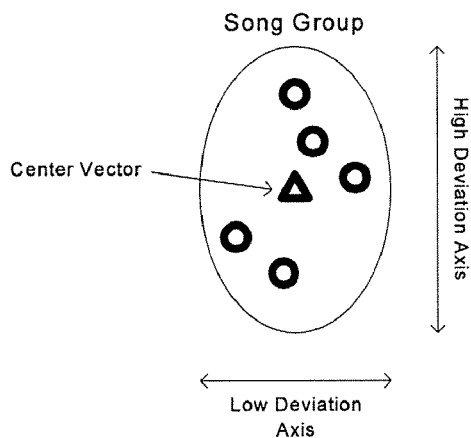
FIG. 14 is a graph showing a deviation vector.

Referring to FIG. 14, one way to implement the required calculation is to group the songs into a single virtual song that can represent the set of songs in calculations. The virtual "center" is defined to be a song vector whose genes are the arithmetic average of the songs in the original set. Associated with this center vector is a "deviation" vector that represents the distribution of the songs within the set. An individual gene that has a very narrow distribution of values around the average will have a strong affinity for the center value. A gene with a wide distribution, on the other hand, will have a weak affinity for the center value. The deviation vector will be used to modify the weighing vector used in song-to-song distance calculations. A small deviation around the center means a higher net weighting value.

The center-deviation vector pair can be used in place of the full set of songs for the purpose of calculating distances to other objects.

Raw Multi-Song Matching Calculation

If the assumption is made that a songs gene's are normally distributed and that they are of equal importance, the problem is straightforward. First a center vector is calculated and a standard deviation vector is calculated for the set of source songs. Then the standard song matching method is applied, but using the center vector in place of the source song and the inverse of the square of the standard deviation vector elements as the weights:

Target song vectors $T=(t_1, t_2, \ldots t_n)$

Center vector of the source group $C=(\mu_1, \mu_2, \ldots \mu_n)$

Standard deviation vector of the source group $D=(\sigma_1, \sigma_2, \ldots \sigma_n)$ $$distance_j = \Sigma[(1/\sigma_i)^2 * (\mu_i - t_i)^2]$$

As is the case with simple song-to-song matching, the songs that are the smallest distances away are the best matches.

Using Multi-Song Matching With the Weighting Vector

The weighting vector that has been used in song-to-song matching must be incorporated into this system alongside the $1/\sigma^2$ terms. Assuming that they are multiplied together so that the new weight vector elements are simply:

$$\text{New weight} = w_i/\sigma_i^2$$

A problem that arises with this formula is that when $\sigma^2$ is zero the new weight becomes infinitely large. Because there is some noise in the rated gene values, $\sigma^2$ can be thought of as never truly being equal to zero. For this reason a minimum value is added to it in order to take this variation into account. The revised distance function becomes:

$$distance_j = \Sigma[(w_i * 0.25/(\sigma_i^2 + 0.25)) * (\mu_i - t_i)^2]$$

Other weighting vectors may be appropriate for multi-song matching of this sort. Different multi-song weighting vector may be established, or the $(0.5)^2$ constant may be modified to fit with empirically observed matching results.

Taste Portraits

Groups with a coherent, consistent set of tracks will have both a known center vector and a tightly defined deviation vector. This simple vector pair scheme will breakdown, however, when there are several centers of musical style within the collection. In this case we need to describe the set of songs as a set of two or more vector pairs.

Figure 15:
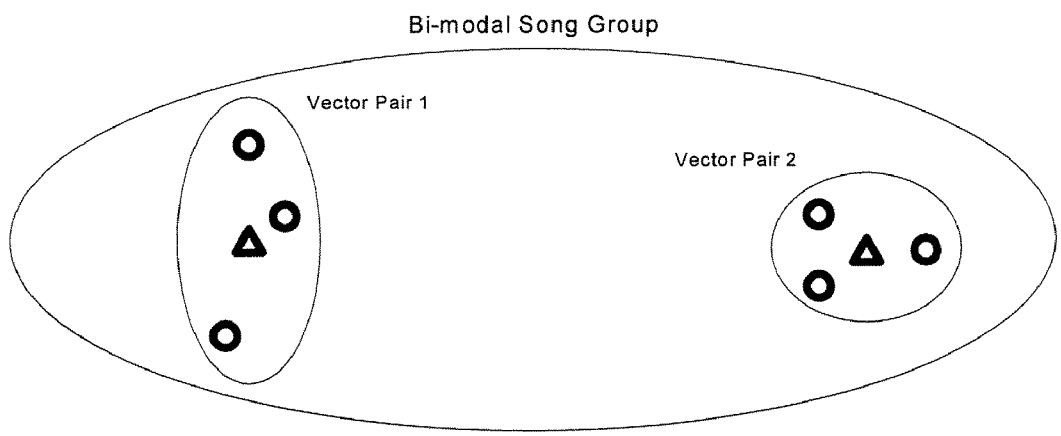
FIG. 15 graphically depicts a bimodal song group.

As shown in FIG. 15, the song group can be described with two vector pairs. By matching songs to one OR the other of the vector pairs, we will be able to locate songs that fit well with the set. If we were to try to force all of the songs to be described by a single pair, we would return songs in the center of the large ellipse that would not be well matched to either cluster of songs.

Ideally there will be a small number of such clusters, each with a large number of closely packed elements. We can then choose to match to a single cluster at a time. In applications where we are permitted several matching results, we can choose to return a few from each cluster according to cluster size.

Figure 16:
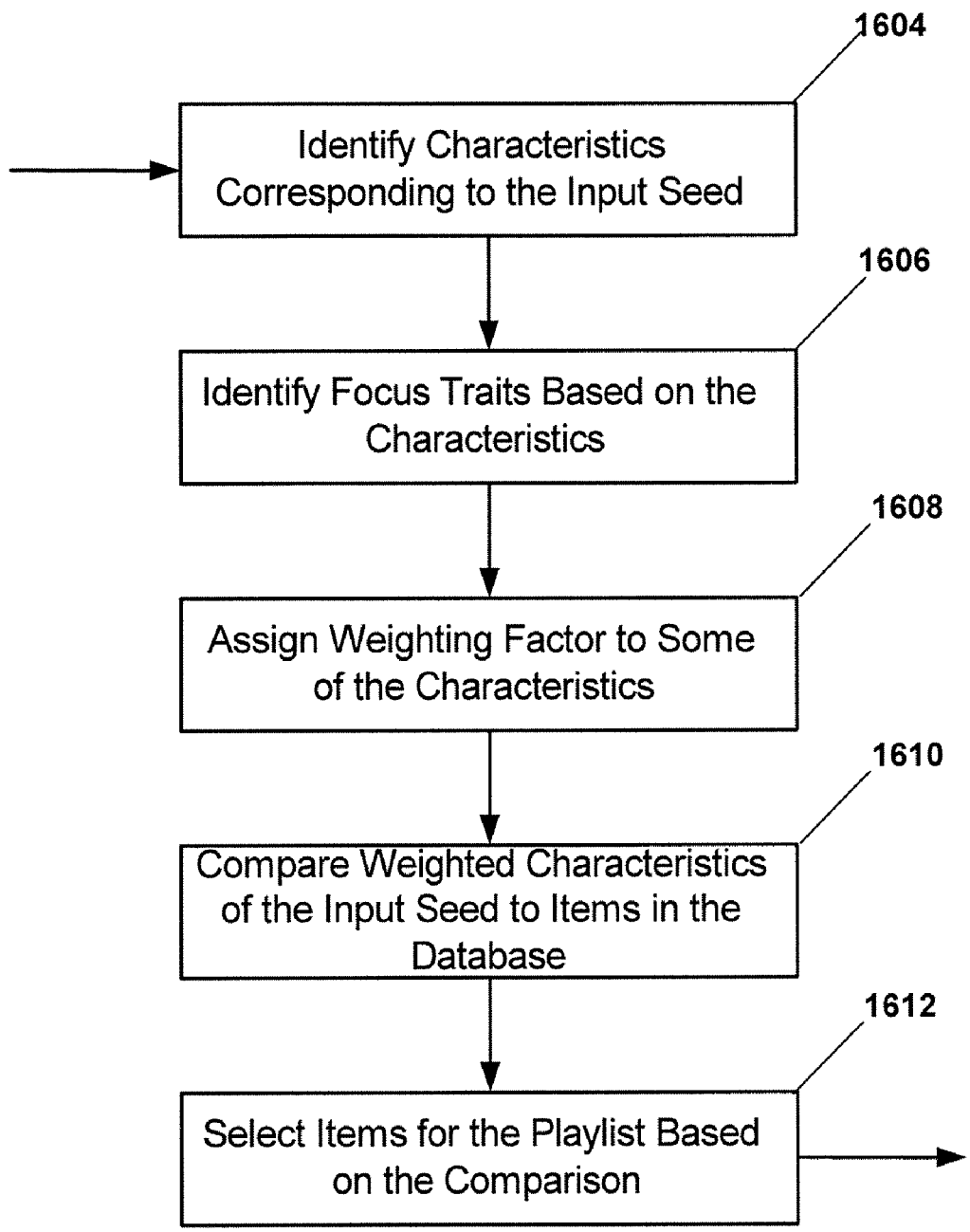
FIG. 16 shows a flow diagram for one or more embodiments of the "Generate or Modify Playlist" step 1204 in FIG. 12.

Returning to "Generate or Modify Playlist" step 1204 in FIG. 12, FIG. 16 shows a more detailed flow diagram for one or more embodiments of this step.

In "Identify Characteristics" step 1604 in FIG. 16, characteristics that correspond to the input seed are identified. As stated previously, characteristics may include, for example, gender of lead vocalist, level of distortion on the electric guitar, type of background vocals, etc. Characteristics may also include, for example, other types of musicological attributes such as syncopation, which is a shift of accent in a musical piece that occurs when a normally weak beat is stressed. In one or more embodiments of the invention, such characteristics are retrieved from one or more items corresponding to the input seed in a Music Genome Project database.

Figure 17:
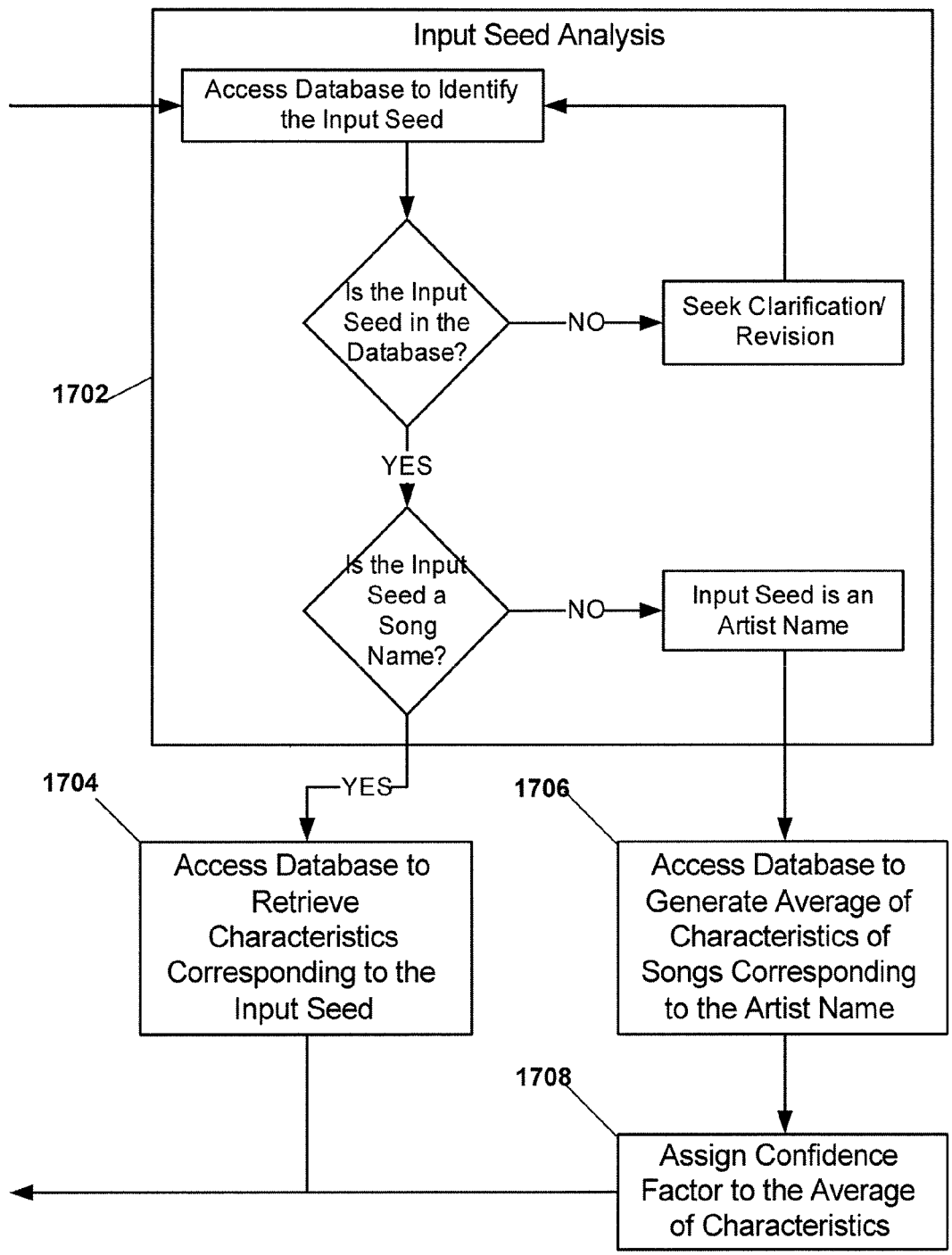
FIG. 17 shows a flow diagram for one or more embodiments of the "Identify Characteristics" step 1604 in FIG. 16.

FIG. 17 shows a more detailed flow diagram for one embodiment of the "Identify Characteristics" step 1604 (FIG. 16). As indicated previously, "Identify Characteristics" step 1604 as well as all of the other steps in FIG. 16, can be executed on, for example, the servers in FIG. 1.

In order to identify characteristics corresponding to the input seed, the input seed itself must first be analyzed as shown in "Input Seed Analysis" step 1702. Accordingly, database 112 in FIG. 1, which may be a Music Genome Project database, is accessed to first identify whether the input seed is an item in database 112. To the extent the input seed is not an item in the database, the user may be asked for more information in an attempt to determine, for example, whether the input seed was inputted wrong (e.g., "Beetles" instead of "Beatles") or whether the input seed goes by another name in database (e.g., "I feel fine" instead of "She's in love with me"). Alternatively, close matches to the input seed may be retrieved from the database and displayed to the user for selection.

If the input seed is in the database, the input seed is then categorized. In the embodiment shown in FIG. 17, the input seed is categorized as either a "Song Name" or "Artist Name." Such categorization is realized by, for example, retrieving "Song Name" or "Artist Name" information associated with the input seed from the database. Alternatively, such categorization is realized by asking the user whether the input seed is a "Song Name" or "Artist Name."

If the input seed is a song name, then "Retrieve Characteristics" step 1704 is executed. In "Retrieve Characteristics" step 1704, a song vector "S" that corresponds to the song is retrieved from the database for later comparison to another song vector. As stated previously, in one embodiment the song vector contains approximately 150 characteristics, and may have 400 or more characteristics:

$$\text{Song } S=(s_1, s_2, s_3, \ldots s_n)$$

Each characteristic "s" of this vector has a value selected from a range of values established for that particular characteristic. For example, the value of the "syncopation" characteristic may be any integer or half-integer between 0 and 5. As an empirical example, the value of the syncopation characteristic for most "Pink Floyd" songs is 2 or 2.5. The range of values for characteristics may vary and is not limited to just integers or half-integers between 0 and 5.

If the input seed is an artist name, then (in the embodiment of FIG. 17) "Generate Average" step 1706 is executed. In one embodiment of "Generate Average" step 1706, song vectors $S_1$ to $S_n$, which each correspond to one of n songs in the database by the artist that is the subject of the input seed, are retrieved. Alternatively, and as stated previously, song vectors $S_1$ to $S_n$ could correspond to one of n songs in the database on a particular album by the artist.

After song vectors $S_1$ to $S_n$ have been retrieved, an average of all values for each characteristic of every song vector $S_1$ to $S_n$ is calculated and populated into a "center" or virtual song vector:

$$\text{Center vector } C=(\mu_1, \mu_2, \ldots \mu_n)$$

$$\mu_1=(s_{1,1}+s_{2,1}+\ldots s_{n,1})/n$$

Of course, other statistical methods besides computing an average could be used to populate center vector "C." Center vector "C" is then used for later comparison to another song vector as a representation of, for example, the average of all songs by the artist. In one embodiment of the invention, center vector "$C_1$" corresponding to a first artist may be compared to center vector "$C_2$" corresponding to a second artist.

After song vectors $S_1$ to $S_n$ have been retrieved, "assign confidence factor" step 1708 is executed. In "assign confidence factor" step 1708, a deviation vector "D" is calculated:

$$\text{Deviation Vector } D=(\sigma_1, \sigma_2, \ldots \sigma_n)$$

$$\sigma_1=\text{sqrt}(((s_{1,1}-\mu_1)^2+(s_{2,1}-\mu_1)^2+(s_{n,1}-\mu_1)^2)/(n-1))$$

that shows how similar or dissimilar are the characteristics among each of song vectors $S_1$ to $S_n$. While one embodiment of the invention contemplates populating the deviation vector by determining the standard deviation of all values for each characteristic of every song vector $S_1$ to $S_n$, other statistical methods could also be used. As an empirical example of the use of standard deviation to calculate the deviation vector, the value of the syncopation characteristic for most "Pink Floyd" songs is 2 or 2.5, which results in a smaller standard deviation value (e.g., 0.035) than if a standard deviation value were calculated for a characteristic having more divergent values (e.g., if the value of the syncopation characteristic for all songs by Pink Floyd was more widely dispersed between 0 and 5).

To the extent a standard deviation value for a certain characteristic is larger, the averaged value of that characteristic in the virtual song vector is considered to be a less reliable indicator of similarity when the virtual song vector is compared to another song vector. Accordingly, as indicated previously, the values of the deviation vector serve as "confidence factors" that emphasize values in the virtual song vector depending on their respective reliabilities. One way to implement the confidence factor is by multiplying the result of a comparison between the center vector and another song vector by the inverse of the standard deviation value. Thus, for example, the confidence factor could have a value of 0.25/($\sigma_i^2$+0.25). The "0.25" is put into the equation to avoid a mathematically undefined result in the event $\sigma_i^2$ is 0 (i.e., the confidence factor avoids "divide by zero" situations).

Returning to FIG. 16, "Identify Focus Traits" step 1606 identifies focus traits based on the values of characteristics of song vector (or virtual song vector) S. As stated previously, focus traits are specific combinations of characteristics (or even a single notable characteristic) representing significantly discernable attributes of a song. As such, focus traits are the kernel of what makes one song actually sound different, or like, another song. Focus traits may be created and defined in many ways, including by having trained musicologists determine what actually makes one song sound different from another, or else having users identify personal preferences (e.g., receiving input from a user stating that he/she likes songs with male lead vocals). Exemplary focus traits include "male lead vocal" or "Middle Eastern influence." There can be 1, 10, 1000 or more than 1000 focus traits, depending on the desired complexity of the system.

In one embodiment of the invention, a set of rules known as "triggers" is applied to certain characteristics of song vector S to identify focus traits. For example, the trigger for the focus trait "male lead vocal" may require the characteristic "lead vocal present in song" to have a value of 5 on a scale of 0 to 5, and the characteristic "gender" to also have a value of 5 on a scale of 0 to 5 (where "0" is female and "5" is male). If both characteristic values are 5, then the "male lead vocal" focus trait is identified. This process is repeated for each focus trait. Thereafter, any identified focus traits may be presented to the user through the user interface.

Now that focus traits have been identified, "Weighting Factor Assignment" step 1608 is executed. In "weighting factor assignment" step 1608, comparative emphasis is placed on some or all of focus traits by assigning "weighting factors" to characteristics that triggered the focus traits. Alternatively, "weighting factors" could be applied directly to certain characteristics.

Accordingly, musicological attributes that actually make one song sound different from another are "weighted" such that a comparison with another song having those same or similar values of characteristics will produce a "closer" match. In one embodiment of the invention, weighting factors are assigned based on a focus trait weighting vector W, where $w_1$, $w_2$ and $w_n$ correspond to characteristics $s_1$, $s_2$ and $s_n$ of song vector S.

Weighting Vector $W = (w_1, w_2, w_3, \ldots, w_n)$

In one embodiment of the invention, weighting vector W can be implemented into the comparison of songs having and song vectors "S" and "T" by the following formula:

distance$(W, S, T) = \Sigma w^*(s-t)^2$

As described previously, one way to calculate weighting factors is through scaling functions. For example, assume as before that the trigger for the focus trait "male lead vocal" requires the characteristic "lead vocal present in song" to have a value of 5 on a scale of 0 to 5, and the characteristic "gender" to also have a value of 5 on a scale of 0 to 5 (where "0" is female and "5" is male).

Now assume the song "Yesterday" by the Beatles corresponds to song vector S and has an $s_1$ value of 5 for the characteristic "lead vocal present in song" and an $s_2$ value of 5 for the characteristic "gender." According to the exemplary trigger rules discussed previously, "Yesterday" would trigger the focus trait "male lead vocal." By contrast, assume the song "Respect" by Aretha Franklin corresponds to song vector T and has a $t_1$ value of 5 for the characteristic "lead vocal present in song" and a $t_2$ value of 0 for the characteristic "gender." These values do not trigger the focus trait "male lead vocal" because the value of the characteristic "gender" is 0. Because a focus trait has been identified for characteristics corresponding to $s_1$ and $s_2$, weighting vector W is populated with weighting factors of, for example, 100 for $w_1$ and $w_2$. Alternatively, weighting vector W could receive different weighting factors for $w_1$ and $w_2$ (e.g., 10 and 1000, respectively).

In "Compare Weighted Characteristics" step 1610, the actual comparison of song vector (or center vector) S is made to another song vector T. Applying a comparison formula without a weighting factor, such as the formula distance$(S, T) = (s-t)^2$, song vectors S and T would have a distance value of $(s_1-t_1)^2 + (s_2-t_2)^2$, which is $(5-5)^2 + (5-0)^2$, or 25. In one embodiment of the invention, a distance value of 25 indicates a close match.

By contrast, applying a comparison formula featuring weighting vector W produces a different result. Specifically, the weighting vector W may multiply every difference in characteristics that trigger a particular focus trait by 100. Accordingly the equation becomes $w_1(s_1-t_1)^2 + w_2(s_2-t_2)^2$, which is $100(5-5)^2 + 100(5-0)^2$, or 2500. The distance of 2500 is much further away than 25 and skews the result such that songs having a different gender of the lead vocalist are much less likely to match. By contrast, if song vector T corresponded to another song that did trigger the focus trait "male lead vocal" (e.g., it is "All I Want Is You" by U2), then the equation becomes $100(5-5)^2 + 100(5-5)^2$, or 0, indicating a very close match.

As another example of one embodiment of the invention, a weighting vector value of 1,000,000 in this circumstance would effectively eviscerate any other unweighted matches of characteristics and means that, in most circumstances, two songs would never turn up as being similar.

As indicated previously, it is also possible for one or more values of the weighting vector to be assigned based on preferences of the user. Thus, for example, a user could identify a "male lead vocal" as being the single-most important aspect of songs that he/she prefers. In doing so, a weighting vector value of 10,000 may be applied to the comparison of the characteristics associated with the "male lead vocal" focus trait. As before, doing so in one embodiment of the invention will drown out other comparisons.

In one embodiment of the invention, one weighting vector is calculated for each focus trait identified in a song. For example, if 10 focus traits are identified in a song (e.g., "male lead vocalist" and 9 other focus traits), then 10 weighting vectors are calculated. Each of the 10 weighting vectors is stored for potential use during "Compare Weighted Characteristics" step 1610. In one embodiment of the invention, users can select which focus traits are important to them and only weighting vectors corresponding to those focus traits will be used during "Compare Weighted Characteristics" step 1610. Alternatively, weighting vectors themselves could be weighted to more precisely match songs and generate playlists.

In "Select Items" step 1612, the closest songs are selected for the playlist based on the comparison performed in "Compare Weighted Characteristics" step 1610. In one embodiment of the invention, the 20 "closest" songs are preliminary selected for the playlist and placed into a playlist set. Individual songs are then chosen for the playlist. One way to choose songs for the playlist is by random selection. For example, 3 of the 20 songs can be randomly chosen from the set. In one embodiment of the invention, another song by the same artist as the input seed is selected for the playlist before any other songs are chosen from the playlist. One way to do so is to limit the universe of songs in the database to only songs by a particular artist and then to execute the playlist generating method.

To the extent a set of weighted song vectors was obtained, a plurality of sets of closest songs are obtained. For example, if a song has 10 focus traits and the 20 closest songs are preliminarily selected for the playlist, then 10 different sets of 20 songs each (200 songs total) will be preliminarily selected.

Songs can be selected for the playlist from each of the sets by, for example, random selection. Alternatively, each set can have songs be selected for the playlist in order corresponding to the significance of a particular focus trait.

As an alternative, or in addition to, randomly selecting songs for the playlist, rules may be implemented to govern the selection behavior. For example, aesthetic criteria may be established to prevent the same artist's songs from being played back-to-back after the first two songs, or to prevent song repetition within 4 hours.

Moreover, regulatory criteria may be established to comply with, for example, copyright license agreements (e.g., to prevent the same artist's songs from being played more than 4 times in 3 hours). To implement such criteria, a history of songs that have been played may be stored along with the time such songs were played.

Accordingly, songs are selected for the playlist from one or more playlist sets according to random selection, aesthetic criteria and/or regulatory criteria. To discern the actual order of songs in the playlist, focus traits can be ranked (e.g., start with all selected songs from the playlist set deriving from the "male lead vocal" focus trait and then move to the next focus trait). Alternatively, or in addition, the user can emphasize or de-emphasize particular playlist sets. If, for example, a user decides that he/she does not like songs having the focus trait of "male lead vocal," songs in that playlist set can be limited in the playlist.

A number of songs are selected from the Set List and played in sequence as a Set. Selection is random, but limited to satisfy aesthetic and business interests, (e.g. play duration of a particular range of minutes, limits on the number of repetitions of a particular Song or performing artist within a time interval). A typical Set of music might consist of 3 to 5 Songs, playing for 10 to 20 minutes, with sets further limited such that there are no song repetitions within 4 hours and no more than 4 artist repetitions within 3 hours.

In one embodiment of the invention, the playlist features identifiers that correspond to, for example, song names. The identifiers may be index fields or other handles for content database 120 on content server 118. After the playlist has been generated, playlist server 108 may send an identifier corresponding to the input seed to the user at terminal 102, 104 or 106. To the extent the input seed was an artist name requiring the creation of a "center vector," playlist server 108 may, for example, send an identifier corresponding to a song that is the closest match to the "center vector." In one embodiment of the invention, a set of identifiers may be sent to terminal 102, 104 or 106 (or to multiple terminals) at once.

After an identifier is remotely provided to terminal 102, 104 or 106, the player on terminal 102, 104 or 106 proceeds to associate a graphic element (such as first graphic element 314 in FIG. 3) with the identifier. For example, content server 118 may store song name 316, artist name 318 and content art 320 in connection with a corresponding content object in content database 120. Accordingly, the player on terminal 102, 104 or 106 may request song name 316, artist name 318 and content art 320 that corresponds to the input seed or identifier from content server 118. Content server 118 then provides, in encrypted form, song name 316, artist name 318 and content art 320 to the player on terminal 102, 104 or 106.

In "Display Graphic Element" step 1208, first graphic element 314 appears in graphical user interface 208 as discussed previously. Song name 316, artist name 318 and content art 320 may be provided within first graphic element 314.

In "Provide Content Object" step 1210, a content object corresponding to the identifier or input seed is provided. For example, the player in terminal 102, 104 or 106 may send the identifier received from playlist server 108 to content server 118. In response, content server 118 may provide a content object corresponding to the identifier to the player on terminal 102, 104 or 106 and thus to the user.

Content server 118 may provide a content object to the user in several ways. For example, content server 118 may stream content object to the user through well-known streaming techniques and protocols such as User Datagram Protocol (UDP), Real Time Transport Protocol (RTP), Real Time Streaming Protocol (RTSP), Real Time Control Protocol (RTCP) and Transmission Control Protocol (TCP). As another example, content server 118 may provide a content object to the user through downloading. Thus, the content object is downloaded fully to terminal 102, 104 or 106 before it is provided to the user. As yet another example, the content object may be provided to the user through a hybrid method of streaming and downloading. In an embodiment of the invention, content server 118 may provide a content object at a rate of 10 to 20 times that of the playback rate. Portions of the content object that have not been played are cached in memory on terminal 102, 104 or 106.

In "Provide Content Object" step 1210, a content object corresponding to the identifier or input seed is provided. For example, the player in terminal 102, 104 or 106 may send the identifier received from playlist server 108 to content server 118. In response, content server 118 may provide a content object corresponding to the identifier to the player on terminal 102, 104 or 106 and thus to the user.

In "Obtain Feedback" step 1212, the user selectively provides feedback about a content object through graphical user interface 208 in the manner discussed previously. In one embodiment of the invention, feedback that has been selectively provided by the user is sent to playlist server 108. If the feedback about a content object is negative, then the playlist may be modified as discussed previously. For example, the user may selectively provide feedback that is negative about a song with a focus trait of "male lead vocal." In response, a new playlist is generated by playlist server 108 (i.e., the existing playlist is modified) that accounts for the negative feedback. In one embodiment of the invention, a weighting value or scaling function corresponding to the focus trait of "male lead vocal" may be adjusted such that songs having strong focus traits of "male lead vocal" are less likely to match with the input seed originally provided by the user.

As another example, the user may selectively provide feedback that he or she does not like "jazz" music. "Jazz" may be a characteristic stored with regard to various songs in database 112. A weighting value of 1/1,000,000,000 is then assigned to the characteristic "jazz," which means that a match between the input seed and "jazz" songs is unlikely to result from a comparison of the input seed and database items. Accordingly, the playlist will be modified to remove jazz songs.

Using Contextual Information to Generate and Modify Playlists

Figure 18:
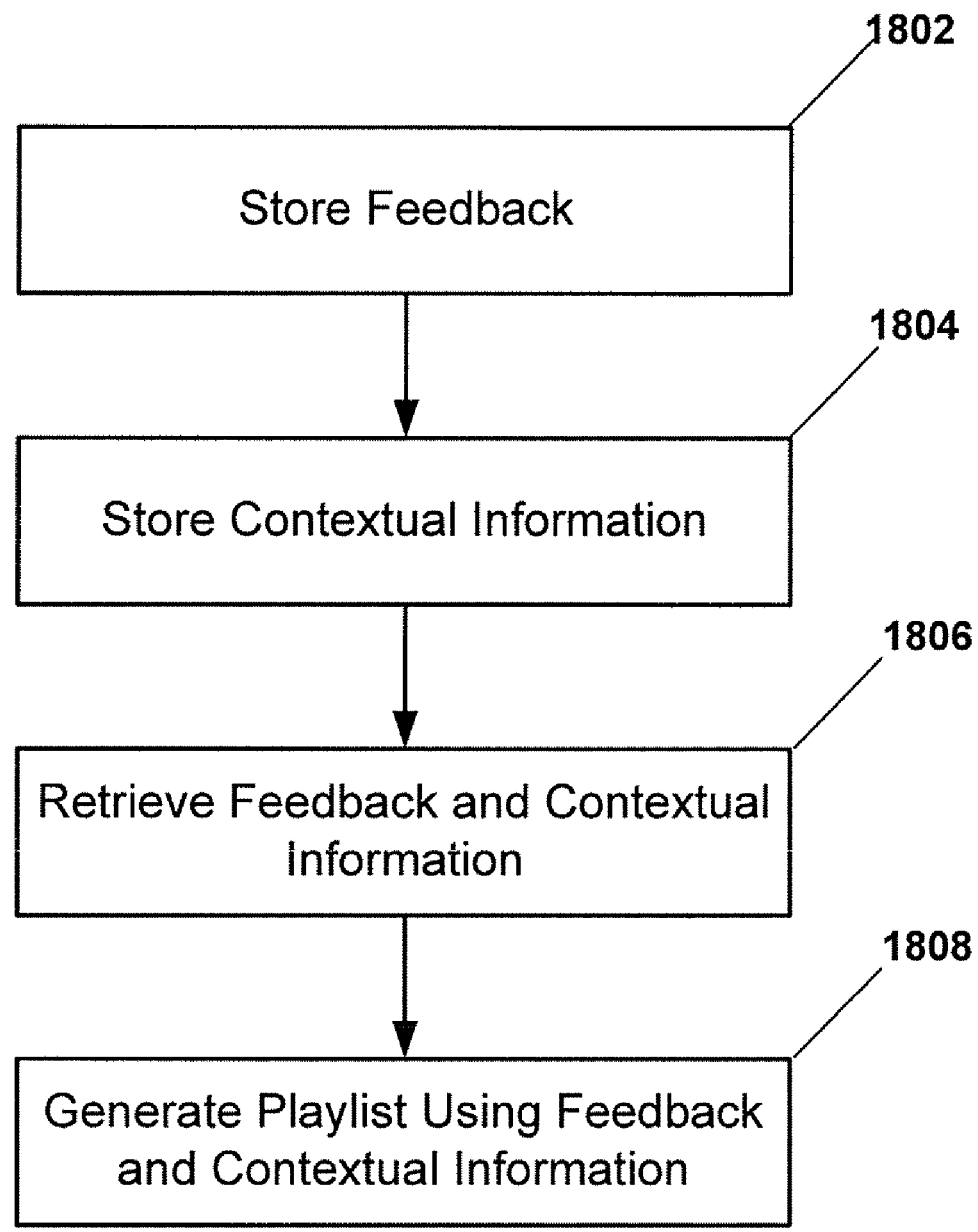
FIG. 18 shows a flow diagram of a method of generating a playlist of content objects in accordance with aspects of the invention.

FIG. 18 shows a flow diagram of a method of generating a playlist of content objects in accordance with aspects of the invention. As explained above for "Obtain Feedback" step 1212 in FIG. 12, feedback about a content object may be obtained from a user and sent to playlist server 108. In "Store Feedback" step 1802, feedback from the user may be stored in memory on playlist server 108 (e.g., in database 112)(FIG. 1). Alternatively, the feedback may be stored in memory on a content server 118. One of skill in the art will appreciate that the feedback may be stored on any computing device containing memory that is accessible from network 110. For example, a separate feedback server and/or database may be beneficial in some configurations familiar to those of skill in the art.

The feedback stored in "Store Feedback" step 1802 may be positive, negative, or neutral. Numerous examples of negative feedback and positive feedback have been provided above. Meanwhile, in accordance with aspects of the invention, instances when the user refuses to give feedback or simply fails to give feedback are stored as neutral (or null) feedback. Neutral feedback tracks the number of occurrence of the absence of feedback. Therefore, in one aspect of the invention, the total number of times a particular song is played (i.e., "spins" of that song) is equal to the sum of the quantity of neutral feedbacks, positive feedbacks, and negative feedbacks stored for that song. One skilled in the art will appreciate that if the total number of spins, total number of positive feedback, and total number of negative feedback are stored for a song, then simple mathematics can be used to calculate the total number of neutral feedback. Therefore, the total number of each type of feedback need not necessarily be stored in accordance with aspects of the invention. At least one benefit of storing neutral feedback is that it may be useful in determining the weight to accord to feedback in the generation of playlists.

Figure 19:
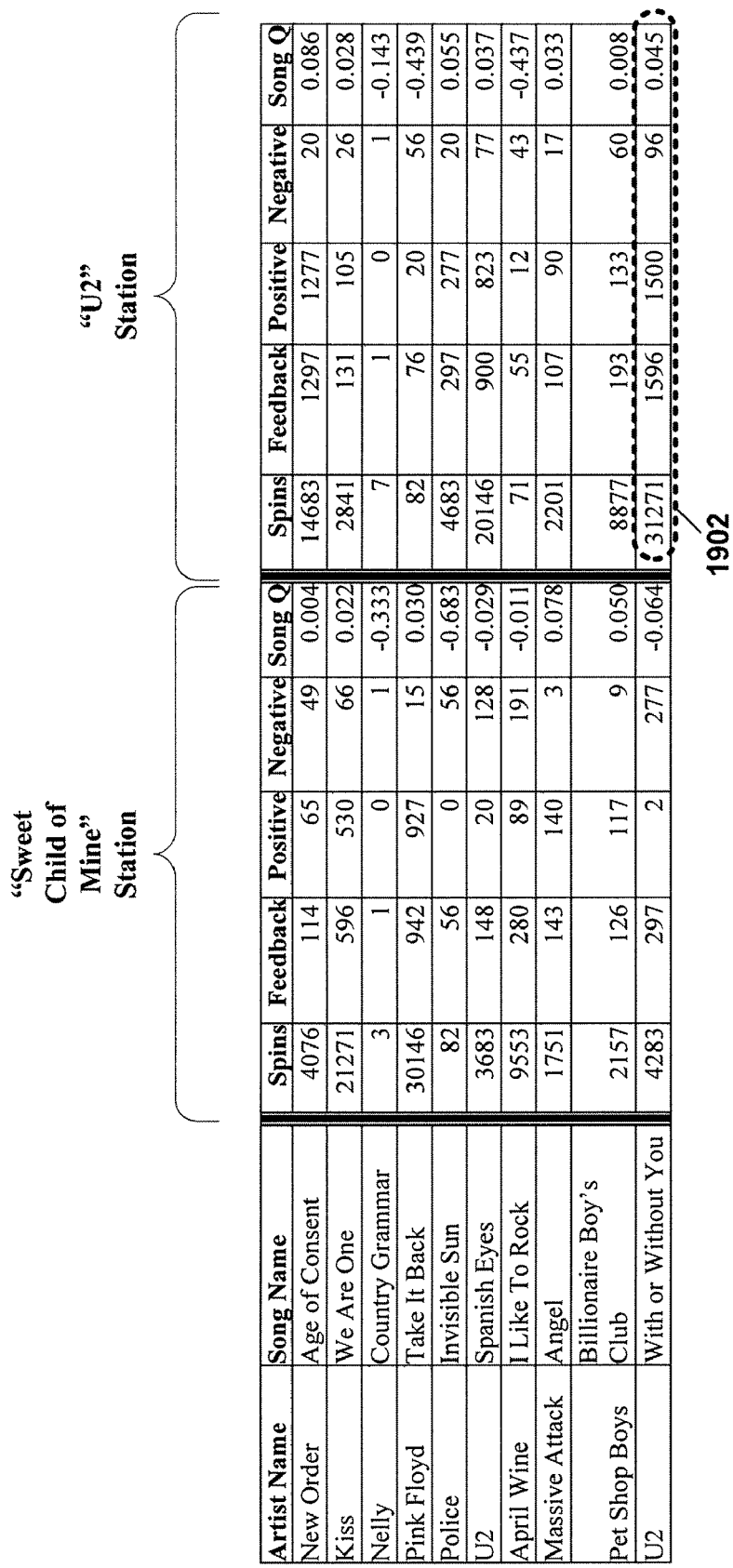
FIG. 19 depicts feedback and contextual information stored in accordance with aspects of the invention.

Furthermore, contextual information relating to the feedback is stored in "Store Contextual Information" step 1804. Similar to the storing of feedback, the contextual information may also be stored in memory on playlist server 108. Alternatively, the contextual information may be stored in memory on a content server 118. One of skill in the art will appreciate that the contextual information may be stored on any computing device containing memory that is accessible from network 110. For example, it may be beneficial in some configuration to setup a separate server and/or database for feedback and contextual information. FIG. 19, which is discussed in detail below, depicts an example of feedback and contextual information stored together in a database.

Each time a content object is presented to the user, feedback from the user (e.g., positive, negative, neutral) is stored along with the context (i.e., contextual information) in which the content object was presented. Examples of contextual information include, but are not limited to, the station on which the current song is playing, the song played immediately prior to the current song, the artist of the song playing immediately prior to the current song, one or more musicological characteristics of the prior song(s), the artist of the current song, the album containing the current song, time of day, day of week, calendar day (i.e., date), location of user (e.g., work, home, car, zip code, country, etc.), and user demographics (e.g., age, gender). Some contextual information may be related to the current song in the context of an extrinsic factors, such as location of user (i.e., geography), user demographics, and/or temporal (e.g., time of day, day of week, calendar date). Meanwhile, some contextual information may be related to the current song in the context of at least one of the following: particular artist, particular album, and/or particular station. In addition, some contextual information may be related to the current song in the context of a second content object (e.g., an immediately prior song). Moreover, some contextual information may be related to the current song in the context of characteristics of a second content object (e.g., characteristics of an immediately prior song such as treble, bass, vocals, etc.). Examples of each of the various types of contextual information will be clear to one of skill in the art after thorough review of the entirety of the disclosure.

Continuing with an earlier example where a user selectively provides feedback that is negative about a song (e.g., "With or Without You" by U2), contextual information relating to that feedback is automatically obtained and stored in memory. For example, the particular station (e.g., "Pet Shop Boys" Station) the user was listening to when the "With or Without You" song played, the particular artist (e.g., "Pet Shop Boys") the user had provided as an input seed, and the time of day (e.g., 9 a.m.) and day of week (e.g., Monday) when the "With or Without You" song played may be automatically obtained and stored in memory as contextual information relating to the negative feedback. In another example, the fact that the user giving feedback was a 28-year old male located in Virginia may be stored as contextual information relating to the feedback.

In accordance with aspects of the invention, stored feedback and contextual information is retrieved in "Retrieve Feedback and Contextual Information" step 1806. In one example in accordance with aspects of the invention, when a user provides the artist/band "Pet Shop Boys" as an input seed, the stored feedback and contextual information related to the "Pet Shop Boys" Station is retrieved and used in generating a playlist of content objects (e.g., songs). In various embodiments in accordance with the invention, the feedback and contextual information are used in generating a playlist only after the quantity of feedback has exceeded a statistical threshold. In examples where the threshold has not been met, the generation of playlists may be similar to step 1204. In one example, the feedback and contextual information are used in playlist generation and/or optimization only after at least one hundred spins of a song in a particular context (e.g., the song "With or Without You" playing on "Pet Shop Boys" Station). In another example, the statistical threshold value may be set to 1,000 spins or 10,000 spins. One of skill in the art will appreciate that a larger threshold value may provide a higher level of confidence in the statistical reliability of the information collected, but may delay the resulting playlist optimizations.

Once the statistical threshold has been met, in "Generate Playlist Using Feedback and Contextual Information" step 1808, a playlist is generated by playlist server 108 that accounts for negative, positive, and neutral feedback provided in that particular context. Unlike the generation and modification of a playlist in step 1204, this step uses feedback with contextual information to deliver an enhanced playlist. In one example, the context in which a song is played may be a station having an input seed of artist "U2" (i.e., in the context of songs played on the "U2" Station). The feedback and contextual information stored for that particular context is depicted by the appropriate portion of database table 1900 depicted in FIG. 19.

Database table 1900 in FIG. 19 stores contextual information and feedback provided by users in the context of stations. In this example, for practical purposes, database table 1900 shows only some of the entries stored for a "U2" Station (i.e., a station based on an artist input seed) and a "Sweet Child of Mine" Station (i.e., a station based on a song input seed). Database table 1900 contains ten entries for each station, where each entry corresponds to a song that was played in the context of the "Sweet Child of Mine" Station or "U2" Station. In one example, the number of entries in database table 1900 may dynamically grow as different songs are played on that station and added to database table 1900. Alternatively, database table 1900 may be prepopulated with an entry corresponding to every available song. One skilled in the art will recognize that prepopulating database table 1900 may undesirably result in extremely large database tables in memory.

By way of example, database entry 1902 corresponds to the feedback provided by users listening to the "U2" Station in response to hearing artist U2's song "With or Without You." In database table 1900, the "Artist Name" column contains "U2" and the "Song Name" column contains "With or Without You". Other relevant portions of database table 1900 for entry 1902 are as follows: the "Spins" column contains 31,271 (i.e., the total number of times the song "With or Without You" has played on a "U2" Station), the "Positive" column contains the number of times a user gave positive feedback (e.g., by selecting "I Like It" menu choice 810 (FIG. 8) for the song) for the song, and the "Negative" column contains the number of times a user gave positive feedback (e.g., by selecting "I Don't Like It" menu choice 812 (FIG. 8) for the song) for the song. Meanwhile, as explained earlier, the quantity of neutral feedback can be obtained by simple arithmetic (i.e., Spins minus Positive minus Negative). In addition, the "Feedback" column is a total of positive and negative feedback. One skilled in the art will recognize that the "Feedback" column may be calculated using other columns in database table 1900 and need not be present in all embodiments.

In addition, database entry 1902 contains a "Song Q" column that stores values indicating the suitability of its respective content object in that particular context. In one example, the suitability quotient "Q" may be expressed as a numerical value between negative one and positive one. Negative "Q" values may be used to indicate that a particular content object (e.g., the song "With or Without You") is less suitable in the particular context (e.g., on "Sweet Child of Mine" Station that song receives a negative 0.064 "Q" value). Meanwhile, a positive "Q" value may be used to indicate that a particular content object (e.g., the song "With or Without You") is more suitable in the particular context (e.g., on "U2" Station that song receives a positive 0.045 "Q" value). In one embodiment, the "Q" value may be recalculated and updated in database table 1900 each time a song is played in the context of a particular station. One skilled in the art will appreciate that this may result in a great computational load on the relevant computing machines. Alternatively, feedback and contextual information may be collected and the corresponding "Q" values recalculated and updated only at regular intervals (e.g., 30 minutes or after 100 new spins).

The suitability quotient "Q" for a content object in a particular context is calculated using the function:

$$Q = ((\Sigma F_{pos}) - (\Sigma F_{neg}))/(\text{total \# of spins})$$

where $F_{pos}$ is the sum of all positive feedback for the content object, $F_{neg}$ is the sum of all negative feedback for the content object, and "total # of spins" is the total number of times that a content object was performed in that particular context. For example, database entry 1902 shows that the song "With or Without You" by U2 was played on the "U2" Station 31,271 times. Of those times, the song received positive feedback 1,500 times and negative feedback 96 times. Using the suitability quotient function above, the "Q" value for the song "With or Without You" in the context of the "U2" Station is 0.045 (i.e., 1,500 minus 96, divided by 31,271). Therefore, a positive "Q" value for that song in that context will increase the likelihood that it will be found in the playlist generated in step 1808.

In one example, a weighting value or scaling function as discussed previously and that is appropriate for the suitability quotient "Q" value may be used to optimize the comparison performed by the matching algorithm. The matching algorithm was discussed extensively above. For example, according to the illustrative data in database table 1900 under the "U2" Station context, the song "Age of Consent" by New Order has a more favorable suitability quotient "Q" value than the song "We Are One" and is thus more likely to be selected for the playlist during a comparison.

In accordance with aspects of the invention, a number of content objects (e.g., songs) may be selected and played in a sequence determined, at least in part, using each song's respective "Q" value in the particular context. For example, according to the illustrative data in database table 1900 under the "U2" Station context, the song "Age of Consent" by New Order has a more favorable suitability quotient "Q" value than the song "We Are One" and is thus more likely to be selected for the playlist during a comparison.

In another example, the "Q" may be used to optimize the generation of a pleasing sequence of music (e.g., content objects) in a particular context. In accordance with aspects of the invention, a number of content objects (e.g., songs) may be selected and played in a sequence determined, at least in part, using each song's respective "Q" value in the particular context. For example, according to the illustrative data in database table 1900 under the "U2" Station context, the song "Age of Consent" by New Order has a more favorable suitability quotient "Q" value than the song "We Are One" and is thus more likely to be selected from a playlist to be played.

Figure 20:
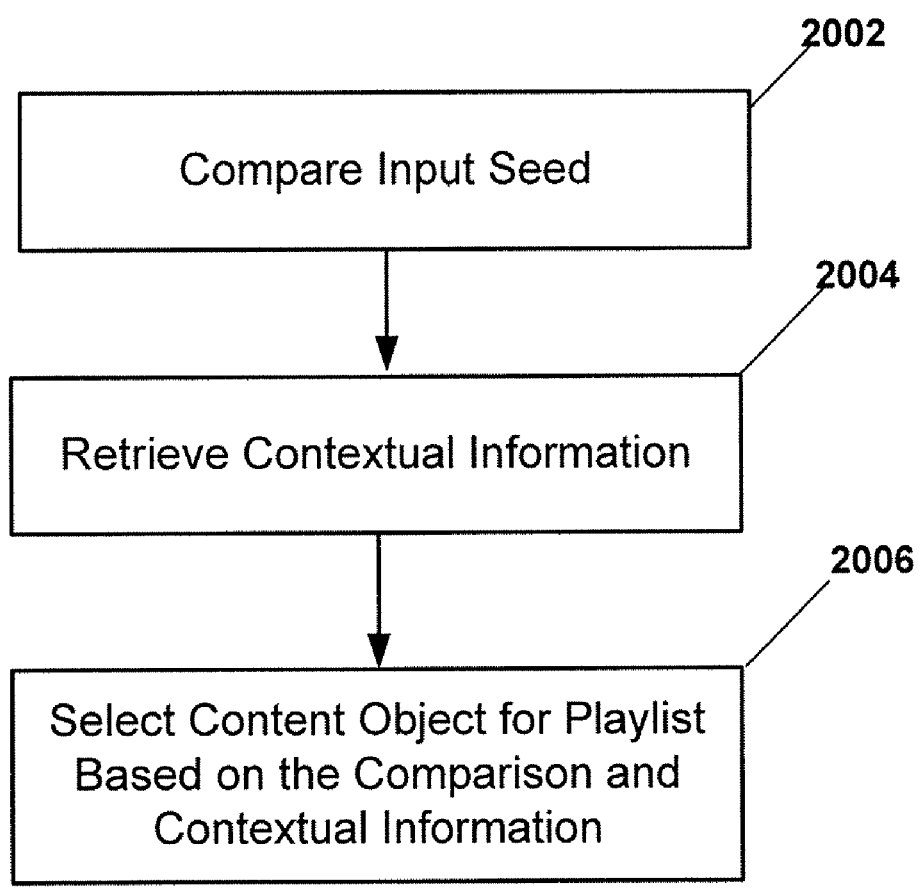
FIG. 20 shows another flow diagram of a method of generating a playlist of content objects in accordance with aspects of the invention.

FIG. 20 depicts another flow diagram of a method of generating a playlist of content objects in accordance with aspects of the invention. In step 2002, an input seed is compared to a first database item corresponding to a first content object (i.e., song). The comparison may use the matching algorithm discussed above to identify a playlist of one or more songs that sound alike (e.g., are closely related to a source song or group of songs based on their characteristics and weighted comparisons of these characteristics). For example, a user may enter the artist "Massive Attack" as an input seed and be presented with one or more database items corresponding to content objects (e.g., the song "With or Without You"). In some examples a database item may be simply a unique identifier for a particular song.

In step 2004, contextual information relating to a first content object (e.g., the song "With or Without You") is retrieved from memory. Many examples of contextual information were provided above. In addition, the suitability quotient "Q" calculated for the song "With or Without You" on the "Massive Attack" Station may be retrieved. The retrieving performed in step 2004 is similar to the retrieving performed in step 1806. As discussed earlier, the suitability quotient "Q" may optimize the actual order and/or placement of the songs in the playlist.

In step 2006, the contextual information relating to the first content object (e.g., the song "With or Without You") is used to determine whether to select that object for the playlist. Step 2006, which is an enhancement of step 1612 (FIG. 16), uses retrieved contextual information in addition to the comparison algorithm used in step 1612 to select content objects for the playlist. For example, step 2006 may show that the song "With or Without You" corresponds to a negative "Q" value when played after the song "Angel". Such information may be stored in a table in memory like table 1900 in FIG. 19. However, in this example the context in which the feedback was obtained would relate to the prior content object (e.g., the song "Angel") and not the station, as was the case in a prior example.

The invention has been described with respect to specific examples including presently preferred modes of carrying out the invention. Those skilled in the art will appreciate that there are numerous variations and permutations of the above described systems and techniques, for example, that would be used with videos, wine, films, books and video games, that fall within the spirit and scope of the invention as set forth in the appended claims. The use of ordinal syntax such as "first" and "second" in this and related applications is intended for comprehension and readability purposes and is not intended to be limiting in the specification or in and/or between claims. For example, a first content object does not necessarily require the content object to come before a second content object.

We claim:

1. A tangible computer-readable medium having computer-executable instructions that causes one or more processors to perform a method comprising:
   storing, in an electronic memory, feedback from a plurality of users about a first content object, wherein the first content object is stored in an electronic content server;
   storing, in the electronic memory, contextual information relating to context in which the feedback about the first content object was provided, where the contextual information is independent of characteristics of the first content object;
   calculating a suitability quotient of the first content object based on the contextual information, wherein the suitability quotient is:
      a sum of feedback provided about the first content object based on the contextual information where the feedback is positive,
      less a sum of feedback provided about the first content object based on the contextual information where the feedback is negative,
      divided by a total number of times the first content object was transmitted to a user terminal;
   storing, in the electronic memory, the suitability quotient;
   utilizing the feedback, the contextual information, and the suitability quotient to generate a playlist of content objects; and
   transmitting from the electronic content server each of the contents objects to a user terminal, wherein the transmitting is in response to the user terminal requesting content.

2. The computer-readable medium of claim 1 wherein the feedback comprises positive, negative, and neutral feedback, and the threshold amount is one thousand.

3. The computer-readable medium of claim 1 wherein the contextual information comprises information relating to the first content object in the context of at least one of the following: particular artist, particular album, and particular station.

4. The computer-readable medium of claim 1 wherein the contextual information comprises information relating to the first content object in the context of characteristics of a second content object.

5. The computer-readable medium of claim 1 wherein the contextual information comprises information relating to the first content object in the context of an extrinsic factor, wherein the extrinsic factor comprises at least one of the following: temporal factor, geographic factor, and demographic factor.

6. The computer-readable medium of claim 1 wherein the contextual information comprises at least one of the following: station on which the first content object was playing when the feedback was provided, name of a second content object played immediately prior to the first content object when the feedback was provided, artist of the second content object played immediately prior to the first content object when the feedback was provided, and a musicological characteristic of the second content object played immediately prior to the first content object when the feedback was provided, location of a user when the feedback was provided, age of the user when the feedback was provided, gender of the user when the feedback was provided, a time of day when the feedback was provided, and a day of week when the feedback was provided.

7. A computer-implemented method of generating a playlist at an electronic playlist server, comprising:
   comparing, using a processor, an input seed, which is sent from a user terminal, to a first database item stored in the electronic playlist server, wherein the first database item corresponds to a first content object stored in an electronic content server;
   retrieving from the electronic playlist server feedback that is associated with contextual information related to the first content object, wherein the feedback includes feedback provided about a plurality of content objects;
   retrieving values indicating suitability of each of the plurality of content objects in the context of the first content object, wherein the value indicating suitability is:
      a sum of feedback provided about the particular content object in the context of the first content object where the feedback is positive,
      less a sum of feedback provided about the particular content object in the context of the first content object where the feedback is negative,
      divided by a sum of the sum of feedback where the feedback is positive and the sum of feedback where the feedback is negative;
   selecting more than one content objects from the plurality of content objects for the playlist based on at least the values indicating suitability, wherein sequence of playback of the more than one content objects of the playlist is determined using at least the values indicating suitability of each of the more than one content objects of the playlist; and
   transmitting from the electronic content server a first of the more than one content objects of the playlist to a player at the user terminal in accordance with the sequence of playback.

8. The method of claim 7 wherein the contextual information comprises information relating to the at least one of the following: particular artist, and particular album of the first content object.

9. The method of claim 7 wherein the contextual information comprises information relating to the first content object in the context of a second content object.

10. The method of claim 7 wherein the contextual information comprises information relating to the first content object in the context of characteristics of a second content object.

11. The method of claim 7 wherein the contextual information comprises information relating to the first content object in the context of at least one extrinsic factor, where the at least one extrinsic factor comprises at least one of the following: temporal, geographic, and demographic factors.

12. A method comprising:
   storing, in a first computer memory, feedback about a first content object from at least one user;
   storing, in a second computer memory, contextual information relating to context in which the feedback about the first content object was provided, where the contextual information is independent of characteristics of the first content object and the at least one user providing the feedback;
   retrieving, using a processor in an electronic playlist server, the feedback in the first computer memory and contextual information in the second computer memory;
   generating, using the processor in the electronic playlist server, a playlist of a plurality of content objects using at least the feedback, wherein order of playback of the first content object of the plurality of content objects in the playlist is determined using at least the contextual information;

transmitting from an electronic content server using a content engine each of the plurality of content objects to a player in accordance with the order of playback;

storing a suitability quotient of the first content object based on at least the feedback and contextual information relating to a particular context in which the feedback was provided, wherein the suitability quotient is:
- a sum of all feedback provided about the first content object while in the particular context where all the feedback is positive,
- less a sum of all feedback provided about the first content object while in the particular context-where all the feedback is negative,
- divided by a total number of times the first content object was transmitted to a user terminal; and retrieving the suitability quotient;

wherein the generating a playlist of content objects further includes using the suitability quotient.

13. A computerized apparatus, comprising:

a computer memory configured to store feedback from a plurality of users about a first content object and contextual information relating to a context in which the feedback about the first content object was provided;

an electronic playlist component comprising a processor configured to:
- calculate and store a suitability quotient of the first content object based on the contextual information, wherein the suitability quotient is:
  - a sum of feedback provided about the first content object based on the contextual information where the feedback is positive,
  - less a sum of feedback provided about the first content object based on the contextual information where the feedback is negative,
  - divided by a sum of the sum of feedback where the feedback is positive and the sum of feedback where the feedback is negative;
- retrieve the feedback, the contextual information, and the suitability quotient for use in generating a playlist, if the sum of positive feedback plus the sum of negative feedback exceeds a threshold amount; and
- generate an playlist of content objects; and an electronic content component comprising a content engine configured to transmit each of the content objects of the playlist of content objects to a media player.

14. The computerized apparatus of claim 13, wherein the first content object of the playlist of content objects is transmitted in accordance with an order of playback determined using at least the contextual information.

* * * * *